United States Patent
Oh et al.

(10) Patent No.: US 12,323,348 B2
(45) Date of Patent: Jun. 3, 2025

(54) METHOD AND APPARATUS FOR CHANNEL MEASUREMENT AND REPORTING IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Hyoungju Ji, Suwon-si (KR); Younsun Kim, Suwon-si (KR); Jinhyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 17/575,458

(22) Filed: Jan. 13, 2022

(65) Prior Publication Data
US 2022/0231808 A1  Jul. 21, 2022

(30) Foreign Application Priority Data
Jan. 13, 2021 (KR) .................. 10-2021-0004878

(51) Int. Cl.
H04L 5/00 (2006.01)
H04L 5/14 (2006.01)
H04W 72/0446 (2023.01)

(52) U.S. Cl.
CPC ............ *H04L 5/0048* (2013.01); *H04L 5/14* (2013.01); *H04W 72/0446* (2013.01)

(58) Field of Classification Search
CPC ....... H04L 5/0048; H04L 5/14; H04L 5/0023; H04L 5/0094; H04W 72/0446; H04B 7/0456
See application file for complete search history.

(56) References Cited

U.S. PATENT DOCUMENTS 9,306,725 B2   4/2016  Papasakellariou et al.
10,673,605 B2  6/2020  Kim et al.
(Continued)

FOREIGN PATENT DOCUMENTS

EP     3567967 A1    11/2019
KR  20210053019 A     5/2021
(Continued)

OTHER PUBLICATIONS

3GPP TR 36.897 V13.0.0 (Jun. 2015) Technical Report; 3rd Generation Partnership Project; Technical Specification Group Radio Access Network; Study on elevation beamforming / Full-Dimension (FD) Multiple Input Multiple Output (MIMO) for LTE (Release 13), 58 pages.
(Continued)

*Primary Examiner* — John D Blanton

(57) ABSTRACT

The disclosure relates to a communication technique that converges a 5th generation (5G) or pre-5G communication system to support a higher data rate after a 4th generation (4G) communication system such as long-term evolution (LTE) with IoT technology, and a system thereof. The disclosure may be applied to intelligent services (e.g., smart home, smart building, smart city, smart or connected car, healthcare, digital education, retail, security and safety related services, etc.) based on 5G communication technology and IoT-related technology. According to various embodiments of the disclosure, a method and apparatus for operating a dormant cell in a wireless communication system may be provided.

12 Claims, 18 Drawing Sheets

(56) References Cited

U.S. PATENT DOCUMENTS

| | | | |
|---|---|---|---|
| 11,930,469 B2* | 3/2024 | Zhang | H04L 5/16 |
| 2016/0219613 A1 | 7/2016 | Lei | |
| 2019/0158236 A1* | 5/2019 | Yoo | H04L 5/0094 |
| 2022/0103324 A1* | 3/2022 | Ly | H04L 5/0048 |
| 2022/0131553 A1* | 4/2022 | Huang | H03M 7/3059 |
| 2023/0114039 A1* | 4/2023 | Manolakos | H04L 5/0094 370/329 |
| 2023/0171063 A1* | 6/2023 | Yokomakura | H04L 5/0023 370/329 |
| 2023/0232481 A1* | 7/2023 | Park | H04L 1/1861 370/329 |
| 2024/0015527 A1* | 1/2024 | Gulati | H04B 7/088 |
| 2024/0023090 A1* | 1/2024 | Yuan | H04W 72/232 |

FOREIGN PATENT DOCUMENTS

| | | |
|---|---|---|
| WO | 2018204340 A1 | 11/2018 |
| WO | 2020019317 A1 | 1/2020 |
| WO | 2020056180 A1 | 3/2020 |
| WO | 2021168144 A1 | 8/2021 |

OTHER PUBLICATIONS

3GPP TR 38.901 V16.1.0 (Dec. 2019) Technical Report; 3rd Generation Partnership Project; Technical Specification Group Radio Access Network; Study on channel model for frequencies from 0.5 to 100 GHz (Release 16), 101 pages.

International Search Report and Written Opinion of the International Searching Authority dated Apr. 26, 2022, in connection with International Application No. PCT/KR2022/000681, 9 pages.

Supplementary European Search Report dated Apr. 12, 2024, in connection with European Patent Application No. 22739734.6, 7 pages.

* cited by examiner

METHOD AND APPARATUS FOR CHANNEL MEASUREMENT AND REPORTING IN WIRELESS COMMUNICATION SYSTEM

CROSS-REFERENCE TO RELATED APPLICATION

This application is based on and claims priority under 35 U.S.C. § 119 to Korean Patent Application No. 10-2021-0004878, filed on Jan. 13, 2021, in the Korean Intellectual Property Office, the disclosure of which is herein incorporated by reference in its entirety.

BACKGROUND

1. Field

The disclosure relates to a method and an apparatus for channel measurement and reporting in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultra-higher frequency (mmWave) bands (e.g., 60 GHz bands) so as to accomplish higher data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As described above, it has become possible to provide various services in line with development of wireless communication systems, and there is accordingly a need for a scheme for efficiently providing such services. Particularly, there is a need for a scheme capable of effectively operating a dormant cell in order to provide users with services for a longer period of time.

The above information is presented as background information only to assist with an understanding of the disclosure. No determination has been made, and no assertion is made, as to whether any of the above might be applicable as prior art with regard to the disclosure.

SUMMARY

It is an aspect of a disclosed embodiment to solve the problem of different signal qualities resulting from the influence of various interferences in parts time and frequency resource domains in which signals are to be transmitted/received in a wireless communication system, the influence of a fading channel, degraded resource efficiency, and the like.

The technical subjects pursued in the disclosure may not be limited to the above-mentioned technical subjects, and other technical subjects which are not mentioned may be clearly understood, through the following descriptions, by those skilled in the art to which the disclosure pertains.

In order to solve the above-mentioned problems, the disclosure provides a method performed by a terminal in a wireless communication system, the method comprises receiving, from a base station, a radio resource control (RRC) message including spatial relation information between a plurality of reference signals (RSs) and a sounding reference signal (SRS), and configuration information for the SRS, identifying a first downlink RS for a first time resource and a second downlink RS for a second time resource based on the configuration information, transmitting, to the base station, the SRS on the first time resource based on the first downlink RS, and transmitting, to the base station, the SRS on the second time resource based on the second downlink RS.

According to a disclosed embodiment, a method and an apparatus capable of effectively performing channel estimation and reporting in a wireless communication system may be provided, thereby solving the problem of different signal qualities resulting from the influence of various interferences in parts time and frequency resource domains in which signals are to be transmitted/received in a wireless communication system, the influence of a fading channel, degraded resource efficiency, and the like.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
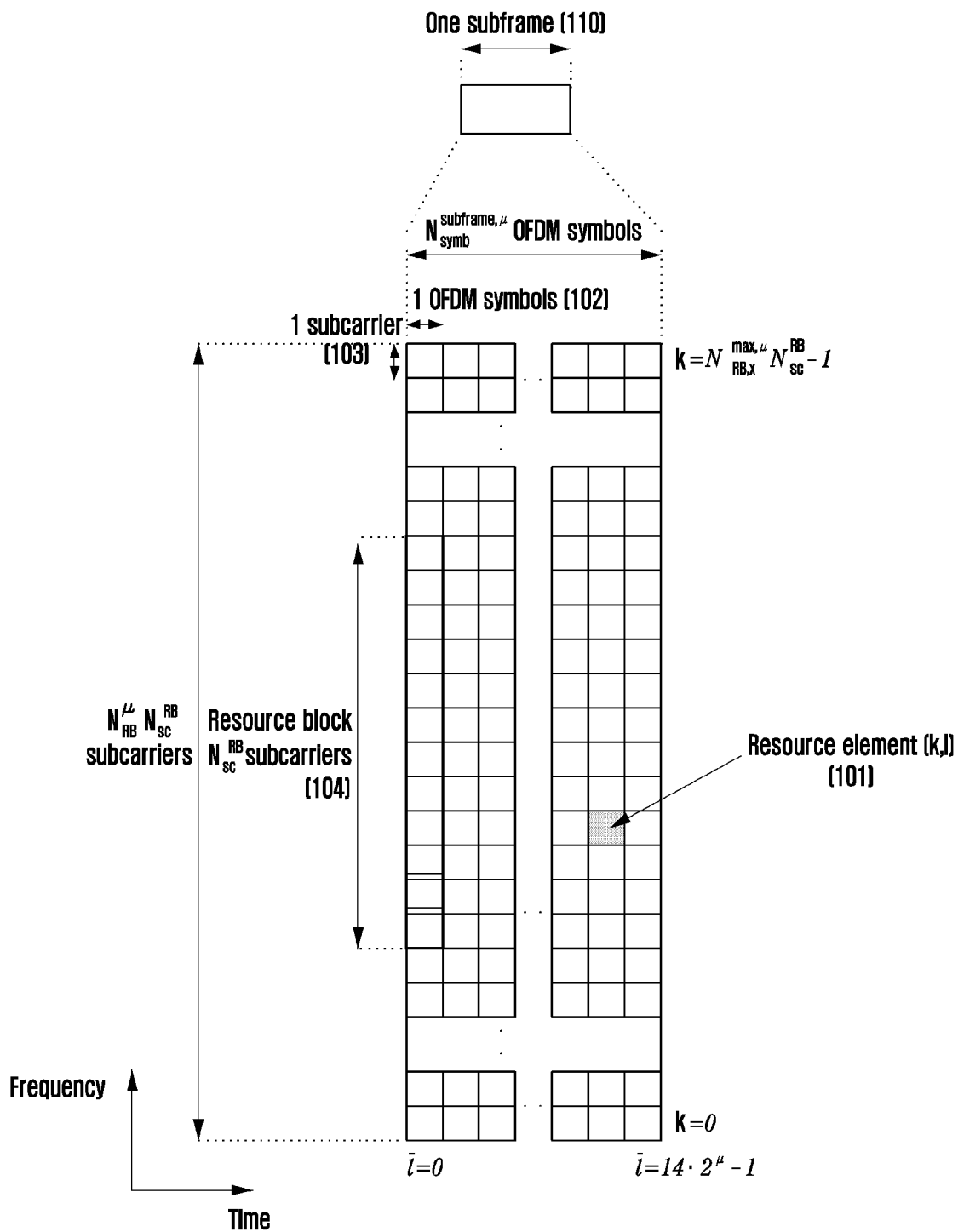
FIG. 1 is a diagram illustrating a basic structure of a time-frequency domain, which is a radio resource domain in which data or a control channel is transmitted in a 5G wireless communication system according to an embodiment of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE's 802.16e.

In the LTE system, which is a representative example of the broadband wireless communication system, in downlink (DL), an orthogonal frequency division multiplexing (OFDM) scheme is adopted, and in uplink (UL), a single carrier frequency division multiple access (SC-FDMA) scheme is adopted. Uplink refers to a radio link in which a terminal (user equipment (UE) or mobile station (MS)) transmits data or control signals to a base station (eNode B or base station (BS)), and downlink refers to a radio link in which a base station transmits data or control signals to the UE. The above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced mobile broadband (eMBB), massive machine type communication, (mMTC), and ultra-reliability low latency communication (URLLC).

The eMBB aims to provide more improved data transfer rates than those supported by existing LTE, LTE-A or LTE-Pro. For example, in the 5G communication system, the eMBB may be able to provide a peak data rate of 20 Gbps in the downlink and a peak data rate of 10 Gbps in the uplink from the viewpoint of one base station. In addition, the 5G communication system must provide the peak data rate and the increased user perceived data rate of the UE at the same time. In order to satisfy such a requirement, improved various transmission/reception technologies including a more advanced multi-antenna (multiple-input multiple-output, (MIMO)) transmission technology are required. In addition, in the LTE system, a signal is transmitted using a transmission bandwidth of up to 20 MHz in the 2 GHz band, whereas the 5G communication system can satisfy the data transmission rate required by the 5G communication system by using a frequency bandwidth wider than 20 MHz in a frequency band of 3 to 6 GHz or 6 GHz or more.

At the same time, mMTC is being considered to support application services such as the Internet of Things (IoT) in the 5G communication system. In order to efficiently provide the Internet of Things, mMTC requires access support for large-scale UEs within a cell, improvement of coverage of UEs, improved battery life, and reduction of costs of UEs. Because the Internet of Things is attached to various sensors and various devices to provide communication functions, the IoT must be able to support many UEs (e.g., 1,000,000 UEs/km2) within a cell. In addition, because a UE supporting mMTC is highly likely to be in a shaded area that a cell cannot cover, such as the basement of a building, due to the nature of the service, wider coverage compared to other services provided by the 5G communication system may be required. A UE supporting mMTC must be composed of a low-cost UE, and because it is difficult to frequently exchange the battery of the UE, a very long battery lifetime of 10 to 15 years may be required.

Lastly, URLLC is a cellular-based wireless communication service used for a specific purpose (mission-critical). For example, services used for remote control of a robot or machinery, industrial automation, an unmanned aerial vehicle, remote health care, an emergency alert, etc. may be considered. Therefore, the communication provided by URLLC must provide very low latency and very high reliability. For example, a service supporting URLLC must satisfy the air interface latency of less than 0.5 milliseconds and, at the same time, must satisfy the requirement of a packet error rate of 10-5 or less. Therefore, for a service supporting URLLC, the 5G communication system must provide a transmit time interval (TTI) that is smaller than that of other services, and at the same time, design requirements for allocating wide resources in the frequency band to secure the reliability of the communication link may be required.

The three services of the 5G communication system, i.e., eMBB, URLLC, and mMTC, may be multiplexed and transmitted in one system. In this case, different transmission/reception techniques and transmission/reception parameters may be used between services to satisfy different requirements of each service. 5G is not limited to the above-described three services.

Hereinafter, a frame structure of the 5G system will be described in more detail with reference to the drawings.

FIG. 1 is a diagram illustrating a basic structure of a time-frequency domain, which is a radio resource domain in which data or control information is transmitted in a 5G wireless communication system according to an embodiment of the disclosure.

Referring to FIG. 1, the horizontal and vertical axes of FIG. 1 represent the time domain and the frequency domain, respectively. The basic unit of resource in the time domain and frequency domain is a resource element (RE) 101, which may be defined as one orthogonal frequency division multiplexing (OFDM) symbol 102 in the time axis and may be defined as one subcarrier 103 in the frequency axis. In the frequency domain, $N_{sc}^{RB}$ (e.g., 12) consecutive REs may configure one resource block (RB) 104.

Figure 2:
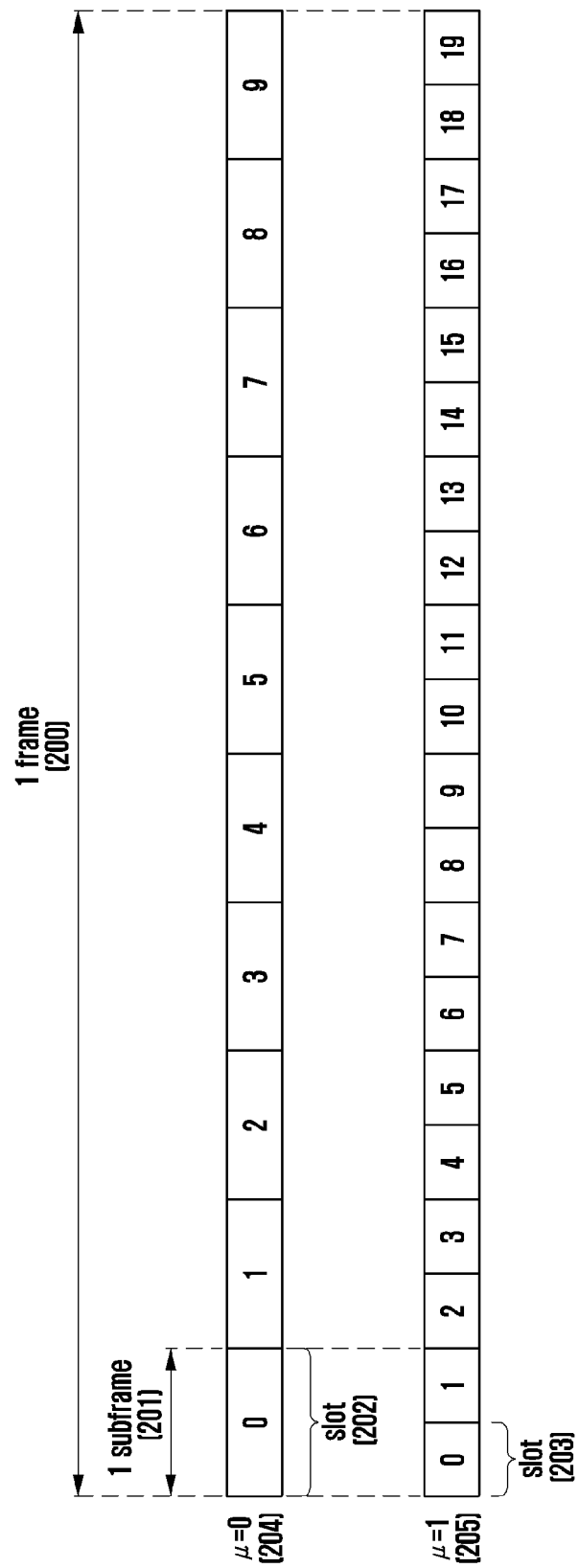
FIG. 2 is a diagram illustrating an example of a slot structure used in a 5G wireless communication system according to an embodiment of the disclosure.

FIG. 2 is a diagram illustrating an example of a slot structure used in a 5G wireless communication system according to an embodiment of the disclosure.

Referring to FIG. 2, an example of a structure of a frame 200, a subframe 201, and a slot 202 is illustrated. One frame 200 may be defined as 10 ms. One subframe 201 may be defined as 1 ms, and in this case, one frame 200 may consist of a total of 10 subframes 201. One slot 202 and 203 may be defined as 14 OFDM symbols (that is, the number of symbols per slot ($N_{symb}^{slot}$)=14). One subframe 201 may consist of one or more slots (202 and 203), and the number of slots (202 and 203) per one subframe 201 may vary according to a set value (u) (204 and 205) for the subcarrier spacing. In the example of FIG. 2, a case where the subcarrier spacing set value μ=0 (204) and μ=1 (205) is illustrated. When μ=0 (204), one subframe 201 may consist of one slot 202, and when μ=1 (205), one subframe 201 may consist of two slots 203. That is, depending on the set value u for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ according to each subcarrier spacing set value u may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in the 5G communication system will be described in detail with reference to the drawings.

Figure 3:
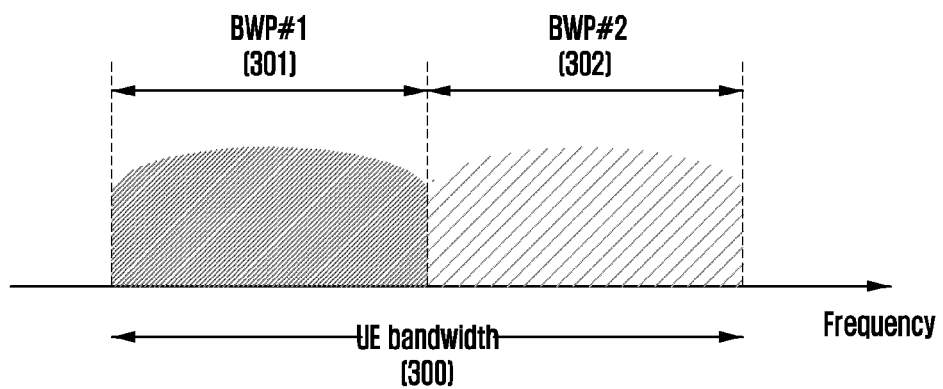
FIG. 3 is a diagram illustrating an example of a configuration for a bandwidth part (BWP) of a 5G wireless communication system according to an embodiment of the disclosure.

FIG. 3 is a diagram illustrating an example of configuring a bandwidth part of a 5G wireless communication system according to an embodiment of the disclosure.

Referring to FIG. 3, an example in which the UE bandwidth 300 is configured to two bandwidth parts, namely, BWP #1 (301) and BWP #2 (302) is illustrated. The base station may configure one or more bandwidth parts to the UE, and may configure information below for each bandwidth part.

TABLE 2

| | |
|---|---|
| BWP ::= | SEQUENCE { |
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

The configuration for the bandwidth part is not limited to the above example, and various parameters related to bandwidth part may be configured to the UE in addition to the above-described configuration information. The configuration information may be transmitted by the base station to the UE through higher layer signaling, for example, radio resource control (RRC) signaling. At least one bandwidth part among one or more configured bandwidth parts may be activated. Whether to activate the configured bandwidth part may be semi-statically transmitted from the base station to the UE through RRC signaling or may be dynamically transmitted through downlink control information (DCI).

According to an embodiment, the UE before the radio resource control (RRC) connection may receive a configuration for an initial bandwidth part (Initial BWP) for the initial connection from the base station through the master information block (MIB). More specifically, in the initial access step, the UE may receive the configuration information for the control resource set (CORESET) through which PDCCH for receiving system information (Remaining System Information; RMSI or System Information Block 1; may correspond to SIB1) required for initial access can be transmitted, and for the search space through the MIB. The control resource set and the search space configured by the MIB may be regarded as identifier (Identity, ID) 0, respectively. The base station may notify the UE of configuration information such as frequency allocation information, time allocation information, and numerology for the control resource set #0 through the MIB. In addition, the base station may notify the UE through the MIB of configuration information on the monitoring period and occasion for the control resource set #0, that is, configuration information on the search space #0. The UE may regard the frequency domain configured as the control resource set #0 obtained from the MIB as an initial bandwidth part for initial access. In this case, the identifier (ID) of the initial bandwidth part may be regarded as 0.

The configuration of the bandwidth part supported by the 5G wireless communication system may be used for various purposes.

According to an embodiment, when the bandwidth supported by the UE is smaller than the system bandwidth, the configuration of the bandwidth part may be used. For example, the base station may configure the frequency position of the bandwidth part (configuration information 2) to the UE, so that the UE may transmit and receive data at a specific frequency position within the system bandwidth.

In addition, according to an embodiment, for the purpose of supporting different numerologies, the base station may configure a plurality of bandwidth parts to the UE. For example, to support both data transmission and reception using a subcarrier spacing of 15 kHz and a subcarrier spacing of 30 kHz to an arbitrary UE, the base station may configure two bandwidth parts as a subcarrier spacing of 15 kHz and 30 kHz, respectively. Different bandwidth parts may be frequency division multiplexed, and when the base station intends to transmit/receive data with a specific subcarrier space, a bandwidth part configured for the corresponding subcarrier space may be activated.

In addition, according to an embodiment, for the purpose of reducing power consumption of the UE, the base station may configure bandwidth parts having different bandwidths to the UE. For example, when the UE supports a very large bandwidth, for example, a bandwidth of 100 MHz and always transmits and receives data using the corresponding bandwidth, very large power consumption may be caused. Particularly, it is very inefficient in terms of power consumption for the UE to monitor the downlink control channel for an unnecessarily large bandwidth of 100 MHz in a situation in which there is no traffic. For reducing power consumption of the UE, the base station may configure a relatively small bandwidth part to the UE, for example, a bandwidth part of 20 MHz. In the absence of traffic, the UE may monitor in a bandwidth part of 20 MHz, and when data are generated, the UE may transmit/receive data using the bandwidth part of 100 MHz according to the indication of the base station.

In the method of configuring the bandwidth part, the UEs before the RRC connection may receive the configuration information for the initial bandwidth part through the master information block (MIB) in the initial access step. More specifically, the UE may receive, from the MIB of the physical broadcast channel (PBCH), a configuration for the control resource set (CORESET) for a downlink control channel through which downlink control information (DCI) scheduling system information block (SIB) may be transmitted. The bandwidth of the control resource set configured through the MIB may be regarded as an initial bandwidth part, and through the configured initial bandwidth part, the UE may receive a physical downlink shared channel (PDSCH) through which the SIB is transmitted. In addition to the purpose of receiving the SIB, the initial bandwidth part may be utilized for other system information (OSI), paging, and random access.

When one or more bandwidth parts are configured for the UE, the base station may indicate the UE to change the bandwidth part by using the bandwidth part indicator field in DCI. As an example in FIG. 3, when the currently activated bandwidth part of the UE is the bandwidth part #1 (301), the base station may indicate to the UE the bandwidth part #2 (302) as a bandwidth part indicator field in DCI, and the UE may change the bandwidth part to the bandwidth part #2 (302) indicated by the bandwidth part indicator field in the received DCI.

As described above, because the DCI-based bandwidth part change can be indicated by DCI scheduling PDSCH or PUSCH (physical uplink shared channel), when the UE receives the request for changing the bandwidth part, the UE may be able to receive or transmit the PDSCH or PUSCH scheduled by the corresponding DCI without unreasonableness in the changed bandwidth part. To this end, the standard specifies the requirements for the delay time (TBWP) required when changing the bandwidth part, and the delay time may be defined, for example, as illustrated in [Table 3] below.

TABLE 3

| μ | NR Slot length (ms) | BWP switch delay $T_{BWP}$ (slots) | |
|---|---|---|---|
| | | Type 1 Note 1 | Type 2 Note 1 |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change delay time may support type 1 or type 2 according to the capability of the UE. The UE may report the supportable bandwidth part delay time type to the base station. When the UE receives the DCI including the bandwidth part change indicator in slot n according to the requirement for the bandwidth part change delay time described above, the UE may complete the change to the new bandwidth part indicated by the bandwidth part change indicator at a time point not later than slot n+TBWP, and transmit and receive the data channel scheduled by the DCI in the changed new bandwidth part.

When the base station intends to schedule the data channel with a new bandwidth part, the time domain resource allocation for the data channel may be determined in consideration of the bandwidth part change delay time (TBWP) of the UE. That is, when the base station schedules a data channel with a new bandwidth part, in a method of determining time domain resource allocation for the data channel, the base station may schedule the corresponding data channel after the bandwidth part change delay time. Accordingly, the UE may not expect that the DCI indicating the bandwidth part change indicates a slot offset (K0 or K2) value smaller than the bandwidth part change delay time (TBWP).

If the UE receives DCI (e.g., DCI format 1_1 or 0_1) indicating a bandwidth part change, the UE may not perform any transmission or reception during the time interval from the third symbol of the slot in which the PDCCH including the corresponding DCI is received to the start point of the slot indicated by the slot offset (K0 or K2) value indicated by the time domain resource allocation indicator field in the corresponding DCI. For example, if the UE receives a DCI indicating a bandwidth part change in slot n, and the slot offset value indicated by the DCI is K, the UE may not perform any transmission or reception from the third symbol of slot n to the previous symbol of slot n+K (i.e., the last symbol of slot n+K−1).

Next, a synchronization signal (SS)/PBCH block in a 5G wireless communication system will be described.

The SS/PBCH block may refer to a physical layer channel block composed of a primary SS (PSS), a secondary SS (SSS), and a PBCH. Specifically, as follows:

PSS: a signal that serves as a reference of downlink time/frequency synchronization and provides some information on cell ID;

SSS: serves as a reference of downlink time/frequency synchronization, and provides remaining cell ID information not provided by PSS. Additionally, the SSS may serve as a reference signal for demodulation of the PBCH;

PBCH: provides essential system information necessary for transmitting and receiving data channel and control channel of the UE. The essential system information may include search space-related control information indicating radio resource mapping information of a control channel, scheduling control information on a separate data channel for transmitting system information, and the like; and SS/PBCH block: the SS/PBCH block consists of a combination of PSS, SSS, and PBCH. One or a plurality of SS/PBCH blocks may be transmitted within 5 ms, and each transmitted SS/PBCH block may be distinguished by an index.

The UE may detect the PSS and SSS in the initial access stage and may decode the PBCH. The UE may obtain the MIB from the PBCH, and may receive the control resource set (CORESET) #0 (which may correspond to a control resource set having a control resource set index of 0) configured therefrom. The UE may perform monitoring on the control resource set #0, assuming that the selected SS/PBCH block and a demodulation reference signal (DMRS) transmitted from the control resource set #0 are QCL (Quasi Co Location). The UE may receive system information as downlink control information transmitted from the control resource set #0. The UE may obtain a random access channel (RACH) related configuration information required for initial access from the received system information. The UE may transmit a physical RACH (PRACH) to the base station in consideration of the selected SS/PBCH index, and the base station receiving the PRACH may obtain information on the SS/PBCH block index selected by the UE. The base station may recognize which block the UE has selected from each of the SS/PBCH blocks and monitors the control resource set #0 related thereto.

Next, downlink control information (DCI) in the 5G communication system will be described in detail.

In the 5G system, scheduling information for uplink data (or physical uplink shared channel, PUSCH) or downlink data (or physical downlink shared channel, PDSCH) may transmitted from a base station to a UE through DCI. The UE may monitor a DCI format for fallback and a DCI format for non-fallback for PUSCH or PDSCH. The DCI format for fallback may consist of a fixed field predefined between the base station and the UE, and the DCI format for non-fallback may include a configurable field.

The DCI may be transmitted through a physical downlink control channel (PDCCH) after channel coding and modulation process. A cyclic redundancy check (CRC) is attached to the DCI message payload, and the CRC may be scrambled with a radio network temporary identifier (RNTI) corresponding to the identity of the UE. Different RNTIs may be used according to the purpose of the DCI message, for example, UE-specific data transmission, a power control command, or a random access response. That is, the RNTI is not explicitly transmitted, but is included in the CRC calculation process and transmitted. Upon receiving the DCI message transmitted over the PDCCH, the UE identifies the CRC using the assigned RNTI, and if the CRC identification result is correct, the UE may recognize that the message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying a transmit power control (TPC) may be scrambled with TPC-RNTI. DCI for scheduling UE-specific PDSCH or PUSCH may be scrambled with cell RNTI (C-RNTI), modulation coding scheme C-RNTI (MCS-C-RNTI), and configured scheduling RNTI (CS-RNTI).

DCI format 0_0 may be used as a fallback DCI for scheduling PUSCH, and in this case, CRC may be scrambled with C-RNTI. DCI format 0_0 in which CRC is scrambled with C-RNTI may include, for example, information as illustrated in [Table 4] below.

TABLE 4

- Identifier for DCI formats - 1 bit
- The value of this bit field is always set to 0, indicating an UL DCI format
- Frequency domain resource assignment -
  $\lceil \log_2(N_{RB}^{UL,BWP} (N_{RB}^{UL,BWP} + 1)/2) \rceil$ bits where $N_{RB}^{UL,BWP}$ is defined in subclause 7.3.1.0
- For PUSCH hopping with resource allocation type 1:
- $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
- $\lceil \log_2(N_{RB}^{UL,BWP} (N_{RB}^{UL,BWP}+1)/2) \rceil - N_{UL\_hop}$ bits provides the frequency domain resource allocation according to Subclause 6.1.2.2.2 of [6, TS 38.214]
- For non-PUSCH hopping with resource allocation type 1:
- $\lceil \log_2(N_{RB}^{UL,BWP} (N_{RB}^{UL,BWP} + 1)/2) \rceil$ bits provides the frequency domain resource allocation according to Subclause 6.1.2.2.2 of [6, TS 38.214]
- Time domain resource assignment - 4 bits as defined in Subclause 6.1.2.1 of [6, TS 38.214]
- Frequency hopping flag - 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator - 1 bit
- Redundancy version - 2 bits as defined in Table 7.3.1.1.1-2
- HARQ process number - 4 bits
- TPC command for scheduled PUSCH (Transmit Power Control command for scheduled PUSCH) - 2 bits as defined in Subclause 7.1.1 of [5, TS 38.213]
- Padding bits, if required.
- UL/SUL indicator (Uplink/Supplementary UL indicator) - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
- If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
- If the UL/SUL indicator is not present in DCI format 0_0 and pucch-Config is configured, the corresponding PUSCH scheduled by the DCI format 0_0 is for the UL or SUL for which high layer parameter pucch-Config is configured.
- If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI for scheduling PUSCH, and in this case, CRC may be scrambled with C-RNTI. DCI format 0_1 in which CRC is scrambled with C-RNTI may include, for example, information as illustrated in [Table 5] below.

TABLE 5

Identifier for DCI formats - 1 bit
The value of this bit field is always set to 0, indicating an UL DCI format
Carrier indicator - 0 or 3 bits, as defined in Subclause 10.1 of [5, TS38.213].
UL/SUL indicator (Uplink/Supplementary UL indicator) - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  $n_{BWP} = n_{BWP,RRC} + 1$ if $n_{BWP,RRC} \leq 3$ in which case the bandwidth part indicator is equivalent to the ascending order of the higher layer parameter BWP-Id;
  otherwise $n_{BWP} = N_{BWP,RRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{UL,BWP}$ is the size of the active UL bandwidth part:
  $N_{RBG}$ bits if only resource allocation type 0 is configured, where $N_{RBG}$ is defined in Subclause 6.1.2.2.1 of [6, TS 38.214],
  $\lceil \log_2(N_{RB}^{UL,BWP}(N_{RB}^{UL,BWP} + 1)/2) \rceil$ bits if only resource allocation type 1 is configured, or
  $\max(\lceil \log\_2 (N\_RB\hat{}(UL,BWP)(N\_RB\hat{}(UL,BWP) + 1)/2) \rceil, N\_RBG) + 1$ bits if both resource allocation type 0 and 1 are configured.
  If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  For resource allocation type 0, the $N_{RBG}$ LSBs provide the resource allocation as defined in Subclause 6.1.2.2.1 of [6, TS 38.214].
  For resource allocation type 1, the $\lceil \log_2(N_{RB}^{UL,RWP}(N_{RB}^{UL,BWP} + 1)/2) \rceil$ LSBs provide the resource allocation as follows:
    For PUSCH hopping with resource allocation type 1:
      $N_{UL_{hop}}$ MSB bits are used to indicate the frequency offset according to Subclause 6.3 of [6, TS 38.214], where $N_{UL_{hop}} = 1$ if the higher layer parameter frequencyHopping OffsetLists contains two offset values and $N_{UL_{hop}} = 2$ if the higher layer parameter frequencyHoppingOffsetLists contains four offset values TABLE 5-continued $\lceil \log_2(N_{RB}^{UL,BWP}(N_{RB}^{UL,BWP} + 1)/2) \rceil - N_{UL_{hop}}$ bits provides the frequency domain resource allocation according to Subclause 6.1.2.2.2 of [6, TS 38.214]
  For non-PUSCH hopping with resource allocation type 1:
$\lceil \log_2(N_{RB}^{UL,BWP}(N_{RB}^{UL,BWP} + 1)/2 \rceil$ bits provides the frequency domain resource allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
  Time domain resource assignment - 0, 1, 2, 3, or 4 bits as defined in Subclause 6.1.2.1 of [6, TS38.214]. The bitwidth for this field is determined as $[\log_2(I)]$bits, where I is the number of entries in the higher layer parameter pusch-TimeDomainAllocationList if the higher layer parameter is configured; otherwise I is the number of entries in the default table.
  Frequency hopping flag - 0 or 1 bit:
  0 bit if only resource allocation type 0 is configured or if the higher layer parameter frequencyHopping is not configured;
  1 bit according to Table 7.3.1.1.1-3 otherwise, only applicable to resource allocation type 1, as defined in Subclause 6.3 of [6, TS 38.214].
  Modulation and coding scheme - 5 bits as defined in Subclause 6.1.4.1 of [6, TS 38.214]
  New data indicator - 1 bit
  Redundancy version - 2 bits as defined in Table 7.3.1.1.1-2
  HARQ process number - 4 bits
  $1^{st}$ downlink assignment index - 1 or 2 bits:
  1 bit for semi-static HARQ-ACK codebook;
  2 bits for dynamic HARQ-ACK codebook.
  $2^{nd}$ downlink assignment index - 0 or 2 bits:
  2 bits for dynamic HARQ-ACK codebook with two HARQ-ACK sub-codebooks;
  0 bit otherwise.
  TPC command for scheduled PUSCH (Transmit Power Control command for scheduled PUSCH) - 2 bits as defined in Subclause 7.1.1 of [5, TS38.213]
  SRS resource indicator (Sounding Reference Signal resource indicator)

$\left\lceil \log_2 \sum_{K=1}^{min(L_{max}, N_{SRS})} \binom{N_{SRS}}{k} \right\rceil \lceil \log_2(N_{SRS}) \rceil$ bits, where $N_{SRS}$ is the number of configured SRS resources in the SRS resource set associated with the higher layer parameter usage of value 'codeBook' or 'nonCodeBook', $\left\lceil \log_2 \left( \sum_{K=1}^{min(L_{max}, N_{SRS})} \binom{N_{SRS}}{k} \right) \right\rceil$ ts according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and
  if UE supports operation with maxMIMO-Layers and the higher layer parameter maxMIMO-Layers of PUSCH-Serving CellConfig of the serving cell is configured, $L_{MAX}$ is given by that parameter
    otherwise, $L_{MAX}$ is given by the maximum number of layers for PUSCH supported by the UE for the serving cell for non-codebook based operation.
  $\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
  Precoding information and number of layers - number of bits determined by the following:
  0 bits if the higher layer parameter txConfig = nonCodeBook;
  0 bits for 1 antenna port and if the higher layer parameter txConfig = codebook;
  4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
  2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;
  2 or 4 bits according to Table7.3.1.1.2-4 for 2 antenna ports, if txConfig = codebook, and according to whether transform precoder is enabled or disabled, and the values of higher layer parameters maxRank and codebookSubset;
  1 or 3 bits according to Table7.3.1.1.2-5 for 2 antenna ports, if txConfig = codebook, and according to whether transform precoder is enabled or disabled, and the values of higher layer parameters maxRank and codebookSubset.
  Antenna ports - number of bits determined by the following
  2 bits as defined by Tables 7.3.1.1.2-6, if transform precoder is enabled, dmrs-Type = 1, and maxLength = 1;
  4 bits as defined by Tables 7.3.1.1.2-7, if transform precoder is enabled, dmrs-Type = 1, and maxLength = 2;
  3 bits as defined by Tables 7.3.1.1.2-8/9/10/11, if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;
  4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information TABLE 5-continued and number of layers field if the higher layer parameter txConfig = codebook;
    4 bits as defined by Tables 7.3.1.1.2-16/17/18/19, if transform precoder is disabled, dmrs-
Type = 2, and maxLength = 1, and the value of rank is determined according to the SRS resource indicator
field if the higher layer parameter txConfig = nonCodebook and according to the Precoding information
and number of layers field if the higher layer parameter txConfig = codebook;
    5 bits as defined by Tables 7.3.1.1.2-20/21/22/23, if transform precoder is disabled, dmrs-
Type = 2, and maxLength = 2, and the value of rank is determined according to the SRS resource indicator
field if the higher layer parameter txConfig = nonCodebook and according to the Precoding information
and number of layers field if the higher layer parameter txConfig = codebook.
where the number of CDM groups without data of values 1, 2, and 3 in Tables 7.3.1.1.2-6 to 7.3.1.1.2-23
refers to CDM groups {0}, {0, 1}, and {0, 1, 2} respectively.
If a UE is configured with both dmrs-UplinkForPUSCH-MappingTypeA and dmrs-UplinkForPUSCH-
MappingTypeB, the bitwidth of this field equals $\max\{x_A, x_B\}$ where $x_A$ is the "Antenna ports" bitwidth
derived according to dmrs-UplinkForPUSCH-MappingTypeA and $x_B$ is the "Antenna ports" bitwidth
derived according to dmrs-UplinkForPUSCH-MappingTypeB. A number of $|x_A - x_B|$ zeros are padded in
the MSB of this field, if the mapping type of the PUSCH corresponds to the smaller value of $x_A$ and $x_B$.
    SRS request - 2 bits as defined by Table 7.3.1.1.2-24 for UEs not configured with
supplementaryUplink in ServingCellConfig in the cell; 3 bits for UEs configured with
supplementaryUplink in ServingCellConfig in the cell where the first bit is the non-SUL/SUL indicator as
defined in Table 7.3.1.1.1-1 and the second and third bits are defined by Table 7.3.1.1.2-24. This bit field
may also indicate the associated CSI-RS according to Subclause 6.1.1.2 of [6, TS 38.214].
    CSI request (Channel State Information request) - 0, 1, 2, 3, 4, 5, or 6 bits determined by higher
layer parameter reportTriggerSize.
    CBG transmission information (CBGTI) (Code Block Group transmission information) - 0 bit
if higher layer parameter codeBlockGroupTransmission for PDSCH is not configured, otherwise, 2, 4, 6,
or 8 bits determined by higher layer parameter maxCodeBlockGroupsPerTransportBlock for PUSCH.
    PTRS-DMRS association (Phase Tracking Reference Signal- Demodulation Reference Signal
association) - number of bits determined as follows
    0 bit if PTRS-UplinkConfig is not configured and transform precoder is disabled, or if transform
precoder is enabled, or if maxRank = 1;
    2 bits otherwise, where Table 7.3.1.1.2-25 and 7.3.1.1.2-26 are used to indicate the association
between PTRS port(s) and DMRS port(s) for transmission of one PT-RS port and two PT-RS ports
respectively, and the DMRS ports are indicated by the Antenna ports field.
If "Bandwidth part indicator" field indicates a bandwidth part other than the active bandwidth part and the
"PTRS-DMRS association" field is present for the indicated bandwidth part but not present for the active
bandwidth part, the UE assumes the "PTRS-DMRS association" field is not present for the indicated
bandwidth part.
    beta_offset indicator - 0 if the higher layer parameter betaOffsets = semiStatic; otherwise 2 bits
as defined by Table 9.3-3 in [5, TS 38.213].
    DMRS sequence initialization (Demodulation Reference Signal sequence initialization) - 0 bit
if transform precoder is enabled; 1 bit if transform precoder is disabled.
    UL-SCH indicator (Uplink-Shared Channel indicator) - 1 bit. A value of "1" indicates UL-SCH
shall be transmitted on the PUSCH and a value of "0" indicates UL-SCH shall not be transmitted on the
PUSCH. Except for DCI format 0_1 with CRC scrambled by SP-CSI-RNTI, a UE is not expected to receive
a DCI format 0_1 with UL-SCH indicator of "0" and CSI request of all zero(s).

[40]

DCI format 1_0 may be used as a fallback DCI for scheduling PDSCH, and in this case, CRC may be scrambled with C-RNTI. DCI format 1_0 in which CRC is scrambled with C-RNTI may include, for example, information as illustrated in [Table 6] below.

TABLE 6

Identifier for DCI formats - 1 bits
The value of this bit field is always set to 1, indicating a DL DCI format
        Frequency domain resource assignment
$\lceil \log_2 (N_{RB}^{DL,BWP} (N_{RB}^{DL,BWP} + 1)/2) \rceil$ bits where $N_{RB}^{DL,BWP}$ is given by subclause 7.3.1.0
If the CRC of the DCI format 1_0 is scrambled by C-RNTI and the "Frequency domain resource assignment" field
are of all ones, the DCI format 1_0 is for random access procedure initiated by a PDCCH order, with all remaining
fields set as follows:
        Random Access Preamble index - 6 bits according to ra-PreambleIndex in Subclause 5.1.2 of
[8, TS38.321]
        UL/SUL indicator (Uplink/Supplementary UL indicator) - 1 bit. If the value of the "Random
Access Preamble index" is not all zeros and if the UE is configured with supplementaryUplink in ServingCellConfig
in the cell, this field indicates which UL carrier in the cell to transmit the PRACH according to Table 7.3.1.1.1-1;
otherwise, this field is reserved
        SS/PBCH index (Synchronization Signal/Physical Broadcast Channel index) - 6 bits. If the value of the "Random
Access Preamble index" is not all zeros, this field indicates the SS/PBCH that shall be used to determine the RACH
occasion for the PRACH transmission; otherwise, this field is reserved.
        PRACH Mask index (Physical Random Access Channel Mask index) - 4 bits. If the value of
the "Random Access Preamble index" is not all zeros, this field indicates the RACH occasion associated with the
SS/PBCH indicated by "SS/PBCH index" for the PRACH transmission, according to Subclause 5.1.1 of [8,
TS38.321]; otherwise, this field is reserved
        Reserved bits - 10 bits
Otherwise, all remaining fields are set as follows:
        Time domain resource assignment - 4 bits as defined in Subclause 5.1.2.1 of [6, TS 38.214]

TABLE 6-continued

VRB-to-PRB mapping (virtual resource block-to- physical resource block mapping) - 1 bit according to Table 7.3.1.2.2-5
    Modulation and coding scheme - 5 bits as defined in Subclause 5.1.3 of [6, TS 38.214]
    New data indicator - 1 bit
    Redundancy version - 2 bits as defined in Table 7.3.1.1.1-2
    HARQ process number - 4 bits
    Downlink assignment index - 2 bits as defined in Subclause 9.1.3 of [5, TS 38.213], as counter DAI
    TPC command for scheduled PUCCH (Transmit Power Control command for scheduled PUSCH) - 2 bits as defined in Subclause 7.2.1 of [5, TS 38.213]
    PUCCH resource indicator - 3 bits as defined in Subclause 9.2.3 of [5, TS 38.213]
    PDSCH-to-HARQ_feedback timing indicator - 3 bits as defined in Subclause 9.2.3 of [5, TS 38.213]

DCI format 1_1 may be used as a non-fallback DCI for scheduling PDSCH, and in this case, CRC may be scrambled with C-RNTI. DCI format 1_1 in which CRC is scrambled with C-RNTI may include, for example, information as illustrated in [Table 7] below.

TABLE 7

Identifier for DCI formats - 1 bits
    The value of this bit field is always set to 1, indicating a DL DCI format
    Carrier indicator - 0 or 3 bits as defined in Subclause 10.1 of [5, TS 38.213].
    Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
        $n_{BWP} = n_{BWP,RRC} + 1$ if $n_{BWP,RRC} \leq 3$ in which case the bandwidth part indicator is equivalent to the ascending order of the higher layer parameter BWP-Id;
        otherwise $n_{BWP} = n_{BWP,RRC}$ in which case the bandwidth part indicator is defined in Table 7.3.1.1.2-1;
If a UE does not support active BWP change via DCI, the UE ignores this bit field.
    Frequency domain resource assignment - number of bits determined by the following, where $N_{RB}^{DL,BWP}$ is the size of the active DL bandwidth part:
        $N_{RBG}$ bits if only resource allocation type 0 is configured, where $N_{RBG}$ is defined in Subclause 5.1.2.2.1 of [6, TS38.214], $\lceil \log_2(N_{RB}^{DL,BWP}(N_{RB}^{DL,BWP} + 1)/2) \rceil$ bits if only resource allocation type 1 is configured, or
        max( $\lceil \log_2 (N\_RB\char`\^(DL, BWP) (N\_RB\char`\^((DL, BWP) + 1)/2) \rceil$, N_RBG) + 1 bits if both resource allocation type 0 and 1 are configured.
    If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    For resource allocation type 0, the $N_{RBG}$ LSBs provide the resource allocation as defined in Subclause 5.1.2.2.1 of [6, TS 38.214].
    For resource allocation type 1, the $\lceil \log_2(N_{RB}^{DL,BWP}(N_{RB}^{DL,BWP} + 1)/2) \rceil$ LSBs provide the resource allocation as defined in Subclause 5.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
    Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
    VRB-to-PRB mapping (virtual resource block-to- physical resource block mapping) - 0 or 1 bit:
        0 bit if only resource allocation type 0 is configured or if interleaved VRB-to-PRB mapping is not configured by high layers;
        1 bit according to Table 7.3.1.2.2-5 otherwise, only applicable to resource allocation type 1, as defined in Subclause 7.3.1.6 of [4, TS 38.211].
    PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
    Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
    ZP CSI-RS trigger (Zero Power Channel State Information Reference Signal trigger) - 0, 1, or 2 bits as defined in Subclause 5.1.4.2 of [6, TS 38.214]. The bitwidth for this field is determined as $\lceil \log_2 (n_{ZP} + 1) \rceil$ bits, where $n_{ZP}$ is the number of aperiodic ZP CSI-RS resource sets configured by higher layer.
For transport block 1:
    Modulation and coding scheme - 5 bits as defined in Subclause 5.1.3.1 of [6, TS 38.214]
    New data indicator - 1 bit
    Redundancy version - 2 bits as defined in Table 7.3.1.1.1-2
For transport block 2 (only present if maxNrofCodeWordsScheduledByDCI equals 2):
    Modulation and coding scheme - 5 bits as defined in Subclause 5.1.3.1 of [6, TS 38.214]
    New data indicator - 1 bit
    Redundancy version - 2 bits as defined in Table 7.3.1.1.1-2

TABLE 7-continued

If "Bandwidth part indicator" field indicates a bandwidth part other than the active bandwidth part and the value of maxNrofCodeWordsScheduledByDCI for the indicated bandwidth part equals 2 and the value of maxNrofCode WordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

HARQ process number - 4 bits
Downlink assignment index - number of bits as defined in the following
4 bits if more than one serving cell are configured in the DL and the higher layer parameter pdsch-HARQ-ACK-Codebook=dynamic, where the 2 MSB bits are the counter DAI and the 2 LSB bits are the total DAI;
2 bits if only one serving cell is configured in the DL and the higher layer parameter pdsch-HARQ-ACK-Codebook=dynamic, where the 2 bits are the counter DAI;
0 bits otherwise.
TPC command for scheduled PUCCH (Transmit Power Control command for scheduled PUSCH) - 2 bits as defined in Subclause 7.2.1 of [5, TS 38.213]
PUCCH resource indicator - 3 bits as defined in Subclause 9.2.3 of [5, TS 38.213]
PDSCH-to-HARQ_feedback timing indicator - 0, 1, 2, or 3 bits as defined in Subclause 9.2.3 of [5, TS 38.213]. The bitwidth for this field is determined as $\lceil \log_2 (I) \rceil$ bits, where / is the number of entries in the higher layer parameter dl-DataToUL-ACK.
Antenna port(s) - 4, 5, or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{p\}_0, ..., p_{v-1}\}$ } shall be determined according to the ordering of DMRS port(s) given by Tables 7.3.1.2.2-1/2/3/4. If a UE is configured with both dmrs-DownlinkForPDSCH-MappingTypeA and dmrs-DownlinkForPDSCH-MappingTypeB, the bitwidth of this field equals max{$x_A$, $x_B$}where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of |$x_A$ − $x_B$ |zeros are padded in the MSB of this field, if the mapping type of the PDSCH corresponds to the smaller value of $x_A$ and $x_B$.
Transmission configuration indication - 0 bit if higher layer parameter tci-PresentInDCI is not enabled; otherwise 3 bits as defined in Subclause 5.1.5 of [6, TS38.214].
If "Bandwidth part indicator" field indicates a bandwidth part other than the active bandwidth part,
if the higher layer parameter tci-PresentInDCI is not enabled for the CORESET used for the PDCCH carrying the DCI format 1_1,
the UE assumes tci-PresentInDCI is not enabled for all CORESETs in the indicated bandwidth part;
otherwise,
the UE assumes tci-PresentInDCI is enabled for all CORESETs in the indicated bandwidth part.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CBG transmission information (CBGTI) (Code Block Group transmission information) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCode WordsScheduledByDCI for the PDSCH.
CBG flushing out information (CBGFI) (Code Block Group flushing out information) - 1 bit if higher layer parameter codeBlockGroupFlushIndicator is configured as "TRUE", 0 bit otherwise.
DMRS sequence initialization (Demodulation Reference Signal sequence initialization) - 1 bit.

Hereinafter, a method of allocating time domain resources for a data channel in a 5G wireless communication system will be described.

The base station may configure the table for time domain resource allocation information for the physical downlink shared channel (PDSCH) and the physical uplink shared channel (PUSCH) through higher layer signaling (e.g., RRC signaling) to the UE. A table consisting of a maximum of 16 (maxNrofDL-Allocations) entries may be configured for the PDSCH, and a table consisting of a maximum of 16 (maxNrofUL-Allocations) entries may be configured for the PUSCH. The time domain resource allocation information may include, for example, PDCCH-to-PDSCH slot timing (corresponds to the time interval in slot units between the time when the PDCCH is received and the time when the PDSCH scheduled by the received PDCCH is transmitted, denoted by K0) or PDCCH-to-PUSCH slot timing (corresponds to the time interval in slot units between the time when the PDCCH is received and the time when the PUSCH scheduled by the received PDCCH is transmitted, denoted by K2), information on the position and length of a start symbol in which a PDSCH or PUSCH is scheduled in the slot, mapping type of PDSCH or PUSCH etc. For example, information such as [Table 8] and [Table 9] below may be notified from the base station to the UE.

TABLE 8

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
   k0                                                  INTEGER(0..32)
OPTIONAL, -- Need S
   (PDCCH-to-PDSCH timing, per slot)
     mappingType                    ENUMERATED {typeA, typeB},
   (PDSCH mapping type)

TABLE 8-continued

PDSCH-TimeDomainResourceAllocationList information element startSymbolAndLength       INTEGER (0..127)
(Start symbol and length of PDSCH)
}

TABLE 9

PUSCH-TimeDomainResourceAllocation information element

PUSCH-TimeDomainResourceAllocationList ::= SEQUENCE (SIZE(1..maxNrofUL-Allocations)) OF PUSCH-
TimeDomainResourceAllocation
PUSCH-TimeDomainResourceAllocation ::= SEQUENCE {
  k2                              INTEGER(0..32)            OPTIONAL, -- Need S
  (PDCCH-to-PDSCH timing, per slot)
  mappingType                     ENUMERATED {typeA, typeB},
  (PUSCH mapping type)
  startSymbolAndLength            INTEGER (0..127)
  (Start symbol and length of PDSCH)
}

The base station may notify the UE of one of the entries in the table for the time domain resource allocation information through L1 signaling (e.g., DCI). For example, the base station may indicate with the "time domain resource allocation" field in DCI. The UE may obtain time domain resource allocation information for the PDSCH or PUSCH based on the DCI received from the base station. Hereinafter, a method of allocating a frequency domain resource for a data channel in a 5G wireless communication system will be described. In the 5G wireless communication system, two types, resource allocation type 0 and resource allocation type 1 are supported as a method of indicating frequency domain resource allocation information for a physical downlink shared channel (PDSCH) and a physical uplink shared channel (PUSCH).

1. Resource allocation Type 0

RB allocation information may be notified from the base station to the UE in the form of a bitmap for a resource block group (RBG). In this case, the RBG may be composed of a set of consecutive VRBs (Virtual RBs), and the size P (nominal RBG size P) of the RBG may be determined based on a value configured by a higher layer parameter (rbg-Size) and a size value of the bandwidth part defined in the [Table 10] below.

TABLE 10

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

The total number ($N_{RBG}$) of RBGs of bandwidth part i of size $N_{BWP,i}^{size}$ may be defined as follows: $N_{RBG}= \lceil N_{BWP,i}^{size}+(N_{BWP,i}^{start} \bmod P))/P \rceil$, where the size of the first RBG is $RBG_0^{size}=P-N_{BWP,i}^{start} \bmod P$, the size of last RBG is, $RBG_{last}^{size}=(N_{BWP,i}^{start}+N_{BWP,i}^{size}) \bmod P$ if $(N_{BWP,i}^{start}+N_{BWP,i}^{size}) \bmod P>0$ and P otherwise, the size of all other RBGs is P.

Each bit of the $N_{RBG}$ bit-sized bitmap may correspond to each RBG. RBGs may be indexed in the order of increasing frequency, starting from the lowest frequency position of the bandwidth part. For $N_{RBG}$ RBGs in the bandwidth part, RBG #0 to RBG #($N_{RBG}$-1) may be mapped from MSB to LSB of the RBG bitmap. When a specific bit value in the bitmap is 1, the UE may determine that the RBG corresponding to the bit value is allocated, and when a specific bit value in the bitmap is 0, the UE may determine that the RBG corresponding to the bit value is not allocated.

2. Resource Allocation Type 1

RB allocation information may be notified from the base station to the UE as information on the start position and length of the continuously allocated VRBs. In this case, interleaving or non-interleaving may be additionally applied to consecutively allocated VRBs. The resource allocation field of resource allocation type 1 may consist of a resource indication value (RIV), and the RIV may be composed of a starting point ($RB_{start}$) of a VRB and a length of a continuously allocated RB ($L_{RBs}$). More specifically, the RIV in the bandwidth part of the $N_{BWP}^{size}$ size may be defined as follows:

if $(L_{RBs} - 1) \leq \lfloor N_{BWP}^{size} / 2 \rfloor$ then
  RIV = $N_{BWP}^{size}(L_{RBs} - 1) + RB_{start}$
else
  RIV = $N_{BWP}^{size}(N_{BWP}^{size} - L_{RBs} + 1) + (N_{BWP}^{size} - 1 - RB_{start})$
where $L_{RBs} \geq 1$ and may not exceed $N_{BWP}^{size} - RB_{start}$.

The base station may configure the resource allocation type to the UE through higher layer signaling (for example, the upper layer parameter resourceAllocation may be configured to one of resourceAllocationType0, resourceAllocationType1, or dynamicSwitch). If the UE is configured with both resource allocation types 0 and 1 (or, in the same way, if the upper layer parameter resourceAllocation is configured to dynamicSwitch), the bit corresponding to the most significant bit (MSB) of the field indicating resource allocation in the DCI format indicating scheduling may indicate whether resource allocation type 0 or resource allocation type 1. In addition, based on the indicated resource allocation type, resource allocation information may be indicated through the remaining bits except for the bit corresponding to the MSB, and based on this, the UE may interpret the resource allocation field information of the DCI field. If the UE is configured with one of resource allocation type 0 or resource allocation type 1 (or, in the same way, if the upper layer parameter resourceAllocation is configured to one of the values of resourceAllocationType0 or resourceAllocationType1), resource allocation information may be indicated based on the resource allocation type in which a field indicating resource allocation in the DCI format indicating scheduling is configured, and based on this, the UE may interpret the resource allocation field information of the DCI field.

Hereinafter, a modulation and coding scheme (MCS) used in a 5G wireless communication system will be described in detail.

In 5G, a plurality of MCS index tables are defined for PDSCH and PUSCH scheduling. Which MCS table the UE assumes among the plurality of MCS tables may be configured or indicated through higher layer signaling or L1 signaling from the base station to the UE, or an RNTI value assumed by the UE during PDCCH decoding.

MCS index table 1 for PDSCH and CP-OFDM-based PUSCH (or PUSCH without transform precoding) may be as illustrated in [Table 11] below.

TABLE 11

Table 5.1.3.1-1: MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for PDSCH and CP-OFDM-based PUSCH (or PUSCH without transform precoding) may be as illustrated in [Table 12] below.

TABLE 12

Table 5.1.3.1-2: MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for PDSCH and CP-OFDM based PUSCH (or PUSCH without transform precoding) may be as illustrated in [Table 13] below.

TABLE 13

Table 5.1.3.1-3: MCS index table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |

TABLE 13-continued

Table 5.1.3.1-3: MCS index table 3 for PDSCH

| MCS Index $I_{MCS}$ | Modulation Order $Q_m$ | Target code Rate R × [1024] | Spectral efficiency |
|---|---|---|---|
| 29 | 2 | reserved | |
| 30 | 4 | reserved | |
| 31 | 6 | reserved | |

MCS index table 1 for DFT-s-OFDM-based PUSCH (or PUSCH with transform precoding) may be as illustrated in [Table 14] below.

TABLE 14

Table 6.1.4.1-1: MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 0  | q | 240/q | 0.2344 |
| 1  | q | 314/q | 0.3066 |
| 2  | 2 | 193 | 0.3770 |
| 3  | 2 | 251 | 0.4902 |
| 4  | 2 | 308 | 0.6016 |
| 5  | 2 | 379 | 0.7402 |
| 6  | 2 | 449 | 0.8770 |
| 7  | 2 | 526 | 1.0273 |
| 8  | 2 | 602 | 1.1758 |
| 9  | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table 2 for DFT-s-OFDM based PUSCH (or PUSCH with transform precoding) may be as illustrated in [Table 15] below.

TABLE 15

Table 6.1.4.1-2: MCS Index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 60/q  | 0.0586 |
| 1 | q | 80/q  | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |

TABLE 15-continued

Table 6.1.4.1-2: MCS Index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

The MCS index table for PUSCH to which transform precoding or discrete Fourier transform (DFT) precoding is applied and 64 QAM may be as illustrated in [Table 16] below.

TABLE 16

| MCS Index $I_{MCS}$ | Modulation Order $Q_m$ | Target code Rate R × 1024 | Spectral efficiency |
|---|---|---|---|
| 0  | q | 240/q | 0.2344 |
| 1  | q | 314/q | 0.3066 |
| 2  | 2 | 193 | 0.3770 |
| 3  | 2 | 251 | 0.4902 |
| 4  | 2 | 308 | 0.6016 |
| 5  | 2 | 379 | 0.7402 |
| 6  | 2 | 449 | 0.8770 |
| 7  | 2 | 526 | 1.0273 |
| 8  | 2 | 602 | 1.1758 |
| 9  | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

The MCS index table for PUSCH to which transform precoding or discrete Fourier transform (DFT) precoding is applied and 64 QAM may be as illustrated in [Table 17] below.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

Hereinafter, a downlink control channel in a 5G wireless communication system will be described in more detail with reference to the drawings.

Figure 4:
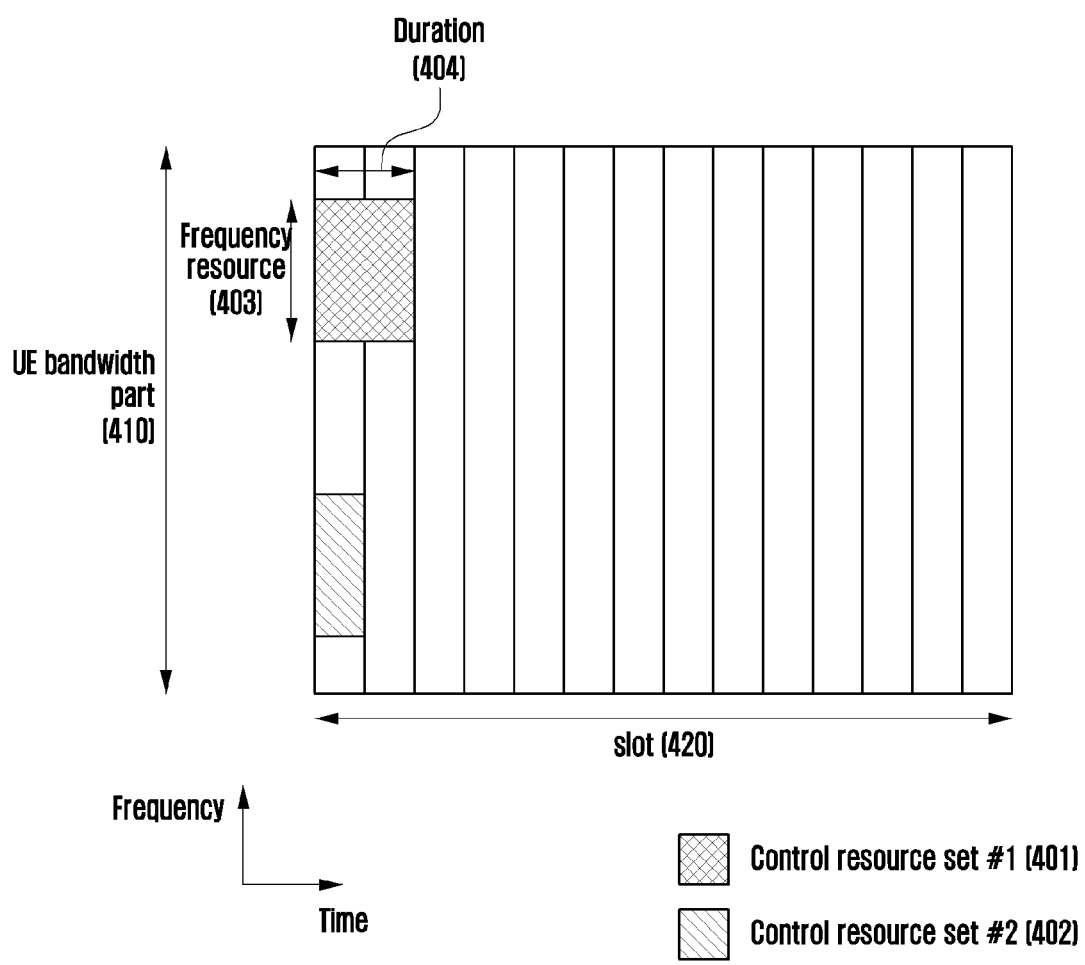
FIG. 4 is a diagram illustrating an example of a control resource set through which a downlink control channel is transmitted in a 5G wireless communication system according to an embodiment of the disclosure.

FIG. 4 is a diagram illustrating an example of a control resource set (CORESET) in which a downlink control channel is transmitted in a 5G wireless communication system according to an embodiment of the disclosure.

Referring to FIG. 4, a UE bandwidth part 410 may be configured on the frequency axis and two control sets, resource set #1 401 and control resource set #2 402, may be configured in one slot 420 on the time axis. The control resource sets 401 and 402 may be configured to a specific frequency resource 403 within the entire UE bandwidth part 410 on the frequency domain. In addition, control resource sets 401 and 402 may be configured to one or a plurality of OFDM symbols on the time axis, and this may be defined as a control resource set duration 404. Referring to the example illustrated in FIG. 4, control resource set #1 401 is configured to a control resource set duration of 2 symbols, and control resource set #2 402 is configured to a control resource set duration of 1 symbol.

The control resource set in the above-described 5G wireless communication system may be configured by the base station to the UE through higher layer signaling (e.g., system information, master information block (MIB), and radio resource control (RRC) signaling). Configuring the control resource set to the UE refers to providing information such as a control resource set identifier (Identity), a frequency position of the control resource set, and a symbol length of the control resource set, etc. For example, the information such as [Table 18] below may be provided.

TABLE 18

| | |
|---|---|
| ControlResourceSet ::= | SEQUENCE { |
| -- Corresponds to L1 parameter 'CORESET-ID' | |
| controlResourceSetId | ControlResourceSetId, |
| (Control Resource Set Identity)) | |
| frequencyDomainResources | BIT STRING (SIZE (45)), |
| (Frequency Domain Resource allocation information) | |
| duration | INTEGER (1..maxCoReSetDuration), |
| (Time Domain Resource allocation information) | |
| cce-REG-MappingType | CHOICE { |
| interleaved | SEQUENCE { |
| reg-BundleSize | ENUMERATED {n2, n3, n6}, |
| precoderGranularity | ENUMERATED {sameAsREG-bundle, allContiguousRBs}, |
| interleaverSize | ENUMERATED {n2, n3, n6} |
| shiftIndex | |
| INTEGER(0..maxNrofPhysicalResourceBlocks-1) OPTIONAL | |
| (Interleaver Shift)) | |
| }, | |
| nonInterleaved | NULL |
| }, | |
| tci-StatesPDCCH | SEQUENCE(SIZE (1..maxNrofTCI-StatesPDCCH)) OF TCI-StateId OPTIONAL, |
| (QCL configuration information) | |
| tci-PresentInDCI | ENUMERATED {enabled} OPTIONAL, -- Need S |
| } | |

In [Table 18], the tci-StatesPDCCH (hereinafter, named as transmission configuration indication (TCI) state) configuration information may include information on one or more synchronization signals (SS)/physical broadcast channel (PBCH) block indexes in a Quasi co-located (QCL) relationship with DMRS transmitted in a corresponding control resource set or CSI-RS (channel state information reference signal) indexes.

Figure 5:
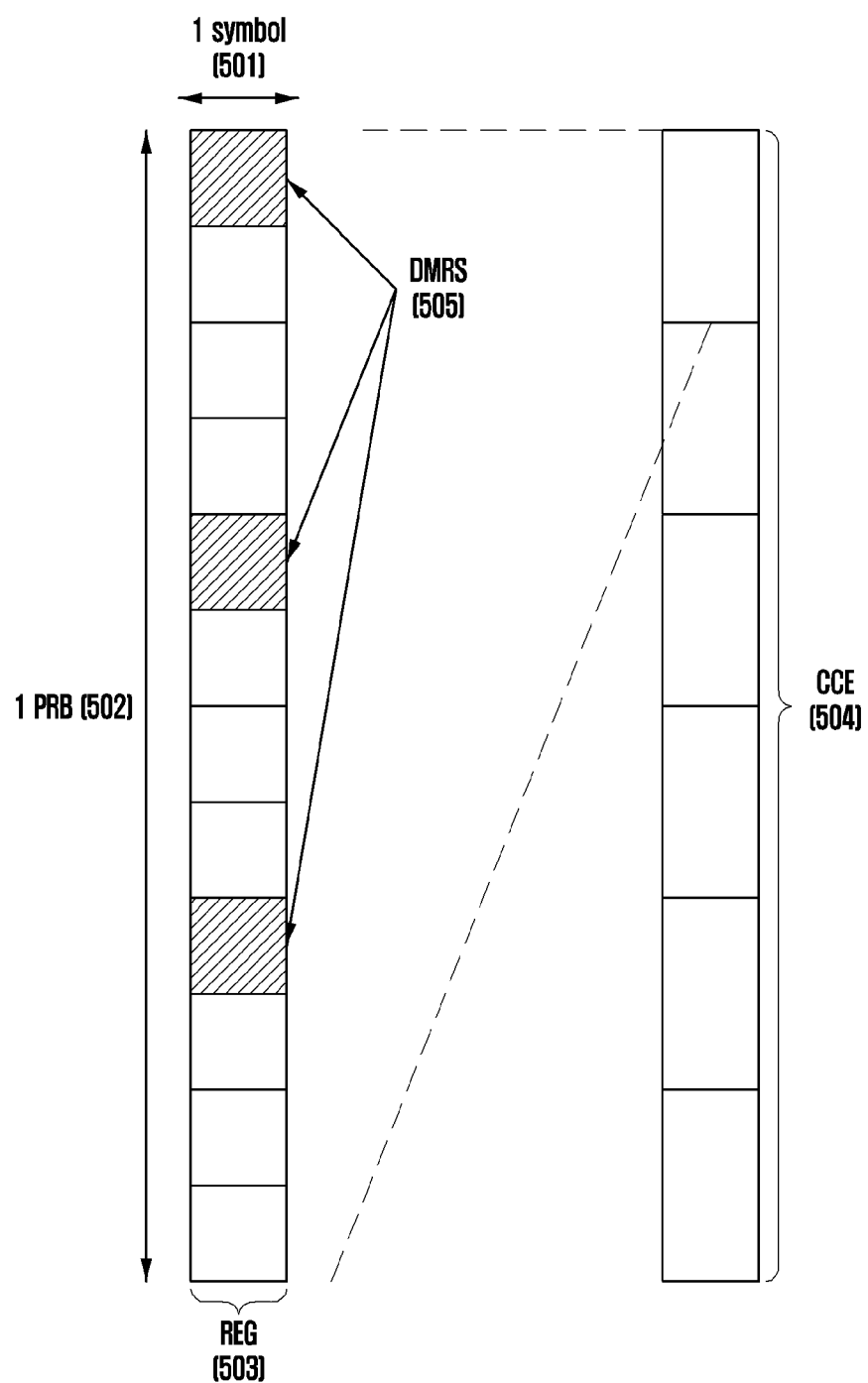
FIG. 5 is a diagram illustrating a structure of a downlink control channel of a 5G wireless communication system according to an embodiment of the disclosure.

FIG. 5 is a diagram illustrating a structure of a downlink control channel of a 5G wireless communication system according to an embodiment of the disclosure. In other words, FIG. 5 is a diagram illustrating an example of a basic unit of time and frequency resources constituting a downlink control channel that can be used in a 5G wireless communication system.

Referring to FIG. 5, the basic unit of time and frequency resources constituting the control channel may be referred to as a resource element group (REG) 503, and the REG 503 may be defined as 1 OFDM symbol 501 on the time axis and 1 physical resource block (PRB) 502 on the frequency axis, that is, 12 subcarriers. The base station may configure a downlink control channel allocation unit by concatenating the REG 503.

As illustrated in FIG. 5, when the basic unit to which a downlink control channel is allocated in a 5G wireless communication system is referred to as a control channel element (CCE) 504, one CCE 504 may be composed of a plurality of REGs 503. Describing the REG 503 illustrating in FIG. 5 as an example, REG 503 may be composed of 12 REs, and if 1 CCE 504 is composed of 6 REGs 503, 1 CCE 504 may be composed of 72 REs. When the downlink control resource set is configured, the corresponding area may be composed of a plurality of CCEs 504, and a specific downlink control channel is mapped to one or more CCEs 504 according to the aggregation level (AL) in the control region and transmitted. The CCEs 504 in the control resource set are divided by numbers, and in this case, numbers of the CCEs 504 may be assigned according to a logical mapping method.

The basic unit of the downlink control channel, i.e., REG 503 illustrated in FIG. 5, may include both REs to which DCI is mapped and areas to which a demodulation reference signal (DMRS) which is a reference signal (RS) for decoding the REs, is mapped. As in FIG. 5, 3 DMRSs 505 may be transmitted within one REG 503. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs. The UE needs to detect a signal without figuring out information on the downlink control channel, for blind decoding, a search space indicating a set of CCEs is defined. Because the search space is a set of downlink control channel candidates consisting of CCEs that the UE may attempt to decode on a given aggregation level, and there are several aggregation levels that make one bundle with 1, 2, 4, 8 or 16 CCEs, the UE may have a plurality of search spaces. The search space set may be defined as a set of search spaces in all configured aggregation levels.

The search space may be classified into a common search space and a UE-specific search space. A certain group of UEs or all UEs may examine the common search space of the PDCCH to receive cell-common control information such as dynamic scheduling for system information or a paging message. For example, the UEs may receive the PDSCH scheduling allocation information for transmission of the SIB including the operator information of the cell by examining the common search space of the PDCCH. In the case of the common search space, because a certain group of UEs or all UEs must receive the PDCCH, the common search space may be defined as a set of promised CCEs. The scheduling assignment information for the UE-specific PDSCH or PUSCH may be received by examining the UE-specific search space of the PDCCH. The UE-specific search space may be UE-specifically defined as a function of the UE's identity and various system parameters.

In the 5G wireless communication system, the parameter for the search space for the PDCCH may be configured from the base station to the UE through higher layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the UE. For example, the parameter for the search space for the PDCCH may include the information such as the [Table 19] below.

TABLE 19

```
SearchSpace ::=                    SEQUENCE {
  -- Identity of the search space. SearchSpaceId = 0 identifies the SearchSpace configured via PBCH
(MIB) or ServingCellConfigCommon.
  searchSpaceId                    SearchSpaceId,
  controlResourceSetId             ControlResourceSetId,
  monitoringSlotPeriodicityAndOffset   CHOICE {
  (monitoring slot level periodicity)
    sl1                            NULL,
    sl2                            INTEGER (0..1),
    sl4                            INTEGER (0..3),
    sl5                            INTEGER (0..4),
    sl8                            INTEGER (0..7),
    sl10                           INTEGER (0..9),
    sl16                           INTEGER (0..15),
    sl20                           INTEGER (0..19)
  }
        OPTIONAL,
  duration(monitoring length) INTEGER (2..2559)
    monitoringSymbolsWithinSlot          BIT STRING (SIZE (14))
        OPTIONAL,
  (monitoring symbols within slot)
    nrofCandidates                 SEQUENCE {
```

TABLE 19-continued

```
(number of PDCCH candidates by aggregation level)
    aggregationLevel1        ENUMERATED {n0, n1, n2, n3, n4, n5, n6, n8},
    aggregationLevel2        ENUMERATED {n0, n1, n2, n3, n4, n5, n6, n8},
    aggregationLevel4        ENUMERATED {n0, n1, n2, n3, n4, n5, n6, n8},
    aggregationLevel8        ENUMERATED {n0, n1, n2, n3, n4, n5, n6, n8},
    aggregationLevel16       ENUMERATED {n0, n1, n2, n3, n4, n5, n6, n8}
},
searchSpaceType              CHOICE {
    -- Configures this search space as common search space (CSS) and DCI formats to monitor.
    common                   SEQUENCE {
    (common search space)
}
    ue-Specific              SEQUENCE {
    (UE-specific search space)
        -- Indicates whether the UE monitors in this USS for DCI formats 0-0 and 1-0 or for formats
0-1 and 1-1.
        formats              ENUMERATED {formats0-0-And-1-0,
formats0-1-And-1-1},
        ...
    }
```

According to the configuration information, the base station may configure one or a plurality of search space sets to the UE. According to an embodiment, the base station may configure the search space set #1 and the search space set #2 to the UE, in search space set 1, the UE may be configured to monitor DCI format A scrambled with X-RNTI in a common search space, and in search space set 2, the UE may be configured to monitor DCI format B scrambled with Y-RNTI in the UE-specific search space. According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space. In the common search space, a combination of the following DCI format and RNTI may be monitored. Of course, it is not limited to the following examples:

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI;

DCI format 2_2 with CRC scrambled by TPC-PUSCH-RNTI, TPC-PUCCH-RNTI; and/or

DCI format 2_3 with CRC scrambled by TPC-SRS-RNTI;

In the UE-specific search space, a combination of the following DCI format and RNTI may be monitored. Of course, it is not limited to the following examples:

DCI format 0_0/1_0 with CRC scrambled by C-RNTI, CS-RNTI, TC-RNTI; and/or

DCI format 1_0/1_1 with CRC scrambled by C-RNTI, CS-RNTI, TC-RNTI;

The specified RNTIs may follow the definitions and uses below:

(1) C-RNTI (cell RNTI): UE-specific PDSCH scheduling purpose;

(2) MCS-C-RNTI (modulation coding scheme C-RNTI): UE-specific PDSCH scheduling purpose;

(3) TC-RNTI (temporary cell RNTI): UE-specific PDSCH scheduling purpose;

(4) CS-RNTI (configured scheduling RNTI): Semi-statically configured UE-specific PDSCH scheduling purpose;

(5) RA-RNTI (random access RNTI): PDSCH scheduling purpose in the random access phase;

(6) P-RNTI (paging RNTI): PDSCH scheduling purpose for which paging is transmitted;

(7) SI-RNTI (system information RNTI): PDSCH scheduling purpose in which system information is transmitted;

(8) INT-RNTI (interruption RNTI): Used to indicate whether PDSCH is puncturing;

(9) TPC-PUSCH-RNTI (transmit power control for PUSCH RNTI): Used to indicate power control command for PUSCH;

(10) TPC-PUCCH-RNTI (transmit power control for PUCCH RNTI): Used to indicate power control command for PUCCH; and

(11) TPC-SRS-RNTI (transmit power control for SRS RNTI): Used to indicate power control command for SRS.

The above specified DCI formats may follow the definition such as the [Table 20] below.

TABLE 20

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G wireless communication system, the search space of the aggregation level L in the control resource set p and the search space set s may be expressed as the following equation:

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \qquad \text{[Equation 1]}$$

where

L: aggregation level;

nCI: carrier index;

NCCE,p: the total number of CCEs present in the control region p;

$n_{\mu s,f}$: slot index;

M(L)p.s.max: the number of PDCCH candidates of aggregation level L;

msnCI=0, ..., M(L)p.s.max−1: PDCCH candidate index of aggregation level L;

i=0, ..., L−1;

$Y_{p,n_s,f}^{\mu} = (A_p \cdot Y_{p,n_s,f-1}^{\mu}) \mod D$, $Y_{p,-1} = n_{RNTI} \neq 0$, A0=39827, A1=39829, A2=39839, D=65537; and nRNTI: UE identity;

The Y_(p,nμs,f) value may correspond to 0 in the case of a common search space.

The Y_(p,nμs,f) value may correspond to a value that changes depending on the UE's identity (C-RNTI or ID configured for the UE by the base station) and the time index in the UE-specific search space.

NR has a CSI framework for instructing the base station to measure and report channel state information (CSI) of the UE. The CSI framework of NR may be composed of at least two elements, resource setting and report setting, and the report setting may refer to at least one ID of the resource setting to have a connection relationship with each other.

According to an embodiment of the disclosure, the resource setting may include information related to a reference signal (RS) for the UE to measure channel state information. The base station may configure at least one resource setting to the UE. As an example, the base station and the UE may transmit and receive signaling information as illustrated in [Table 21] to deliver information about the resource setting.

TABLE 21

```
-- ASN1START
-- TAG-CSI-RESOURCECONFIG-START
CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList          SEQUENCE (SIZE (1..maxNrofNZP-CSI-RS-ResourceSetsPerConfig)) OF NZP-CSI-RS-ResourceSetId
OPTIONAL, -- Need R
            csi-SSB-ResourceSetList             SEQUENCE (SIZE (1..maxNrofCSI-SSB-ResourceSetsPerConfig)) OF CSI-SSB-ResourceSetId
OPTIONAL -- Need R
        },
        csi-IM-ResourceSetList      SEQUENCE (SIZE (1..maxNrofCSI-IM-ResourceSetsPerConfig)) OF
CSI-IM-ResourceSetId
    },
    bwp-Id                      BWP-Id,
    resourceType                ENUMERATED { aperiodic, semiPersistent, periodic },
    ...
}
-- TAG-CSI-RESOURCECONFIG-STOP
-- ASN1STOP
```

In [Table 21], signaling information CSI-ResourceConfig includes information about each resource setting. According to the signaling information, each resource setting may include a resource setting index (csi-ResourceConfigId), a BWP index (bwp-ID), a time axis transmission setting of a resource (resourceType), or a resource set list (csi-RS-ResourceSetList) including at least one resource set. The time axis transmission setting of the resource may be set to aperiodic transmission, semi-persistent transmission, or periodic transmission. The resource set list may be a set including a resource set for channel measurement or a set including a resource set for interference measurement. When the resource set list is a set including a resource set for channel measurement, each resource set may include at least one resource, which may be an index of a CSI reference signal (CSI-RS) resource or a synchronization/broadcast channel block (SS/PBCH block, SSB). When the resource set list is a set including a resource set for interference measurement, each resource set may include at least one interference measurement resource (CSI interference measurement, CSI-IM).

As an example, when the resource set includes a CSI-RS, the base station and the UE may transmit and receive signaling information as illustrated in [Table 22] to deliver information about the resource set.

TABLE 22

```
-- ASN1START
-- TAG-NZP-CSI-RS-RESOURCESET-START
NZP-CSI-RS-ResourceSet ::=          SEQUENCE {
            nzp-CSI-ResourceSetId       NZP-CSI-RS-ResourceSetId,
            nzp-CSI-RS-Resources        SEQUENCE (SIZE (1..maxNrofNZP-CSI-RS-
ResourcesPerSet)) OF NZP-CSI-RS-ResourceId,
            repetition                  ENUMERATED { on, off }
OPTIONAL,   -- Need S
            aperiodicTriggeringOffset   INTEGER(0..6)
OPTIONAL,   -- Need S
            trs-Info                    ENUMERATED {true}
OPTIONAL,   -- Need R
    ...
}
-- TAG-NZP-CSI-RS-RESOURCESET-STOP
-- ASN1STOP
```

In [Table 22], signaling information NZP-CSI-RS-ResourceSet includes information about each resource set. According to the signaling information, each resource set may include information about at least a resource set index (nzp-CSI-ResourceSetId) or an index set of the included CSI-RS (nzp-CSI-RS-Resources), and may include information about the spatial domain transmission filter (repetition) of the included CSI-RS resource or a part of whether the tracking purpose of the included CSI-RS resource is used (trs-Info).

The CSI-RS may be the most representative reference signal included in the resource set. The base station and the UE may transmit/receive signaling information as illustrated in [Table 23] in order to deliver information about the CSI-RS resource.

TABLE 23

```
-- ASN1START
-- TAG-NZP-CSI-RS-RESOURCE-START
NZP-CSI-RS-Resource ::= SEQUENCE {
    nzp-CSI-RS-ResourceId       NZP-CSI-RS-ResourceId,
    resourceMapping             CSI-RS-ResourceMapping,
    powerControlOffset          INTEGER (-8..15),
    powerControlOffsetSS        ENUMERATED{db-3, db0, db3, db6}
OPTIONAL, -- Need R
    scramblingID                ScramblingId,
```

TABLE 23-continued

```
    periodicityAndOffset        CSI-ResourcePeriodicityAndOffset
OPTIONAL, -- Cond PeriodicOrSemiPersistent
    qcl-InfoPeriodicCSI-RS      TCI-StateId
OPTIONAL, -- Cond Periodic
    ...
}
-- TAG-NZP-CSI-RS-RESOURCE-STOP
-- ASN1STOP
```

In [Table 23], signaling information NZP-CSI-RS-Resource includes information on each CSI-RS. Information included in the signaling information NZP-CSI-RS-Resource may have the following meanings:

nzp-CSI-RS-ResourceId: CSI-RS resource index;
resourceMapping: resource mapping information of CSI-RS resource;
powerControlOffset: ratio between PDSCH EPRE (Energy Per RE) and CSI-RS EPRE;
powerControlOffsetSS: ratio between SS/PBCH block EPRE and CSI-RS EPRE;
scramblingID: scrambling index of CSI-RS sequence;
periodicityAndOffset: CSI-RS resource transmission period and slot offset (slot offset); and
qcl-InfoPeriodicCSI-RS: If the CSI-RS is a periodic CSI-RS, TCI-state information.

The resourceMapping included in the signaling information NZP-CSI-RS-Resource indicates resource mapping information of CSI-RS resource, and may include frequency resource resource element (RE) mapping, the number of ports, symbol mapping, CDM type, frequency resource density, and frequency band mapping information. Through this, the number of ports, frequency resource density, CDM type, and time-frequency axis RE mapping that can be configured may have values determined in one of the rows of [Table 24] below.

TABLE 24

| Row | Ports X | Density $\rho$ | cdm-Type | $(\bar{k}, \bar{l})$ | CDM group index j | k' | l' |
| --- | --- | --- | --- | --- | --- | --- | --- |
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0) (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | | FD-CDM2 | $(k_0, l_0), (k_1, l_0), (k_2, l_0), (k_3, l_0),$ $(k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0)$ $(k_0, l_0 + 1), (k_1, l_0 + 1), (k_2, l_0 + 1),$ $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_2, l_0 + 1), (k_2, l_0 + 1)$ $(k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1),$ $(k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1 2, 31. |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1),$ $(k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

[Table 24] illustrates the frequency resource density, CDM type, frequency axis and time axis start position of CSI-RS component RE pattern $(\bar{k}, \bar{l})$, and the number of frequency axis REs (k') and the number of time axis REs (l') of the CSI-RS component RE pattern configurable according to the number of CSI-RS ports (X). The aforementioned CSI-RS component RE pattern may be a basic unit constituting a CSI-RS resource. Through Y=1+max (k') REs on the frequency axis and Z=1+max (l') REs on the time axis, the CSI-RS component RE pattern may be composed of YZ REs. When the number of CSI-RS ports is 1 port, the CSI-RS RE location may be designated without limitation of subcarriers in the physical resource block (PRB), and the CSI-RS RE location may be designated by a 12-bit bitmap. When the number of CSI-RS ports is {2, 4, 8, 12, 16, 24, 32} ports and Y=2, a CSI-RS RE location may be designated for every two subcarriers in the PRB, and the CSI-RS RE location may be designated by a 6-bit bitmap. When the number of CSI-RS ports is 4 ports and Y=4, a CSI-RS RE location may be designated for every four subcarriers in the PRB, and the CSI-RS RE location may be designated by a 3-bit bitmap. Similarly, an RE position on the time axis may be designated by a bitmap of a total of 14 bits. At this time, according to the Z value according to [Table 24], it is possible to change the length of the bitmap as in frequency positioning, but the principle is similar to the above-mentioned description, and thus the overlapping description will be omitted below.

According to an embodiment of the disclosure, the report setting may have a connection relationship with each other by referring to at least one ID of the resource setting, and the resource setting(s) having a connection relationship with the report setting provides configuration information including information about a reference signal for channel information measurement. When the resource setting(s) having a connection relationship with the report setting is used for channel information measurement, the measured channel information may be used for reporting channel information according to the reporting method set in the report setting having a connection relationship.

According to an embodiment of the disclosure, the report setting may include configuration information related to a CSI reporting method. For example, the base station and the UE may transmit and receive signaling information as illustrated in [Table 25] in order to deliver information on report setting.

TABLE 25

```
-- ASN1START
-- TAG-CSI-REPORTCONFIG-START
CSI-ReportConfig ::=            SEQUENCE {
   reportConfigId              CSI-ReportConfigId,
   carrier                     ServCellIndex                   OPTIONAL, -- Need S
   resourcesForChannelMeasurement    CSI-ResourceConfigId,
   csi-IM-ResourcesForInterference   CSI-ResourceConfigId      OPTIONAL, -- Need R
   nzp-CSI-RS-ResourcesForInterference   CSI-ResourceConfigId  OPTIONAL, -- Need R
   reportConfigType            CHOICE {
      periodic                 SEQUENCE {
         reportSlotConfig      CSI-ReportPeriodicityAndOffset,
         pucch-CSI-ResourceList      SEQUENCE (SIZE (1..maxNrofBWPs)) OF PUCCH-CSI-Resource
      },
      semiPersistentOnPUCCH    SEQUENCE {
         reportSlotConfig      CSI-ReportPeriodicityAndOffset,
         pucch-CSI-ResourceList      SEQUENCE (SIZE (1.maxNrofBWPs)) OF PUCCH-CSI-Resource
      },
      semiPersistentOnPUSCH    SEQUENCE {
         reportSlotConfig      ENUMERATED {sl5, sl10, sl20, sl40, sl80, sl160, sl320},
         reportSlotOffsetList  SEQUENCE (SIZE (1.. maxNrofUL-Allocations)) OF INTEGER(0..32),
         p0alpha               P0-PUSCH-AlphaSetId
      },
      aperiodic                SEQUENCE {
         reportSlotOffsetList  SEQUENCE (SIZE (1..maxNrofUL-Allocations)) OF INTEGER(0..32)
      }
   },
   reportQuantity              CHOICE {
      none                     NULL,
      cri-RI-PMI-CQI           NULL,
      cri-RI-i1                NULL,
      cri-RI-i1-CQI            SEQUENCE {
         pdsch-BundleSizeForCSI      ENUMERATED {n2, n4}       OPTIONAL    -- Need S
      },
      cri-RI-CQI               NULL,
      cri-RSRP                 NULL,
      ssb-Index-RSRP           NULL,
      cri-RI-LI-PMI-CQI        NULL
   },
   reportFreqConfiguration     SEQUENCE {
      cqi-FormatIndicator      ENUMERATED { widebandCQI, subbandCQI }    OPTIONAL,    -- Need R
      pmi-FormatIndicator      ENUMERATED { widebandPMI, subbandPMI }    OPTIONAL,    -- Need R
      csi-ReportingBand        CHOICE {
         subbands3             BIT STRING(SIZE(3)),
         subbands4             BIT STRING(SIZE(4)),
         subbands5             BIT STRING(SIZE(5)),
         subbands6             BIT STRING(SIZE(6)),
         subbands7             BIT STRING(SIZE(7)),
         subbands8             BIT STRING(SIZE(8)),
         subbands9             BIT STRING(SIZE(9)),
         subbands10            BIT STRING(SIZE(10)),
         subbands11            BIT STRING(SIZE(11)),
         subbands12            BIT STRING(SIZE(12)),
         subbands13            BIT STRING(SIZE(13)),
         subbands14            BIT STRING(SIZE(14)),
         subbands15            BIT STRING(SIZE(15)),
         subbands16            BIT STRING(SIZE(16)),
         subbands17            BIT STRING(SIZE(17)),
         subbands18            BIT STRING(SIZE(18)),
         ...,
         subbands19-v1530      BIT STRING(SIZE(19))
      }                        OPTIONAL -- Need S
   }
   OPTIONAL,                   -- Need R
   timeRestrictionForChannelMeasurements    ENUMERATED {configured, notConfigured},
   timeRestrictionForInterferenceMeasurements    ENUMERATED {configured, notConfigured},
   codebookConfig              CodebookConfig              OPTIONAL,    -- Need R
   dummy                       ENUMERATED {n1, n2}
```

TABLE 25-continued

```
OPTIONAL,                       -- Need R
    groupBasedBeamReporting                     CHOICE {
        enabled                                     NULL,
        disabled                                    SEQUENCE {
                        nrofReportedRS                  ENUMERATED {n1, n2, n3, n4}
OPTIONAL                        -- Need S
        }
    },
    cqi-Table                           ENUMERATED {table 1, table2, table3, spare1}
OPTIONAL,                       -- Need R
    subbandSize                         ENUMERATED {value 1, value2},
    non-PMI-PortIndication              SEQUENCE (SIZE (1..maxNrofNZP-CSI-RS-ResourcesPerConfig)) OF
PortIndexFor8Ranks OPTIONAL,            -- Need R
    ...,
    [[
    semiPersistentOnPUSCH-v1530         SEQUENCE {
        reportSlotConfig-v1530              ENUMERATED {sl4, sl8, sl16}
    }
OPTIONAL                        -- Need R
    ]]
}
```

In [Table 25], signaling information CSI-ReportConfig includes information about each report setting. Information included in the signaling information CSI-ReportConfig may have the following meaning:
reportConfigId: report setting index;
carrier: serving cell index;
resourcesForChannelMeasurement: resource setting index for channel measurement that has a connection relationship with report setting;
csi-IM-ResourcesForInterference: resource setting index having a CSI-IM resource for interference measurement having a connection relationship with the report setting;
nzp-CSI-RS-ResourcesForInterference: resource setting index having a CSI-RS resource for interference measurement having a connection relationship with the report setting;
reportConfigType: indicates the time axis transmission configuration and transmission channel of the channel report, and may have aperiodic transmission or semi-persistent physical uplink control channel (PUCCH) transmission or semi-periodic PUSCH transmission or periodic transmission configuration;
reportQuantity: indicates the type of channel information to be reported, and may have the type ("cri-RI-PMI-CQI," "cri-RI-i1," ""cri-RI-i1-CQI." "cri-RI-CQI," "cri-RSRP," "ssb-Index-RSRP,", and "cri-RI-LI-PMI-CQI") of channel information when the channel report is not transmitted ("none") and when the channel report is transmitted. Here, the element included in the type of channel information refers to channel quality indicator (CQI), precoding metric indicator (PMI), CSI-RS resource indicator (CRI), SS/PBCH block resource indicator (SSBRI), layer indicator (LI), rank indicator (RI), and/or L1-reference signal received power (RSRP);
reportFreqConfiguration: indicates whether the reported channel information includes only information about the entire band or information about each subband, and when information on each subband is included, it is possible to have configuration information for the subband that includes channel information;
timeRestrictionForChannelMeasurements: whether or not time axis restrictions on the reference signal for channel measurement among the reference signals referenced by the reporting channel information;
timeRestrictionForInterferenceMeasurements: whether the time axis is restricted for the reference signal for interference measurement among the reference signals referenced by the reporting channel information;
codebookConfig: codebook information referenced by reporting channel information;
groupBasedBeamReporting: whether beam grouping of channel reporting;
cqi-Table: CQI table index referenced by reporting channel information;
subbandSize: index indicating the subband size of channel information; and
non-PMI-PortIndication: port mapping information referred to when reporting non-PMI channel information.

When the base station instructs the channel information report through higher layer signaling or L1 signaling, the UE may perform the channel information report with reference to the above configuration information included in the indicated report setting.

The base station may instruct the UE to report channel state information (CSI) through higher layer signaling including radio resource control (RRC) signaling or medium access control (MAC) control element (CE) signaling, or L1 signaling (e.g., common DCI, group-common DCI, and UE-specific DCI).

For example, the base station may instruct the UE through an aperiodic channel information report (CSI report) through higher layer signaling or DCI using DCI format 0_1. The base station configures a plurality of CSI report trigger states including parameters for aperiodic CSI report of the UE or parameters for CSI report through higher layer signaling. A parameter for a CSI report or a CSI report trigger state may include a set including a slot interval or a possible slot interval between PDCCH including DCI and physical uplink control channel (PUCCH) including CSI report or PUSCH, a reference signal ID for channel state measurement, types of channel information included, and the like. When the base station instructs some of the plurality of CSI report trigger states through DCI to the UE, the UE reports channel information according to the CSI report setting of the report setting configuration in the indicated CSI report trigger state. The time axis resource allocation of PUCCH or PUSCH including the CSI report of the UE may be indicated through a slot interval with PDCCH indicated through DCI, a start symbol and symbol length indication in a slot for time axis resource allocation of PUSCH, and part or all of the PUCCH resource instruction. For example, the position of the slot in which the PUSCH including the CSI report of the UE is transmitted may be indicated through the slot interval with the PDCCH indicated through DCI, and it is possible to indicate the start symbol and the symbol length in the slot through the time domain resource assignment field of the DCI described above.

For example, the base station may instruct a semi-persistent CSI report to the UE through higher layer signaling or DCI using DCI format 0_1. The base station may activate or deactivate the semi-persistent CSI report through higher layer signaling including MAC CE signaling or DCI scrambled with SP-CSI-RNTI. When the semi-persistent CSI report is activated, the UE may periodically report channel information according to the configured slot interval. When the semi-persistent CSI report is deactivated, the UE may stop reporting the activated periodic channel information. The base station configures a plurality of CSI report trigger states including parameters for semi-persistent CSI report or parameters for semi-persistent CSI report of the UE through higher layer signaling. A parameter for a CSI report, or a CSI report trigger state may include a set including a slot interval or a possible slot interval between a PDCCH including a DCI indicating a CSI report and a PUCCH or a PUSCH including a CSI report, a slot interval between the slot in which higher layer signaling indicating the CSI report is activated and the PUCCH or PUSCH including the CSI report, a slot interval period of CSI report, types of channel information included, and the like. When the base station activates some of the multiple CSI report trigger states or some of the multiple report settings to the UE through higher layer signaling or DCI, the UE may report channel information according to a report setting included in the indicated CSI report trigger state or a CSI report setting configured in an activated report setting. The time axis resource allocation of PUCCH or PUSCH including the CSI report of the UE may be indicated through a slot interval period of CSI report, a slot interval with a slot in which upper layer signaling is activated or a slot interval with a PDCCH indicated through DCI, a start symbol and symbol length indication in a slot for time axis resource allocation of PUSCH, and a part or all of the PUCCH resource instruction. For example, the position of the slot in which the PUSCH including the CSI report of the UE is transmitted may be indicated through the slot interval with the PDCCH indicated through DCI, and it is possible to indicate the start symbol and the symbol length in the slot through the time domain resource assignment field of DCI format 0_1 described above. For example, the location of the slot in which the PUCCH including the CSI report of the UE is transmitted may be indicated through a slot interval period of the CSI report configured through higher layer signaling and a slot interval between the slot in which higher layer signaling is activated and the PUCCH including the CSI report, and it is possible to indicate the start symbol and the symbol length in the slot through the start symbol and the symbol length allocated to the PUCCH resource configured through higher layer signaling.

For example, the base station may instruct the UE through a periodic CSI report through higher layer signaling. The base station may activate or deactivate the periodic CSI report through higher layer signaling including RRC signaling. When the periodic CSI report is activated, the UE may periodically report channel information according to the configured slot interval. When the periodic CSI report is deactivated, the UE may stop reporting the activated periodic channel information. The base station configures the report setting including the parameters for the periodic CSI report of the UE through higher layer signaling. The parameters for the CSI report may include, the slot interval between the slot in which higher layer signaling indicating the CSI report is activated and the PUCCH or PUSCH including the CSI report, the slot interval period of CSI report, the reference signal ID for channel state measurement, types of channel information included, and the like. The time axis resource allocation of PUCCH or PUSCH including the CSI report of the UE may be indicated through a slot interval period of CSI report, a slot interval with a slot in which upper layer signaling is activated or a slot interval with a PDCCH indicated through DCI, a start symbol and symbol length indication in a slot for time axis resource allocation of PUSCH, and a part or all of the PUCCH resource instruction. For example, the location of the slot in which the PUCCH including the CSI report of the UE is transmitted is indicated through a slot interval period of CSI report set through higher layer signaling, and a slot interval between the slot in which upper layer signaling is activated and the PUCCH including the CSI report, and it is possible to indicate the start symbol and the symbol length in the slot through the start symbol and the symbol length allocated to the PUCCH resource configured through higher layer signaling.

When the base station instructs the UE to use an aperiodic CSI report or a semi-persistent CSI report through DCI, the base station may determine whether the UE can perform a valid channel report through the indicated CSI report in consideration of the channel calculation time required for the CSI report (CSI computation time). For the aperiodic CSI report or semi-persistent CSI report indicated through DCI, the UE may perform a valid CSI report from the uplink symbol after the Z symbol after the last symbol included in the PDCCH including the DCI indicating the CSI report ends, and the above-mentioned Z symbol may vary according to the numerology of the downlink bandwidth part corresponding to the PDCCH including the DCI indicating the CSI report, the numerology of the uplink bandwidth part corresponding to the PUSCH transmitting the CSI report, and types or characteristics (report quantity, frequency band granularity, reference signal port number, codebook type, etc.) of channel information reported in the CSI report. In other words, in order for a certain CSI report to be determined as a valid CSI report (for a corresponding CSI report to be a valid CSI report), uplink transmission of the CSI report including timing advance must not be performed before the Zref symbol. In this case, the Zref symbol is an uplink symbol that starts a cyclic prefix (CP) after a time $T_{proc,CSI}=(Z)(2048+144)\cdot\kappa 2^{-\mu}\cdot T_C$ from the moment the last symbol of the triggering PDCCH ends. The detailed value of Z follows the description below, $T_C=1/(\Delta f_{max}\cdot N_f)$, $\Delta f_{max}=480\cdot 10^3$ Hz, $N_f=4096$, $\kappa=64$, and $\mu$ are numerology. In this case, $\mu$ may be promised to use the one that gives rise to the largest value among ($\mu_{PDCCH}$, $\mu_{CSI-RS}$, $\mu_{UL}$), and $\mu_{PDCCH}$ is a subcarrier interval used for PDCCH transmission, $\mu_{CSI-RS}$ is a subcarrier interval used for CSI-RS transmission, and $\mu_{UL}$ is a subcarrier interval of an uplink channel used for uplink control information (UCI) transmission for CSI reporting. As another example, it is possible that $\mu$ is promised to use the one that gives rise to the largest $T_{proc,CSI}$ value among ($\mu_{PDCCH}$, $\mu_{UL}$). For definitions of $\mu_{PDCCH}$ and $\mu_{UL}$, refer to the description above. For convenience of description in the future, satisfying the above condition is named as satisfying CSI reporting validity condition 1.

In addition, when the reference signal for channel measurement for an aperiodic CSI report indicated to the UE through DCI is an aperiodic reference signal, after the last symbol including the reference signal ends, a valid CSI report may be performed from the uplink symbol after the Z' symbol, and the aforementioned Z' symbol may vary according to the numerology of the downlink bandwidth part corresponding to the PDCCH including the DCI indicating the CSI report, the numerology of the bandwidth corresponding to the reference signal for channel measurement for the CSI report, the numerology of the uplink bandwidth part corresponding to the PUSCH transmitting the CSI report, and types or characteristics (report quantity, frequency band granularity, reference signal port number, codebook type, etc.) of channel information reported in the CSI report. In other words, in order for a certain CSI report to be determined as a valid CSI report (for a corresponding CSI report to be a valid CSI report), the uplink transmission of the CSI report including timing advance must not be performed before the Zref symbol.

In this case, the Zref symbol is an uplink symbol that starts a cyclic prefix (CP) after a time $T'_{proc,CSI}(Z')(2048+144) \cdot \kappa \cdot 2^{-\mu} \cdot T_C$ from the moment when the last symbol of the aperiodic CSI-RS or the aperiodic CSI-IM triggered by the triggering PDCCH ends. Here, the detailed value of Z' follows the description below, $T_C=1/(\Delta f_{max} \cdot N_f)$, $\Delta f_{max}=480 \cdot 10^3$ Hz, $N_f=4096$, $\kappa=64$ and $\mu$ are numerology. In this case, $\mu$ may be promised to use the one that gives rise to the largest value among ($\mu_{PDCCH}$, $\mu_{CSI-RS}$, $\mu_{UL}$) and $\mu_{PDCCH}$ is a subcarrier interval used for PDCCH transmission, $\mu_{CSI-RS}$ is a subcarrier interval used for CSI-RS transmission, and $\mu_{UL}$ is a subcarrier interval of an uplink channel used for uplink control information (UCI) transmission for CSI reporting. As another example, it is possible that $\mu$ is promised to use the one that gives rise to the largest $T_{proc,CSI}$ value among ($\mu_{PDCCH}$, $\mu_{UL}$). For definitions of $\mu_{PDCCH}$ and $\mu_{UL}$, refer to the description above. For convenience of description in the future, satisfying the above condition is named as satisfying CSI reporting validity condition 2.

If the base station instructs the UE to have an aperiodic CSI report for the aperiodic reference signal through DCI, the UE may perform a valid CSI report from the first uplink symbol that satisfies all of a time point after the Z symbol after the end of the last symbol included in the PDCCH including the DCI indicating the CSI report, and a time point after the Z' symbol after the end of the last symbol including the reference signal. That is, in the case of aperiodic CSI reporting based on an aperiodic reference signal, both CSI reporting validity conditions 1 and 2 must be satisfied to determine a valid CSI report.

If the CSI report time indicated by the base station does not satisfy the CSI computation time requirement, the UE may determine that the CSI report is invalid and may not consider updating the channel information state for the CSI report.

Z and Z' symbols for the above-described CSI computation time calculation follow [Table 26] and [Table 27] below. For example, when the channel information reported by the CSI report includes only wideband information and the number of ports of the reference signal is 4 or less, there is one reference signal resource, and the codebook type is "typeI-SinglePanel" or the type of channel information to be reported is "cri-RI-CQI," the Z and Z' symbols follow the Z1 and Z'1 values in [Table 27]. Hereinafter, this is referred to as delay requirement 2. In addition, when the PUSCH including the CSI report does not include TB or HARQ-ACK and the CPU occupation of the UE is 0, the Z and Z' symbols follow the Z1 and Z'1 values in [Table 26], and this is referred to as delay requirement 1. The above-described CPU occupation has been described in detail below. In addition, when the report quantity is "cri-RSRP" or "ssb-Index-RSRP," the Z, Z' symbols follow the Z3 and Z'3 values in [Table 27]. X1, X2, X3, and X4 of [Table 27] refer to the UE capability for the beam report time, and KB1 and KB2 of [Table 27] refer to the capability of the UE for the beam change time. When the type or characteristic of the channel information reported in the above-described CSI report does not correspond to, the Z and Z' symbols follow the Z2 and Z'2 values in [Table 27].

TABLE 26

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 27

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 + KB_1$) | $X_3$ |
| 3 | 97 | 85 | 152 | 140 | min(97, $X_4 + KB_2$) | $X_4$ |

When the base station instructs the UE an aperiodic/semi-persistent/periodic CSI report, a CSI reference resource may be configured in units of slots to determine a reference time of a reference signal for measuring channel information reported in a CSI report. For example, when it is instructed to transmit CSI report #X in uplink slot n', the CSI reference resource of CSI report #X transmitted in uplink slot n' may be defined as downlink slot n-nCSI-ref. The downlink slot n is calculated as $n=\lfloor n' \cdot 2^{\mu DL}/2^{\mu UL} \rfloor$ considering the downlink and uplink numerology μDL and μUL. When CSI report #0 transmitted in uplink slot n' is a semi-persistent or periodic CSI report, nCSI-ref, which is the slot interval between downlink slot n and CSI reference resource, follows $n_{CSI-ref}=4 \cdot 2^{\mu DL}$ if a single CSI-RS resource is connected to the CSI report, and follows $n_{CSI-ref}=5 \cdot 2^{\mu DL}$ if multiple CSI-RS resources are connected to the CSI report according to the number of CSI-RS resources for channel measurement. When the CSI report #0 transmitted in the uplink slot n' is an aperiodic CSI report, it is calculated as $n_{CSI-ref}=\lceil Z'/N_{symb}^{slot} \rceil$ considering the CSI computation time Z' for channel measurement. As described above, $N_{symb}^{slot}$ is the number of symbols included in one slot, and $N_{symb}^{slot}=14$ is assumed in NR.

When the base station instructs the UE to transmit a certain CSI report in uplink slot n' through higher layer signaling or DCI, the UE may report CSI by performing a channel measurement or an interference measurement for CSI-RS resource, CSI-IM resource, SSB resource transmitted no later than the CSI reference resource slot of the CSI report transmitted in uplink slot n' among CSI-RS resources or CSI-IM or SSB resources associated with the CSI report. CSI-RS resource, CSI-IM resource, or SSB resource associated with the CSI report may refer to CSI-RS resource, CSI-IM resource, and SSB resource included in the resource set configured in the resource setting referenced by the report setting for the CSI report of the UE configured through higher layer signaling, or CSI-RS resource, CSI-IM resource, and SSB resource referenced by the CSI report trigger state including parameters for the CSI report, or CSI-RS resource, CSI-IM resource, and SSB resource indicated by the ID of the reference signal (RS) set.

In the embodiments of the disclosure, the CSI-RS/CSI-IM/SSB occasion refers to a transmission time of CSI-RS/CSI-IM/SSB resource(s) determined by higher layer configuration or a combination of higher layer configuration and DCI triggering. As an example, for the semi-persistent or periodic CSI-RS resource, the slot to be transmitted is determined according to the slot period and the slot offset set by higher layer signaling, and according to resource mapping information (resourceMapping), in-slot transmission symbol(s) is determined with reference to one of the in-slot resource mapping methods of [Table 24]. As another example, for the aperiodic CSI-RS resource, the slot to be transmitted is determined according to the slot offset with the PDCCH including the DCI indicating the channel report set by higher layer signaling, and according to resource mapping information (resourceMapping), in-slot transmission symbol(s) is determined with reference to one of the in-slot resource mapping methods of [Table 24].

The above-described CSI-RS occasion may be determined by considering the transmission time of each CSI-RS resource independently or comprehensively considering the transmission time of one or more CSI-RS resource(s) included in the resource set, and accordingly, the following two interpretations are possible for the CSI-RS occasion according to each resource set configuration:

Interpretation 1-1: from the start time of the earliest symbol in which one specific resource is transmitted to the end time of the latest symbol among the one or more CSI-RS resources included in the resource set(s) set in the resource setting referenced by the report setting configured for the CSI report; and Interpretation 1-2: from the start time of the earliest symbol at which the CSI-RS resource transmitted at the earliest point is transmitted to the end time of the latest symbol at which the CSI-RS resource transmitted at the latest time point is transmitted among all CSI-RS resources included in the resource set(s) set in the resource setting referenced by the report setting configured for the CSI report.

Hereinafter, in the embodiments of the disclosure, it is possible to be individually applied in consideration of both interpretations of the CSI-RS occasion. In addition, it is possible to consider both interpretations like the CSI-RS occasion for the CSI-IM occasion and the SSB occasion, but the principle is similar to the above-mentioned description, so the overlapping description will be omitted below.

In the embodiments of the disclosure, CSI-RS/CSI-IM/SSB occasion' for CSI report #X transmitted in "uplink slot n" refers to a set of CSI-RS occasions, CSI-IM occasions, and SSB occasions that are not later than the CSI reference resource of CSI report #X transmitted in uplink slot n' among the CSI-RS resource, CSI-IM resource, CSI-RS occasion of the SSB resource.

In the embodiments of the disclosure, two interpretations for the latest CSI-RS/CSI-IM/SSB occasion' among CSI-RS/CSI-IM/SSB occasions for CSI report #X transmitted in "uplink slot n" are possible as follows:

Interpretation 2-1: a set of occasions including the latest SSB occasion among SSB occasions for CSI report #0 transmitted in the latest CSI-IM occasion and uplink slot n' among the latest CSI-RS occasion among CSI-RS occasions for CSI report #X transmitted in uplink slot n' and CSI-RS occasion for CSI report #X transmitted in uplink slot n'; and Interpretation 2-2: the latest occasion among all CSI-RS occasion, CSI-IM occasion, and SSB occasion for CSI report #X transmitted in uplink slot n'.

Hereinafter, in the embodiments of the disclosure, considering both interpretations for "the latest CSI-RS/CSI-IM/SSB occasion" among CSI-RS/CSI-IM/SSB occasions for CSI report #X transmitted in "uplink slot n," it is possible to apply both interpretations individually. In addition, when considering the above-mentioned two interpretations (Interpretation 1-1 and Interpretation 1-2) for CSI-RS occasion, CSI-IM occasion, and SSB occasion, in the embodiments of the disclosure, "The latest CSI-RS/CSI-IM/SSB occasion among CSI-RS/CSI-IM/SSB occasions for CSI report #X transmitted in uplink slot n'" may be individually applied in consideration of all four different interpretations (apply Interpretation 1-1 and Interpretation 2-1, apply Interpretation 1-1 and Interpretation 2-2, apply Interpretation 1-2 and Interpretation 2-1, and apply Interpretation 1-2 and Interpretation 2-2).

The base station may instruct the CSI report in consideration of the amount of channel information that the UE can simultaneously calculate for the CSI report, that is, the number of channel information calculation units (CPUs) of the UE. If the number of channel information calculation units that the UE can simultaneously calculate is $N_{CPU}$ the UE may not expect a CSI report instruction from a base station requiring more calculation of channel information, or may not consider updating channel information that requires more calculation of channel information than $N_{CPU}$. $N_{CPU}$ may be configured to be reported by the UE to the base station through higher layer signaling, or may be configured by the base station through higher layer signaling.

It is assumed that the CSI report instructed by the base station to the UE occupies part or all of the CPU for channel information calculation among the total number $N_{CPU}$ of channel information that the UE can calculate at the same time. For each CSI report, for example, if the number of channel information calculation units required for CSI report n (n=0,1,2, . . . ,N−1) is $O_{CPU}^{(n)}$, the number of channel information calculation units required for N CSI reports may be $$\sum_{n=0}^{N-1} O_{CPU}^{(n)}.$$

The channel information calculation unit required for each reportQuantity configured in the CSI report may be configured as illustrated in [Table 28] below.

TABLE 28

- $O_{CPU}^{(n)} = 0$ : When the reportQuantity configured in the CSI report is set to 'none' and trs-Info is configured in the CSI-RS resource set connected to the CSI report
- $O_{CPU}^{(n)} = 1$ : When the reportQuantity configured in the CSI report is set to 'none', 'cri-RSRP', or 'ssb-Index-RSRP', and trs-Info is not configured in the CSI-RS resource set connected to the CSI report TABLE 28-continued

- When reportQuantity configured in CSI report is set to 'cri-RI-PMI-CQI', 'cri-RI-i1', 'cri-RI-i1-CQI', 'cri-RI-CQI', or 'cri-RI-LI-PMI-CQI'
>> $O_{CPU}^{(n)} = N_{CPU}$ : When an aperiodic CSI report is triggered and the CSI report is not multiplexed with one or both of TB / HARQ-ACK. When the CSI report is wideband CSI and corresponds to a maximum of 4 CSI-RS ports, corresponds to a single resource without a CRI report, and the codebookType corresponds to 'typeI-SinglePanel' or reportQuantity corresponds to 'cri-RI-CQI' (this case is the case corresponding to the delay requirement 1 described above, and it can be seen as a case in which the UE calculates and reports CSI quickly using all available CPUs)
>> $O_{CPU}^{(n)} = K_s$ : In all cases other than the above. $K_s$ indicates the number of CSI-RS resources in the CSI-RS resource set for channel measurement When the number of channel information calculations required by the UE for multiple CSI reports at a specific time point is greater than the number of channel information calculation units that the UE can calculate at the same time, the UE may not consider updating channel information for some CSI reports. Among the plurality of indicated CSI reports, a CSI report that does not consider the update of channel information is determined by considering at least the time required for channel information calculation required for the CSI report to occupy the CPU and the priority of the reported channel information. For example, the update of the channel information for the CSI report that is started at the time when the calculation of the channel information required for the CSI report occupies the CPU is the latest may not be considered, and for a CSI report having a low priority of channel information, the update of channel information may not be considered preferentially.

The priority of the channel information may be determined with reference to [Table 29] below.

TABLE 29

CSI priority value $Pri_{iCSI}(y,k,c,s) = 2 \cdot N_{cells} \cdot M_s \cdot y + N_{cells} \cdot M_s \cdot k + M_s \cdot c + s$,
- y=0 : In case of aperiodic CSI report transmitted through PUSCH, y=1: In case of semi-persistent CSI report transmitted through PUSCH, y=2: In case of semi-persistent CSI report transmitted through PUCCH, y=3: In case of periodic CSI report transmitted through PUCCH;
- k=0 : In case that the CSI report includes L1-RSRP, k=1 : In case that the CSI report does not include L1-RSRP;
- c : Serving cell Index, $N_{cells}$ : Maximum number of serving cells set by upper layer signaling (maxNrofServingCells);
- s : CSI report configuration index (reportConfigID), $M_s$ : Maximum number of CSI report configuration set by upper layer signaling (maxNrofCSI-ReportConfigurations).

The CSI priority for the CSI report is determined through the priority value PriiCSI(y,k,c,s) of [Table 29]. Referring to [Table 29], the CSI priority value is determined through the type of channel information included in the CSI report, the time axis reporting characteristic (aperiodic, semi-persistent, and periodic) of the CSI report, the channel (PUSCH and PUCCH) through which the CSI report is transmitted, the serving cell index, and the CSI report configuration index. The CSI priority for the CSI report is determined that the CSI priority for the CSI report having a small priority value is high by comparing the priority value PriiCSI(y, k, c, s).

Assuming that the CPU occupation time is the time occupied by CPU for calculating channel information required for CSI report instructed by the base station to the UE, the CPU occupation time is determined by considering the type of channel information (report quantity) included in the CSI report, time axis characteristics (aperiodic, semi-persistent, and periodic) of CSI report, slot or symbol occupied by higher layer signaling or DCI indicating CSI report, and part or all of a slot or symbol occupied by a reference signal for channel state measurement.

A CPU occupation time for a CSI report in which a report quantity included in a CSI report is not set to "none" according to some embodiments.

A CPU occupation time for an aperiodic CSI report in which the report quantity included in the CSI report is not set to "none" according to some embodiments. When the base station instructs to transmit aperiodic CSI report #X in uplink slot n' through DCI using DCI format 0_1, a CPU occupation time for the CSI report #X transmitted in the uplink slot n' may be defined as from the next symbol of the last symbol occupied by the PDCCH including DCI indicating aperiodic CSI report #X to the last symbol occupied by the PUSCH including the CSI report #X transmitted in the uplink slot n'.

A CPU occupation times for a periodic or semi-persistent CSI report in which the report quantity included in the CSI report is not set to "none" according to some embodiments. When the base station instructs to transmit periodic or semi-persistent CSI report #X in uplink slot n' through DCI using higher layer signaling or DCI format 0_1 scrambled with SP-CSI-RNTI, the CPU occupation time for CSI report #X transmitted in uplink slot n' may be defined as, among CSI-RS/CSI-IM/SSB occasion for CSI report #X transmitted in uplink slot n', from the first symbol of the first transmitted CSI-RS/CSI-IM/SSB resource corresponding to the latest CSI-RS/CSI-IM/SSB occasion to the last symbol occupied by PUCCH or PUSCH including CSI report #X transmitted in uplink slot n'. The latest CSI-RS/CSI-IM/SSB occasion may not be located after the CSI reference resource for CSI report #X. Exceptionally, when the base station instructs a semi-persistent CSI report through DCI and the UE performs the first CSI report of the semi-persistent CSI report #X, the CPU occupation time for the first CSI report may be defined as from the next symbol of the last symbol occupied by the PDCCH including the DCI indicating the semi-persistent CSI report #X to the last symbol occupied by the PUSCH including the first CSI report. Through this, it is possible to ensure operation causality on the time axis of the UE in consideration of the time point at which the CSI report is indicated and the time point at which the CPU occupation time starts.

As an example, the rules as illustrated in [Table 30] below may be followed.

TABLE 30

For a CSI report with CSI-ReportConfig with higher layer parameter reportQuantity not set to 'none', the CPU(s) are occupied for a number of OFDM symbols as follows:
- A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
- An aperiodic CSI report occupies CPU(s) from the first symbol after the PDCCH triggering the CSI report until the last symbol of the PUSCH carrying the report.
- An initial semi-persistent CSI report on PUSCH after the PDCCH trigger occupies CPU(s) from the first symbol after the PDCCH until the last symbol of the PUSCH carrying the report.

A CPU occupation time for a CSI report in which a report quantity included in a CSI report is set to "none" according to some embodiments.

A CPU occupation time for an aperiodic CSI report in which the report quantity included in the CSI report is set to "none" according to some embodiments. When the base station instructs to transmit aperiodic CSI report #X in uplink slot n' through DCI using DCI format 0_1, a CPU occupation time for the CSI report #X transmitted in the uplink slot n' may be defined as from the next symbol of the last symbol occupied by the PDCCH including DCI indicating aperiodic CSI report #X to symbol that completes CSI computation. The symbol for completing the above-described CSI computation refers to the latest symbol among symbols after CSI computation time Z of the last symbol occupied by the PDCCH including DCI indicating CSI report #X and symbols after CSI computation time Z' of the last symbol of the most recent CSI-RS/CSI-IM/SSB occasion for CSI report #X transmitted in uplink slot n'.

A CPU occupation times for a periodic or semi-persistent CSI report in which the report quantity included in the CSI report is set to "none" according to some embodiments. When the base station instructs to transmit periodic or semi-persistent CSI report #X in uplink slot n' through DCI using higher layer signaling or DCI format 0_1 scrambled with SP-CSI-RNTI, a CPU occupation time for the CSI report #X transmitted in the uplink slot n' may be defined as from the first symbol of the first transmitted CSI-RS/CSI-IM/SSB resource corresponding to each CSI-RS/CSI-IM/SSB occasion for CSI report #X transmitted in uplink slot n' to the symbol after CSI computation time Z' of the last symbol of the CSI-RS/CSI-IM/SSB resource transmitted the latest.

As an example, the rules as illustrated in [Table 31] below may be followed.

TABLE 31

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:

- A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z'_3$ symbols after the last symbol of the latest one of the CSI-RS/SSB resource for channel measurement for L1-RSRP computation in each transmission occasion.

- An aperiodic CSI report occupies CPU(s) from the first symbol after the PDCCH triggering the CSI report until the last symbol between $Z_3$ symbols after the first symbol after the PDCCH triggering the CSI report and $Z'_3$ symbols after the last symbol of the latest one of each CSI-RS/SSB resource for channel measurement for L1-RSRP computation.

At least the following three SRS operation scenarios may exist in the NR system.

1) The base station configures a beam in one direction to the UE (configuring the beam/precoding in one direction in the disclosure may include not applying the beam/precoding or applying a wide beam (cell-coverage or sector coverage)), and the UE may transmit the SRS according to the transmission period and offset of the SRS in the case of periodic SRS or semi-persistent SRS, or according to the SRS request of the base station in the case of aperiodic SRS (at a predetermined time after the SRS request). In this case, additional information for beam/precoding may not be required for SRSs.

2) The base station may configure beams in one or more directions to the UE, and the UE may transmit a plurality of SRS beam-formed in one or more configured directions.

3) The base station may configure beams in one or more directions to the UE, and the UE may transmit a plurality of SRS beam-formed in one or more configured directions. For example, the base station may configure the UE to transmit SRS by applying different beams/pre-coding to SRS resource (or port) #0, SRS resource (or port) #1, and SRS resource (or port) #2. Through this, stable communication may be performed through beam/precoder diversity even when the mobility of the UE is high. For example, the UE may provide channel state information to the base station with SRS #2 at time A, and may provide channel state information to the base station with SRS #0 at time A+alpha. In this case, the base station needs to inform not only of the SRS request but also of the SRS beam/precoding information, unlike the method 1).

Although the above descriptions were based on SRS transmission, similarly, it is possible to extend to other UL channels such as PRACH, PUSCH, PUCCH, and/or RS transmission, and detailed descriptions of all cases are omitted so as not to obscure the gist of the disclosure.

A basic transmission unit of a 5G or NR system is a slot, and assuming a general cyclic prefix (CP) length, each slot consists of 14 symbols, and one symbol may correspond to one UL waveform (CP-OFDM or DFT-S-OFDM) symbol. A resource block (RB) is a resource allocation unit corresponding to one slot based on the time domain, and may consist of 12 subcarriers based on the frequency domain.

The uplink structure may be largely divided into a data region and a control region. Unlike the LTE system, in the 5G or NR system, the control region may be configured and transmitted at an arbitrary position in the uplink. The data region includes a series of communication resources including data such as voice and packets transmitted to each UE, and corresponds to the remaining resources except for the control region in the subframe. The control region may include a series of communication resources for a downlink channel quality report, reception ACK/NACK for a downlink signal, an uplink scheduling request, and the like from each UE.

The UE may transmit its own data and control information simultaneously in the data region and the control region. A symbol in which the UE can periodically transmit SRS within one slot may be the last 6 symbol intervals, and a symbol capable of transmitting the SRS may be transmitted through a preconfigured SRS transmission band within the UL BWP based on the frequency domain. However, this is an example, and a symbol capable of transmitting SRS may be extended to another time interval (e.g., to configure some of all OFDM symbols in the slot as an SRS resource) within the slot. RBs capable of transmitting SRS are transmitted in multiples of 4 RBs when transmitted in the frequency domain and may be transmitted in a maximum of 272 RBs.

In addition, in the 5G or NR system, the number of symbols N of SRS may be set to 1, 2, or 4, and may be transmitted as consecutive symbols. In addition, repeated transmission of SRS symbols may be allowed in 5G or NR systems. Specifically, the repetition factor (r) of the SRS symbol is $r=\{1,2,4\}$, and may be set as $r \leq N$. For example, when one SRS antenna is mapped to one symbol and transmitted, up to 4 symbols may be repeatedly transmitted. Alternatively, four different antenna ports may be transmitted in four different symbols. In this case, because each antenna port is mapped to one symbol, repeated transmission of the SRS symbol is not allowed.

In case of LTE and NR, SRS may be configured based on the following higher layer signaling information (or a subset thereof):

(1) BandwidthConfig: Configure SRS bandwidth information. The exact value of each code point may vary according to the uplink system BW value;

(2) SubframeConfig (or ConfigIndex): Configure the SRS transmission period and transmission offset values. Depending on whether it is FDD or TDD, the exact value of each code point may vary;

(3) ackNackSRS-SimultaneousTransmission: ACK/NACK-Informs whether SRS simultaneous transmission or not;

(4) MaxUpPts: Informs whether to initialize the frequency position of SRS transmission in UpPTS;

(5) Hopping: 2-bit information indicates whether or not SRS frequency hopping is performed and the location and method of hopping;

(6) Frequency domain position: Informs the frequency domain position of SRS transmission;

(7) Duration: Indicates whether Periodic SRS is transmitted;

(8) Transmission comb: Informs the comb offset value during SRS transmission;

(9) Cyclic shift: Indicates a cyclic shift value during SRS transmission; and

(10) Antenna port: Informs the number of SRS antenna ports used for SRS transmission. In case of LTE, 1, 2 or 4 ports can be supported.

In the case of the LTE-A system, periodic and aperiodic SRS transmission may be supported based on the above-described configuration information. In the case of the NR system, it is possible to use additional information such as activation/deactivation signaling for SRS resources in addition to the above-described configuration information, and periodic, semi-persistent, and aperiodic SRS transmission may be supported. Depending on the transmission type of SRS, for example, whether periodic, semi-persistent, or aperiodic SRS transmission is performed, some of the configuration information may be omitted.

The SRS may be configured with a constant amplitude zero auto correlation (CAZAC) sequence. In addition, CAZAC sequences constituting each SRS transmitted from several UEs may have different cyclic shift values. In addition, CAZAC sequences generated through cyclic shift in one CAZAC sequence may have a characteristic of having a correlation value of zero with sequences having a cyclic shift value different from that of each CAZAC sequence. SRSs simultaneously allocated to the same frequency domain using sequences having a cyclic shift value different from that of themselves and a characteristic having a zero correlation value may be distinguished according to a CAZAC sequence cyclic shift value configured for each SRS by the base station.

SRSs of several UEs may be classified according to frequency positions as well as cyclic shift values. The frequency position may be divided into SRS subband unit allocation or Comb. Comb2 and Comb4 may be supported in 5G or NR systems. In the case of Comb2, one SRS may be allocated only to the even-numbered or odd-numbered subcarriers in the SRS subband. In this case, each of the even-numbered subcarriers and the odd-numbered subcarriers may constitute one Comb.

Each UE may be allocated an SRS subband based on a tree structure. In addition, the UE may perform hopping on the SRS allocated to each subband at each SRS transmission time point. Accordingly, all transmit antennas of the UE may transmit the SRS using the entire uplink data transmission bandwidth.

The SRS may be allocated for each subband according to an embodiment of the disclosure. For example, when having a data transmission band corresponding to 40 RBs in frequency, SRS may be allocated to each UE according to the tree structure configured by the base station.

Figure 9:
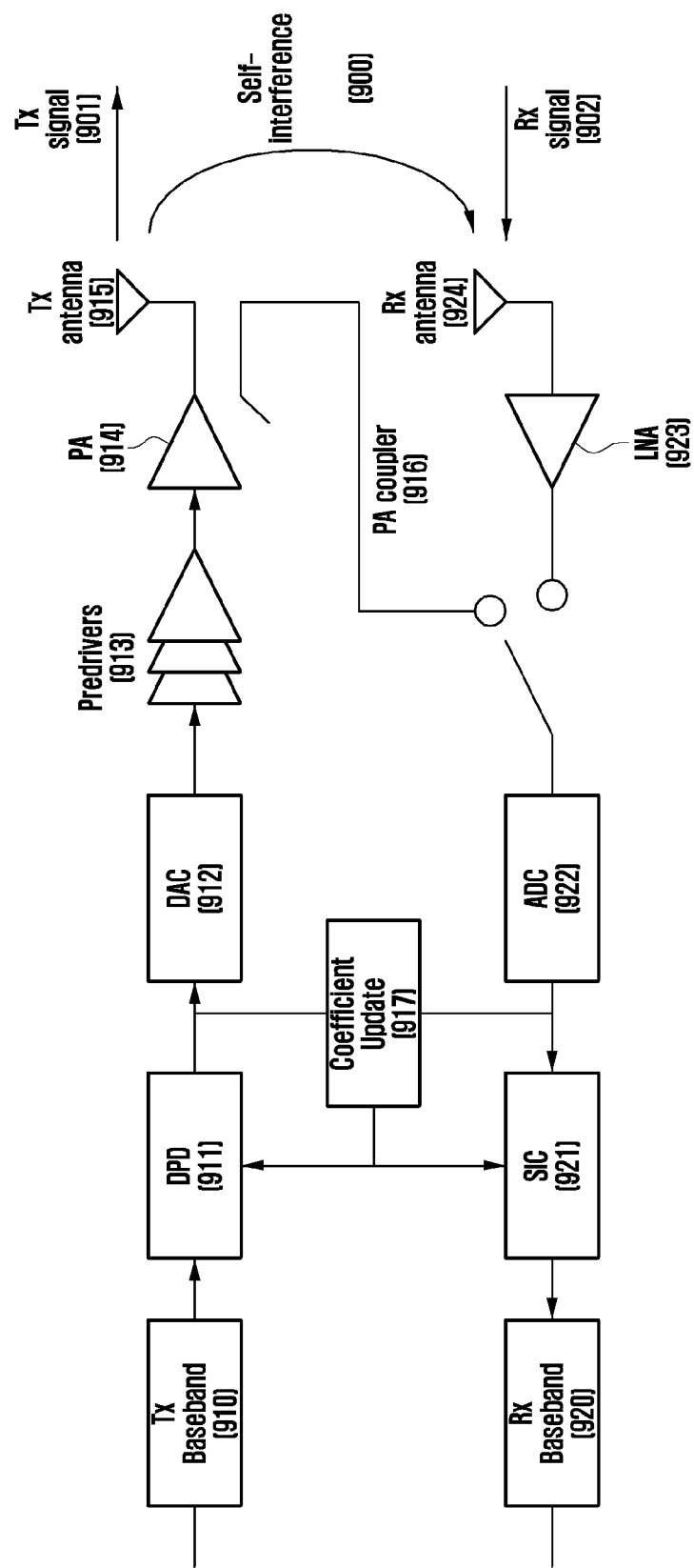
FIG. 9 is a diagram illustrating a transmission/reception structure for a duplex scheme according to an embodiment of the disclosure.

When the level index of the tree structure in FIG. 9 is b, the uppermost level (b=0) of the tree structure may consist of one SRS subband having a bandwidth of 40 RBs. In the second level (b=1), two SRS subbands with a bandwidth of 20 RBs may be generated from the SRS subbands of the b=0 level. Accordingly, two SRS subbands may exist in the entire data transmission band of the second level (b=1). In the third level (b=2), five 4 RB SRS subbands are generated from one 20 RB SRS subband at the level immediately above (b=1), and 10 4RB SRS subbands may exist in one level.

The configuration of such the tree structure may have various levels, SRS subband sizes, and the number of SRS subbands per level according to the configuration of the base station. The number of SRS subbands in level b generated from one SRS subband of a higher level may be defined as Nb, and an index for the Nb SRS subbands may be defined as nb={0, . . . ,Nb−1}. As the subbands per level vary in this way, a UE may be allocated to each subband per level. For example, UE 1 may be allocated to the first SRS subband (n1=0) among two SRS subbands having a 20 RB bandwidth at b=1 level, UE 2 and UE 3 may be allocated to positions of the first SRS subband (n2=0) and the third SRS subband (n2=2) below the second 20 RB SRS subband, respectively. Through the processes in which the UE is allocated to each subband for each level, the UE can simultaneously transmit SRS through a plurality of component carriers (CC), and can transmit the SRS to a plurality of SRS subbands at the same time within one CC.

The base station may configure at least one SRS configuration for each uplink BWP in order to transmit configuration information for SRS transmission to the UE, and may also configure at least one SRS resource set for each SRS configuration. As an example, the base station and the UE may transmit and receive signaling information as follows based on Release 15 in order to transmit information about the SRS resource set.

TABLE 32

| |
|---|
| BWP-UplinkDedicated ::=          SEQUENCE { |
|     pucch-Config                  SetupRelease { PUCCH-Config } OPTIONAL,-- Need M |
| (PUCCH configuration for one bandwidth part of the support cell) |
|     pusch-Config                  SetupRelease { PUSCH-Config } OPTIONAL,-- Need M |
| (PUSCH configuration for one bandwidth part of the support cell) |
|     configuredGrantConfig         SetupRelease {ConfiguredGrantConfig} OPTIONAL,-- Need M |
| (configuration for type 1 or type 2 of the configured grant Configured-Grant) |
|     srs-Config                    SetupRelease { SRS-Config } OPTIONAL,-- Need M |
| (Uplink SRS (Sounding Reference Signal) configuration) |
|     beamFailureRecoveryConfig     SetupRelease { BeamFailureRecoveryConfig } OPTIONAL, -- Cond SpCellOnly |
| (configuration for beam failure recovery) |
|     ... |
| } |

Here, srs-Config is used to configure SRS transmission, defines an SRS-Resources list and an SRS-ResourceSets list, and may transmit and receive signaling information as follows.

TABLE 33

| |
|---|
| SRS-Config ::=                                       SEQUENCE { |
|     srs-ResourceSetToReleaseList                     SEQUENCE (SIZE(1..maxNrofSRS-ResourceSets)) OF SRS-ResourceSetId       OPTIONAL,   -- Need N |
| (List of SRS resource sets being released) |
|     srs-ResourceSetToAddModList                      SEQUENCE (SIZE(1..maxNrofSRS-ResourceSets)) OF SRS-ResourceSet         OPTIONAL,   -- Need N |
| (List of SRS resource sets to be added or modified) |
|     srs-ResourceToReleaseList                        SEQUENCE (SIZE(1..maxNrofSRS-Resources)) OF SRS-ResourceId             OPTIONAL,   -- Need N |
| (List of SRS resource sets being released) |
|     srs-ResourceToAddModList                         SEQUENCE (SIZE(1..maxNrofSRS-Resources)) OF SRS-Resource OPTIONAL, -- Need N |
| (List of SRS resource sets to be added or modified) |
|     tpc-Accumulation                                 ENUMERATED {disabled} OPTIONAL, -- Need S |
| (Indicates whether accumulation of the TPC instruction is performed.) |
|     ... |
| } |

TABLE 33-continued

```
SRS-ResourceSet ::=                SEQUENCE {
  srs-ResourceSetId                        SRS-ResourceSetId,
(SRS resource set identifier)
  srs-ResourceIdList          SEQUENCE (SIZE(1..maxNrofSRS-ResourcesPerSet)) OF SRS-ResourceId
OPTIONAL, -- Cond Setup
(Identifiers of SRS-resources included in the corresponding SRS resource set)
  resourceType                           CHOICE {
(Configure time domain behavior of SRS resource)
    aperiodic                            SEQUENCE {
(Aperiodic SRS configuration)
      aperiodicSRS-ResourceTrigger                INTEGER (1..maxNrofSRS-TriggerStates-1),
(DCI code point for SRS transmission according to the SRS resource set configuration of the corresponding
area)
      csi-RS      NZP-CSI-RS-ResourceId         OPTIONAL, -- Cond NonCodebook
(CSI-RS resource identifier associated with an SRS resource set)
      slotOffset              INTEGER (1..32)     OPTIONAL, -- Need S
(Slot offset between DCI triggering time and transmission of the actual SRS resource set)
      ...,
      [[
      aperiodicSRS-ResourceTriggerList-v1530            SEQUENCE (SIZE(1..maxNrofSRS-
TriggerStates-2)) OF INTEGER (1..maxNrofSRS-TriggerStates-1) OPTIONAL -- Need M
(List of additional DCI codepoints transmitted by SRS according to the SRS resource set configuration of the
corresponding area)
      ]]
    },
    semi-persistent                      SEQUENCE {
(Semi-persistent SRS configuration)
      associatedCSI-RS            NZP-CSI-RS-ResourceId OPTIONAL, -- Cond NonCodebook
(CSI-RS resource identifier associated with a non-codebook based SRS resource set)
      ...
    },
    periodic                             SEQUENCE {
(Periodic SRS configuration)
      associatedCSI-RS            NZP-CSI-RS-ResourceId   OPTIONAL, -- Cond NonCodebook
      ...
    }
  },
  Usage                      ENUMERATED {beamManagement, codebook, nonCodebook,
antennaSwitching},
(Indicate where to use the SRS resource set)
  alpha                   Alpha          OPTIONAL, -- Need S
(alpha value for SRS power control)
  p0                  INTEGER (-202..24)   OPTIONAL, -- Cond Setup
(p0 value for SRS power control)
  pathlossReferenceRS                    CHOICE {
(Reference signal for SRS path loss estimation)
    ssb-Index                            SSB-Index,
(Path Loss Reference SSB/PBCH Block Index)
    csi-RS-Index                         NZP-CSI-RS-ResourceId
(Path loss reference CSI-RS resource index)
  }
OPTIONAL, -- Need M
  srs-PowerControlAdjustmentStates         ENUMERATED { sameAsFci2, separateClosedLoop}
OPTIONAL, -- Need S
(Instruction on how to perform SRS power control adjustments)
  ...
}
SRS-ResourceSetId ::=       INTEGER (0..maxNrofSRS-ResourceSets-1)
SRS-Resource ::=            SEQUENCE {
  srs-ResourceId                        SRS-ResourceId,
(SRS resource identifier)
  nrofSRS-Ports            ENUMERATED {port1, ports2, ports4},
(number of SRS port)
  ptrs-PortIndex           ENUMERATED {n0, n1 } OPTIONAL, -- Need R
(PTRS port index of SRS resource for non-codebook-based uplink MIMO support)
  transmissionComb                        CHOICE {
(SRS comb value and comb offset, set to a comb value of 2 or 4)
    n2                                   SEQUENCE {
      combOffset-n2                            INTEGER (0..1),
(If Comb value is 2, the comb offset)
      cyclicShift-n2                           INTEGER (0..7)
(If Comb value is 2, cyclic shift is configured.)
    },
    n4                                   SEQUENCE {
      combOffset-n4                            INTEGER (0..3),
(If Comb value is 4, the comb offset)
      cyclicShift-n4                           INTEGER (0..11)
(If Comb value is 4, cyclic shift is configured)
    }
  },
```

TABLE 33-continued

```
    resourceMapping                             SEQUENCE {
(OFDM symbol position information of SRS resource)
        startPosition                           INTEGER (0..5),
(Time domain SRS resource location, 0 is mapped with the last symbol, 1 is mapped with the second to last
symbol)
        nrofSymbols                             ENUMERATED {n1, n2, n4},
(Number of OFDM symbols)
        repetitionFactor                        ENUMERATED {n1, n2, n4}
(Repetition Factor)
    },
    freqDomainPosition                          INTEGER (0..67),
(Frequency domain position of SRS resource)
    freqDomainShift                             INTEGER (0..268),
(Frequency domain shift value of SRS resource)
    freqHopping                                 SEQUENCE {
(Frequency hopping information of SRS resource)
        c-SRS                                   INTEGER (0..63),
($C_{SRS}$ information)
        b-SRS                                   INTEGER (0..3),
($B_{SRS}$ information)
        b-hop                                   INTEGER (0..3)
($b_{hop}$ information)
    },
    groupOrSequenceHopping                      ENUMERATED { neither, groupHopping,
sequenceHopping },
(Information on whether group hopping or sequence hopping is performed on SRS resources)
    resourceType                                CHOICE {
        aperiodic                               SEQUENCE {
            ...
        },
        semi-persistent                         SEQUENCE {
            periodicityAndOffset-sp             SRS-PeriodicityAndOffset,
(Period and slot offset information for semi-persistent SRS resources)
            ...
        },
        periodic                                SEQUENCE {
            periodicityAndOffset-p              SRS-PcnodicityAudOffset,
(Periodic SRS resource period and slot offset information)
            ...
        }
    },
    sequenceId                                  INTEGER (0.. 1023),
(Initial sequence identifier for performing group hopping and sequence hopping)
    spatialRelationInfo             SRS-SpatialRelationInfo OPTIONAL, -- Need R
(Spatial relationship configuration information between target SRS and reference RS)
    ...
}
SRS-PeriodicityAndOffset ::=         CHOICE {
    sl1                                         NULL,
    sl2                                         INTEGER(0..1),
    sl4                                         INTEGER(0..3),
    sl5                                         INTEGER(0..4),
    sl8                                         INTEGER(0..7),
    sl10                                        INTEGER(0..9),
    sl16                                        INTEGER(0..15),
    sl20                                        INTEGER(0..19),
    sl32                                        INTEGER(0..31),
    sl40                                        INTEGER(0..39),
    sl64                                        INTEGER(0..63),
    sl80                                        INTEGER(0..79),
    sl160                                       INTEGER(0..159),
    sl320                                       INTEGER(0..319),
    sl640                                       INTEGER(0..639),
    sl1280                                      INTEGER(0..1279),
    sl2560                                      INTEGER(0..2559)
}
``` resourceType: A time axis transmission configuration of the SRS resource referenced in the SRS resource set, and may have one of "periodic," "semi-persistent," and "aperiodic." If it is configured to "periodic" or "semi-persistent," the associated CSI-RS information may be provided according to the usage of the SRS resource set. If configured to "aperiodic," aperiodic SRS resource trigger list and slot offset information may be provided, and associated CSI-RS information may be provided according to the usage of the SRS resource set.

usage: A configuration for the usage of the SRS resource referenced in the SRS resource set, and may have one of "beamManagement," "codebook," "nonCodebook," and "antennaSwitching."

alpha, p0, pathlossReferenceRS, srs-PowerControlAdjustmentStates: It is possible to provide a parameter setting for adjusting the transmit power of the SRS resource referenced in the SRS resource set.

It may be understood that the UE follows the information set in the SRS resource set for the SRS resource included in the set of SRS resource indexes referenced in the SRS resource set.

In addition, the base station and the UE may exchange higher layer signaling information in order to transmit individual configuration information for the SRS resource. As an example, the individual configuration information for the SRS resource may include time-frequency axis mapping information within the slot of the SRS resource, which may include information about frequency hopping within or between slots of the SRS resource. As another example, the individual configuration information for the SRS resource may include the time axis transmission configuration of the SRS resource, and may have one of "periodic," "semi-persistent," and "aperiodic." Individual configuration information for SRS resource may be limited to have the same time axis transmission configuration as the SRS resource set including SRS resource. If the time axis transmission setting of the SRS resource is configured to "periodic" or "semi-persistent," the individual configuration information for the SRS resource may additionally include an SRS resource transmission period and a slot offset (e.g., periodicityAndOffset).

As another example, the individual configuration information for the SRS resource may include a configuration for the spatial domain transmission filter of the UE transmitting the SRS resource, which may be provided through spatial relation info for the SRS. When the spatial relation info included in the individual setting information for the SRS resource refers to the index of the CSI-RS resource or SSB, it may be understood that the UE uses the same spatial domain transmission filter as the spatial domain receive filter used when receiving the referenced CSI-RS resource or SSB. Alternatively, when spatial relation info refers to another SRS resource index, it may be understood that the UE uses the spatial domain transmission filter used to transmit the referenced SRS resource.

As configured by the upper layer parameter, SRS-ResourceSet, the UE may receive support for one or a plurality of sounding reference signal (SRS) resource sets. For each SRS resource set, the UE may be supported with K (K≥1) SRS resources greater than or equal to 1. At this time, except for the case where the maximum value K is set to 16 by the upper layer parameter [SRS-for-positioning] in the SRS, the maximum value K may be determined by the UE capability. The use of the SRS resource set may be configured according to "usage" in the upper layer parameter SRS-ResourceSet. When the upper layer parameter "usage" is configured to "beamManagement," the UE may transmit SRS at a given time instant with only one SRS resource in the SRS set, but SRS resources in other SRS resource sets operating in the same time domain in the same bandwidth part may be transmitted simultaneously.

At least one state for aperiodic SRS may be used to select one from among SRS resource sets configured.

The following SRS parameters may be semi-statically configured by a higher layer parameter SRS-Resource:

srs-ResourceId determines the SRS resource configuration identifier;

The number of SRS ports $N_{ap}^{SRS}$ may be set with the upper layer parameter nrofSRS-Ports and may be set to 1,2 or 4. If nrofSRS-Ports is not configured, nrofSRS-Ports may be set to 1;

The time domain operation of SRS resource allocation indicated by the upper layer parameter resourceType may be one of "periodic," "semi-persistent," and "aperiodic" SRS transmission;

When the SRS resource type is periodic or semi-persistent, the slot level period and the slot level offset may be determined by higher layer parameters periodicityAndOffset-p or periodicityAndOffset-sp. The UE may expect that SRS resources may not be configured in the same SRS resource set SRS-ResourceSet with different slot level periods. When the upper layer parameter resourceType is configured to "aperiodic" for the SRS-ResourceSet, the slot level offset may be defined as the upper layer parameter slotOffset;

The number of OFDM symbols of the SRS resource, the starting OFDM symbol in the slot, and the repetition factor R may be set by a higher layer parameter resourceMapping. If R is not set, R may be equal to the number of OFDM symbols in the SRS resource;

SRS bandwidth B_SRS and C_SRS may be set by higher layer parameter freqHopping. If not set, B_SRS may be 0;

The frequency hopping bandwidth b_hop may be set by an upper layer parameter freqHopping. If not set, b_hop may be 0;

The frequency domain position and settable shift may be set by upper layer parameters freqDomainPosition and freqDomainShift, respectively. If freqDomainPosision is not set, the frequency domain position and the configurable shift may be zero;

Cyclic shift may be set by upper layer parameters cyclicShift-n2, cyclicShift-n4, or cyclicShift-n8 for transmission comb values 2, 4, and 8, respectively;

The transmission comb value may be set by the upper layer parameter transmissionComb;

Transmission comb offset may be set by upper layer parameters combOffset-n2, combOffset-n4, or combOffset-n8 for transmission comb values 2, 4, and 8, respectively;

The SRS sequence ID may be configured by a higher layer parameter sequenceID; and The spatial relationship setting between the reference RS and the target SRS may be configured by the upper layer parameter spatialRelationInfo including the identifier of the reference RS. SS/PBCH block, target SRS indicated by the upper layer parameter servingCellId, and the CSI-RS configured for the same support cell or the uplink bandwidth part indicated by the upper layer parameter uplinkBWP and the target SRS indicated by the upper layer parameter servingCellID and the SRS configured for the same support cell may be configured as a reference RS. When SRS is configured as the upper layer parameter [SRS-for-positioning], the reference RS may be a DL PRS configured for a support cell, an SS/PBCH block, or a DL PRS of a non-support cell indicated by a higher layer parameter.

As a higher layer parameter resourceMapping in the SRS-Resource, $N_s \in \{1,2,4\}$ adjacent symbols in the last 6 symbols of the slot may be configured as the SRS resource of the UE. In this case, each symbol of the resource is mapped to all SRS antenna pods. When the SRS is configured as the higher layer parameter [SRS-for-positioning], $N_s \in \{1,2,4,8,12\}$ adjacent symbols at any position in the slot may be configured as the SRS resource of the UE by the higher layer parameter resourceMapping in the SRS-Resource.

If the UE is not configured to [intraUEPrioritization] and the PUSCH and the SRS are transmitted in the same slot for the support cell, the UE may be configured to transmit the SRS after transmitting the PUSCH and the corresponding DM-RS.

If the UE is configured to [intraUEPrioritization] and PUSCH transmission overlaps at the same time as SRS, the UE may not transmit SRS for the overlapped symbol(s).

When the UE is configured with one or more SRS resources and the upper layer parameter resourceType in the SRS-Resource is configured to "periodic," the following operation may be followed.

In one example of operation, if the UE is configured with the upper layer parameter spatialRelationInfo including the reference "ssb-Index" identifier, the UE may transmit the target SRS resource with the same spatial domain transmission filter used when receiving the reference SS/PBCH block. If the UE is configured with the upper layer parameter spatialRelationInfo including the identifier of the reference "csi-RS-Index," the UE may transmit the target SRS resource using the same spatial domain transmission filter used when receiving the reference periodic CSI-RS or the reference semi-persistent CSI-RS. If the UE is configured with the higher layer parameter spatialRelationInfo including the reference "srs" identifier, the UE may transmit the target SRS resource using the same spatial domain transmission filter used when transmitting the reference periodic SRS. If the SRS is configured as the upper layer parameter [SRS-for-positioning] and the UE is configured with the upper layer parameter spatialRelationInfo including the identifier of the reference "DL-PRS-ResourceId," the UE may transmit the target SRS resource using the same spatial domain transmission filter used when receiving the reference DL PRS.

When the UE is configured with one or more SRS resources and the upper layer parameter resourceType in the SRS-Resource is configured to "semi-persistent," the following operation may be followed.

In one example of operation, when the UE receives an activation command for the SRS resource and the UE transmits the HARQ-ACK for the PDSCH including the activation command to the PUCCH in slot n, the operation and UE assumption for SRS transmission corresponding to the configured SRS resource set may be applied to start from the first slot after the slot $n+3N_{slot}^{slotsubframe,\mu}$. Here, $\mu$ is the subcarrier configuration of the PUCCH. The activation command may also include a spatial relationship assumption configured to one reference signal identifier per element of the SRS resource set activated by the reference list. Each identifier in the list may refer to the NZP-CSI-RS resource configured in the support cell indicated by the Resource Serving Cell ID field in the activation command if the same support cell as the reference SS/PBCH block and SRS resource set exists, and may refer to the SRS resource configured in the support cell and uplink bandwidth part indicated by the Resource Serving Cell ID field and the Resource BWP ID field in the activation command if the same support cell and bandwidth part as the SRS resource set exist. When the SRS is configured as the upper layer parameter [SRS-for-positioning], each identifier in the reference signal identifier list may also refer to a reference SS/PBCH block of a non-support cell or a DL PRS of a support or non-support cell indicated by a higher layer parameter.

In one example of operation, if the SRS resource in the activated resource set is configured as the upper layer parameter spatialRelationInfo, the UE may assume that the identifier of the reference signal in the activation command takes precedence over the identifier configured in the spatialRelationInfo.

In one example of operation, when the UE receives a deactivation command for the activated SRS resource set and transmits the PUCCH including HARQ-ACK information corresponding to the PDSCH including the deactivation command to slot n, the operation and UE assumption for stopping SRS transmission corresponding to the deactivated SRS resource set may be applied to start from the first slot after the slot $n+3N_{slot}^{subframe,\mu}$. Here, $\mu$ is the subcarrier configuration of the PUCCH.

In one example of operation, if the UE is configured with the upper layer parameter spatialRelationInfo including the identifier of the reference "ssb-Index," the UE may transmit the target SRS resource with the same spatial domain transmission filter used when receiving the reference SS/PBCH block. If the upper layer parameter spatialRelationInfo includes the identifier of the reference "csi-RS-Index," the UE may transmit the target SRS resource using the same spatial domain transmission filter used when receiving the reference periodic CSI-RS or the reference semi-persistent CSI-RS. If the upper layer parameter spatialRelationInfo includes the identifier of the reference "srs," the UE may transmit the target SRS resource using the same spatial domain transmission filter used when transmitting the reference periodic SRS or the reference semi-persistent SRS. If SRS is configured as the upper layer parameter [SRS-for-positioning] and the upper layer parameter spatialRelationInfo includes the identifier of the reference "DL-PRS-ResourceId," the UE may transmit the target SRS resource using the same spatial domain transmission filter used when receiving the reference DL PRS.

If the UE is configured with a dynamic semi-persistent SRS resource and does not receive a deactivation command, it is determined that the semi-persistent SRS configuration is dynamic in the dynamic UL bandwidth part, otherwise it may be determined to be stopped.

If the UE is configured with one or more SRS resources and the upper layer parameter resourceType in the SRS-Resource is configured to "aperiodic," the following operation may be followed.

In one example of operation, the UE may receive the SRS resource set configuration.

In one example of operation, the UE may receive a downlink DCI, group common DCI, or uplink DCI-based command. The code point of the received DCI may trigger one or multiple SRS resource sets. The minimum time interval between the last symbol of the PDCCH triggering aperiodic SRS transmission and the first symbol of the SRS resource for the SRS of the resource set whose purpose is configured to "codebook" or "antennaSwitching" may be $N_2$. In other cases, the minimum time interval between the last symbol of the PDCCH triggering aperiodic SRS transmission and the first symbol of the SRS resource may be $N_2+14$. The minimum time interval in OFDM symbol units may be calculated based on the minimum subcarrier interval among the PDCCH and aperiodic SRS.

In one example of operation, if the UE receives DCI triggering aperiodic SRS in slot n, the UE may transmit each aperiodic SRS for SRS resource sets triggered in the slot defined below:

$$\left[n \cdot \frac{2^{\mu_{SRS}}}{2^{\mu_{PDCCH}}}\right] + k + \left[\left(\frac{N_{slot,offset,PDCCH}^{CA}}{2^{\mu_{offset,PDCCH}}} - \frac{N_{slot,offset,SRS}^{CA}}{2^{\mu_{offset,SRS}}}\right) \cdot 2^{\mu_{SRS}}\right]$$

In such equation, k is set as a higher layer parameter slotOffset for each triggered SRS resource set and is based on a subcarrier interval for triggered SRS transmission. $\mu_{SRS}$ and $\mu_{PDCCH}$ are subcarrier interval settings for each of the triggered SRS and the PDCCH transmitting, the trigger command. $N_{slot,offset}^{CA}$ and $\mu_{offset}$ mean a scheduling carrier and a scheduled carrier when performing carrier aggregation.

In one example of operation, if the UE is configured to the upper layer parameter spatialRelationInfo including the reference "ssb-Index" identifier, the UE may transmit the target SRS resource with the same spatial domain transmission filter used when receiving the reference SS/PBCH block. If the UE is configured to the upper layer parameter spatialRelationInfo including the reference "csi-RS-Index" identifier, the UE may transmit the target SRS resource using the same spatial domain transmission filter used when receiving the reference periodic CSI-RS, the reference semi-persistent CSI-RS, or the most recent aperiodic CSI-RS. If the UE is configured to the upper layer parameter spatialRelationInfo including the reference "srs" identifier, the UE may transmit the target SRS resource using the same spatial domain transmission filter used when transmitting the reference periodic SRS, the reference semi-persistent SRS, or the reference aperiodic SRS. If SRS is configured as the upper layer parameter [SRS-for-positioning] and is set as the upper layer parameter spatialRelationInfo including the reference "DL-PRS-ResourceId" identifier, the UE may transmit the target SRS resource with the spatial domain transmission filter used when receiving the reference DL PRS.

In one example of operation, when the UE receives a spatial relation update command for SRS resources and the HARQ-ACK corresponding to the PDSCH including the update command is transmitted in slot n, the operation and UE assumption for spatial relation update of SRS resources may be applied to SRS transmission starting from the first slot after the slot $n+3N_{slot}^{subframe,\mu}$. The update command may include a spatial relationship assumption configured to one reference signal identifier per element of the SRS resource set updated by the reference list. Each identifier in the list may refer to reference SS/PBCH block, NZP CSI-RS resource set in the support cell indicated by the Resource Serving Cell ID field in the update command if the same support cell as the SRS resource set exists, or SRS resource set in the support cell and uplink bandwidth part indicated by the Resource Serving Cell ID field and the Resource BWP ID field in the update command if the same support cell and bandwidth part as the SRS resource set exist. When the UE sets the upper layer parameter usage in the SRS-ResourceSet to "antennaSwitching," the UE may not expect to be configured in a different spatial relationship with the SRS resources in the same SRS resource set.

The UE may not expect to be configured with different time domain operations for SRS resources within the same SRS resource set. In addition, the UE may not expect that the SRS resource set associated with the SRS resource is configured to a different time domain operation. The SRS request region included in DCI formats 0_1, 1_1, 0_2 (when the SRS request region exists) and 1_2 (when the SRS request region exists) may indicate a triggered SRS resource set as illustrated in Table 34 below. If the upper layer parameter srs-TPC-PDCCH-Group for the UE is configured to "typeB," the 2-bit SRS request region included in DCI format 2_3 may indicate a triggered SRS resource set. Alternatively. if the upper layer parameter srs-TPC-PDCCH-Group for the UE is configured to "typeA," the 2-bit SRS request region included in DCI format 2_3 may indicate SRS transmission for a set of support cells configured by a higher layer.

TABLE 34

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers, or SRS resource set(s) configured by [SRS-ResourceSetForPositioning] and resourceType in [SRS-ResourceSetForPositioning] set to 'aperiodic' for a 1st set of serving cells configured by higher layers |
| 10 | SRS resource set(s) configured with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers, or SRS resource set(s) configured by [SRS-ResourceSetForPositioning] and resourceType |

TABLE 34-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 11 | SRS resource set(s) configured with higher layer parameter aperiodicSRS-ResourceTrigger set to 3 or an entry in aperiodicSRS-ResourceTriggerList set to 3 | in [SRS-ResourceSetForPositioning] set to 'aperiodic' for a 2nd set of serving cells configured by higher layers SRS resource set(s) configured with higher layer parameter usage in SRS-ResourceSet set to 'antennaSwitching' and resourceType in SRS-ResourceSet set to 'aperiodic' for a 3rd set of serving cells configured by higher layers, or SRS resource set(s) configured by [SRS-ResourceSetForPositioning] and resourceType in [SRS-ResourceSetForPositioning] set to 'aperiodic' for a 3rd set of serving cells configured by higher layers |

For PUCCH and SRS scheduled on the same carrier, when semi-persistent SRS and periodic SRS are configured in the same symbol as PUCCH including only CSI report or L1-RSRP report or L1-SINR report only, the UE may not transmit SRS. When semi-persistent SRS or periodic SRS is configured in the same symbol as PUCCH including HARQ-ACK, link restoration request and/or SR (Scheduling Request), or when the aperiodic SRS is triggered to be transmitted in the same symbol as the PUCCH including the above information, the UE may not transmit SRS. If SRS is not transmitted while overlapping with PUCCH, only SRS symbol(s) overlapping with PUCCH may be dropped. When aperiodic SRS is triggered to overlap the same symbol as PUCCH including only semi-persistent/periodic CSI report or semi-persistent/periodic L1-RSRP report or L1-SINR report, PUCCH may not be transmitted.

In the case of a band-band combination in which simultaneous transmission of SRS and PUCCH/PUSCH is not allowed for intra-band frequency aggregation or inter-band frequency aggregation, the UE does not expect that PUSCH/UL DM-RS/UL PT-RS/PUCCH formats may be configured from a carrier different from a carrier for which SRS is configured in the same symbol.

In the case of a band-band combination in which simultaneous SRS and PRACH transmission is not allowed for intra-band frequency aggregation or inter-band frequency aggregation, SRS from one carrier and PRACH from another carrier may not be simultaneously transmitted.

When the SRS resource in which the upper layer parameter resourceType is configured to "aperiodic" is triggered in OFDM symbol(s) for periodic/semi-persistent SRS transmission, the UE transmits an aperiodic SRS resource, periodic/semi-persistent SRS symbol(s) overlapping the corresponding symbol(s) may be dropped, and non-overlapping periodic/semi-persistent SRS symbol(s) may be transmitted. When an SRS resource in which the upper layer parameter resourceType is configured to "semi-persistent" is triggered in OFDM symbol(s) for periodic SRS transmission, the UE transmits semi-persistent SRS resources, periodic SRS symbol(s) may be dropped during overlapping symbols, and non-overlapping periodic SRS symbol(s) may be transmitted.

When the UE configures the upper layer parameter usage in the SRS-ResourceSet as "antennaSwitcing" and the guard period of the Y symbol is set, the UE may follow the same priority rule as previously defined as the SRS is configured even during the guard period.

When activating or updating an upper layer parameter spatialRelationInfo of a semi-persistent or aperiodic SRS resource with MAC CE for a CC/bandwidth part indicated by a set of upper layer parameters [applicableCellList], SpatialRelationInfo may be applied to semi-persistent or aperiodic SRS resource(s) having the same SRS resource ID for all bandwidth parts within the indicated CCs.

When the upper layer parameter enableDefaultBeamPl-ForSRS is configured to "enable" and the upper layer parameter spatialRelationInfo for the SRS resource is not configured in FR2, except when the upper layer parameter usage of the SRS resource is set to "beamManagement" or is configured to "nonCodebook" with the associatedCSI-RS setting, and the upper layer parameter pathlossReferenceRS for the UE is not configured, the UE may transmit the target SRS resource according to the following configurations:

The target SRS resource may be transmitted through the same spatial domain transmission filter as that of CORESET having the lowest controlResourceSetID in the activated DL bandwidth part within the CC; and/or
  If no CORESET is configured in the CC, the UE may transmit the target SRS resource with the same spatial domain transmission filter as that in which the activated TCI state of the lowest ID applicable to the PDSCH in the active DL bandwidth part of the CC is received.

Figure 6:
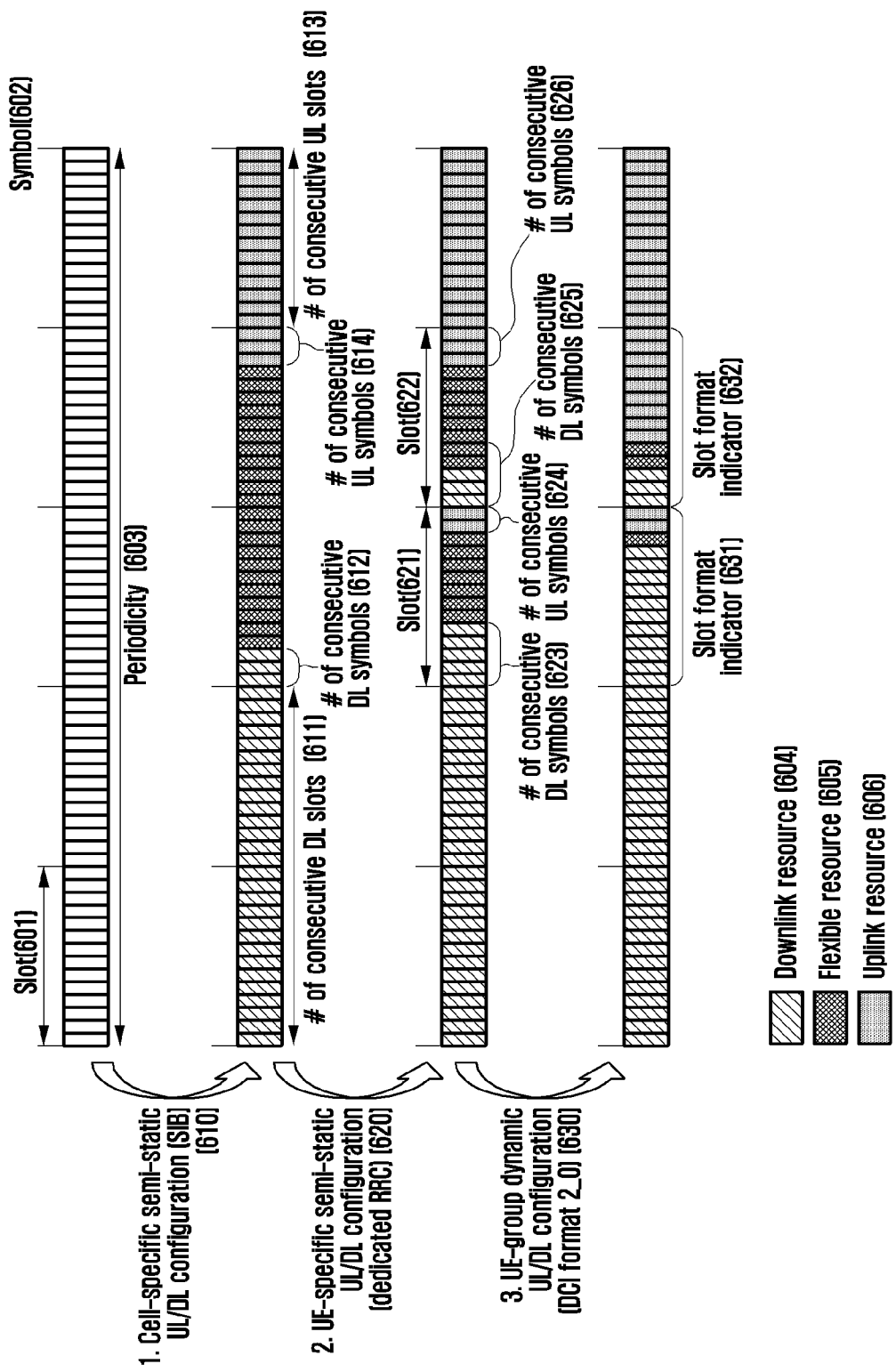
FIG. 6 is a diagram illustrating an example of a method for configuring uplink and downlink resources of a 5G wireless communication system according to an embodiment of the disclosure.

FIG. 6 is a diagram illustrating an example of a method for configuring uplink and downlink resources in a 5G wireless communication system according to an embodiment of the disclosure.

Referring to FIG. 6, a slot 601 may include 14 symbols 602. Uplink-downlink configuration of symbols/slots in the 5G communication system may be configured in three steps. First, semi-statically, uplink-downlink of a symbol/slot may be configured through cell-specific configuration information 610 through system information in a symbol unit. Specifically, the cell-specific uplink-downlink configuration information through the system information may include uplink-downlink pattern information and reference subcarrier information. The pattern periodicity 603, the number of consecutive downlink slots 611 and the number of symbols of the next slot 612 from the start of each pattern, and the number of consecutive uplink slots 613 and the number of symbols of the next slot 614 from the end of the pattern may be indicated in the uplink-downlink pattern information. In this case, slots and symbols not indicated by uplink and downlink may be determined as flexible slots/symbols.

Second, slots 621 and 622 including flexible slots or flexible symbols through user-specific configuration information through dedicated upper layer signaling may be indicated by the number of consecutive downlink symbols 623 and 625 from the start symbol of the slot and the number of consecutive uplink symbols 624 and 626 from the end of the slot, respectively or may be indicated by an all-slot downlink or an all-slot uplink.

In addition, finally, in order to dynamically change the downlink signal transmission and the uplink signal transmission period, whether each of the symbols indicated as flexible symbols (that is, symbols not indicated by downlink and uplink) in each slot is a downlink symbol, an uplink symbol, or a flexible symbol can be indicated through a slot format indicator (SFI) 631 and 632 included in the downlink control channel. The slot format indicator may select one index from [Table 35] in which the uplink-downlink configuration of 14 symbols in one slot is set as illustrated in the table below.

TABLE 35

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | D | F | F | u | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |

TABLE 35-continued

| Format | | | | | | Symbol number in a slot | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In the 5G mobile communication service, an additional coverage extension technology was introduced compared to the LTE communication service, but the actual coverage of the 5G mobile communication service can generally utilize a TDD system suitable for a service with a high proportion of downlink traffic. In addition, as the center frequency is increased to increase the frequency band, the coverage of the base station and the UE is reduced, so that the coverage enhancement is a core requirement of the 5G mobile communication service. In particular, in order to support a service in which the transmission power of the UE is generally lower than that of the base station and the proportion of downlink traffic is high, and the downlink ratio in the time domain is higher than that of the uplink, uplink channel coverage improvement is a key requirement for 5G mobile communication services. As a method of physically improving the coverage of the uplink channel between the base station and the UE, there may be a method of increasing the time resource of the uplink channel, lowering the center frequency, or increasing the transmission power of the UE. However, changing the frequency may be limited because the frequency band is determined for each network operator. In addition, increasing the maximum transmission power of the UE may be limited because the maximum value is determined in order to reduce interference, that is, the maximum transmission power of the UE is determined by regulation.

Therefore, in order to improve the coverage of the base station and the UE, the uplink and downlink resources may be divided in the frequency domain as in the FDD system, rather than dividing the ratio in the time domain according to the proportion of uplink and downlink traffic in the TDD system. In an embodiment, a system capable of flexibly dividing uplink resources and downlink resources in the time domain and frequency domain may be referred to as an XDD system, a Flexible TDD system, a Hybrid TDD system, a TDD-FDD system, a Hybrid TDD-FDD system, a subband full duplex, a full duplex system, and the like, and for convenience of description, the disclosure may be described as an XDD system. According to an embodiment, X in XDD may refer to time or frequency.

Figure 7:
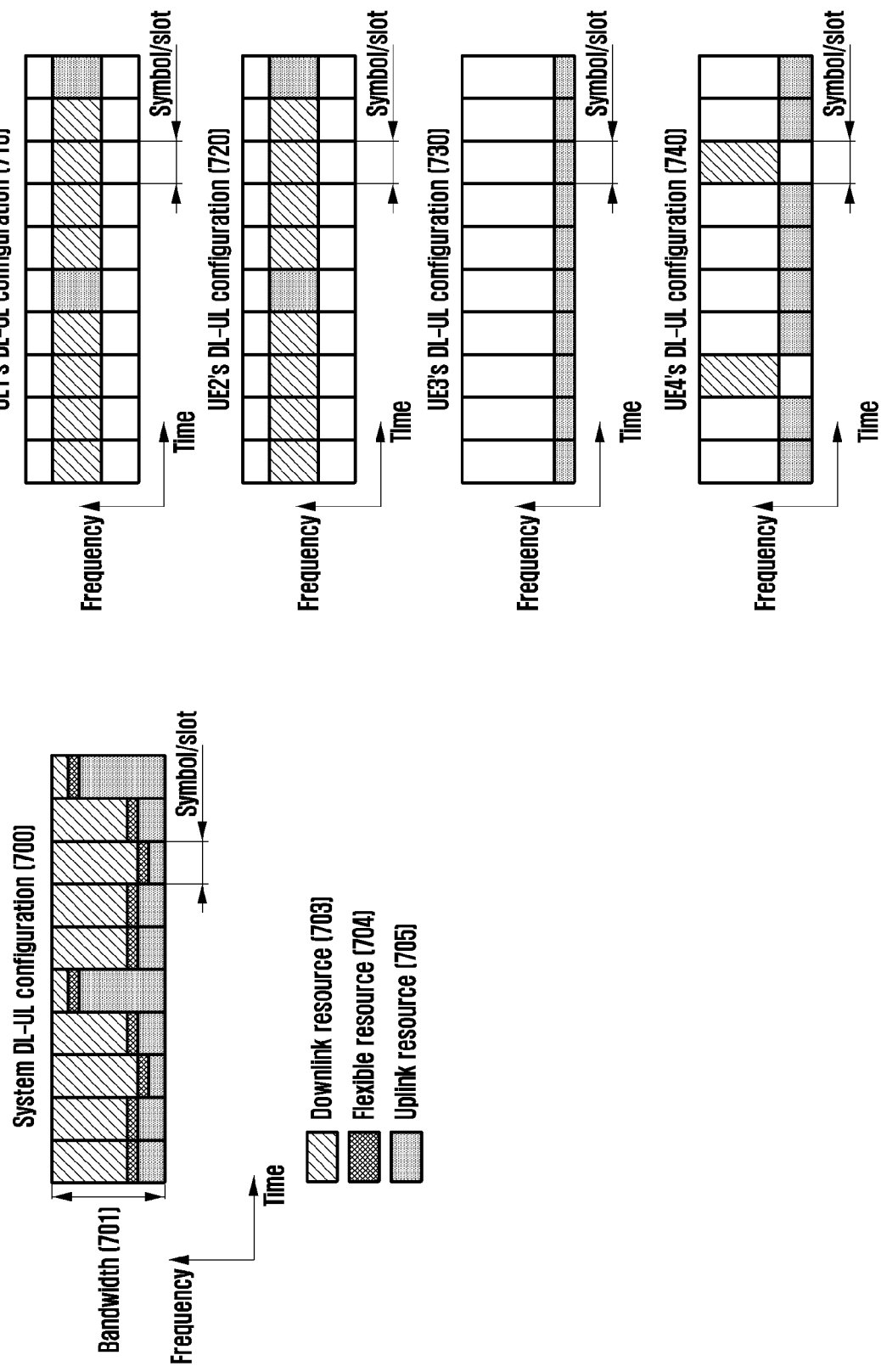
FIG. 7 is a diagram illustrating an uplink-downlink configuration of an XDD system in which uplink and downlink resources are flexibly divided in a time domain and a frequency domain according to an embodiment of the disclosure.

FIG. 7 is a diagram illustrating an uplink-downlink configuration of an XDD system in which uplink and downlink resources are flexibly divided in a time domain and a frequency domain according to an embodiment of the disclosure.

Referring to FIG. 7, from the viewpoint of the base station, in the uplink-downlink configuration 700 of the entire XDD system, resources may be flexibly allocated to each symbol or slot 702 for the entire frequency band 701 depending on the traffic ratio of uplink and downlink. In this case, a guard band 704 may be allocated between the frequency band of the downlink resource 703 and the frequency band of the uplink resource 705. This guard band 704 may be allocated as a method for reducing interference in an uplink channel or signal reception due to out-of-band emission generated when a base station transmits a downlink channel or signal in a downlink resource 703. In this case, as an example, according to the configuration of the base station, UE 1 710 and UE 2 720, in which downlink traffic is generally more than uplink traffic, may be allocated a downlink and uplink resource ratio of 4:1 in the time domain. At the same time, UE 3 730, which operates at the cell edge and lacks uplink coverage, may be allocated only uplink resources in a specific time interval by configuration of the base station. Additionally, UE 4 740 that operates at the cell edge and lacks uplink coverage, but has relatively large amounts of downlink and uplink traffic may be allocated a lot of uplink resources in the time domain for uplink coverage and may be allocated a lot of downlink resources in a frequency band. As in the above example, there is an advantage that more downlink resources can be allocated in the time domain to UEs with relatively large downlink traffic operating in the cell center, and more uplink resources can be allocated in the time domain to UEs that relatively operate at the cell edge and lack uplink coverage.

Figure 8:
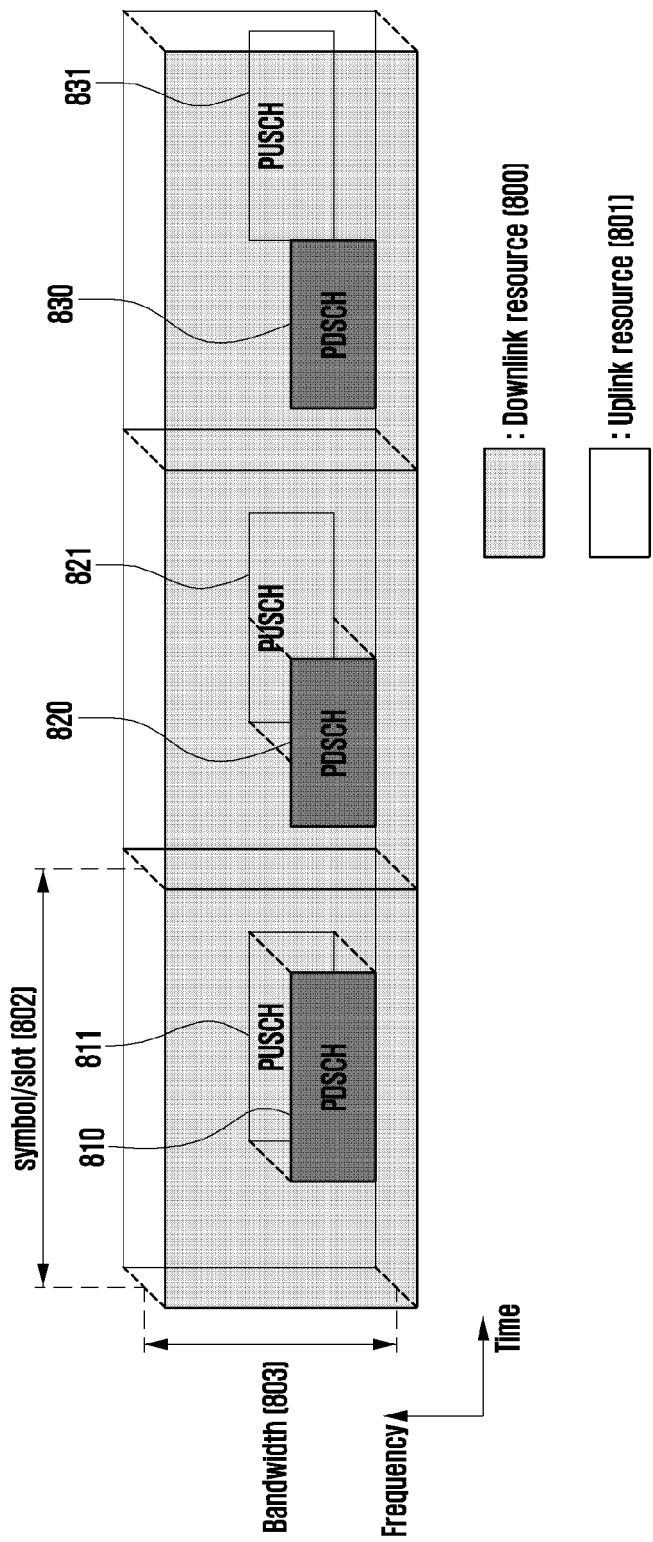
FIG. 8 is a diagram illustrating an example of an uplink-downlink resource configuration of a full-duplex communication system in which uplink and downlink resources are flexibly divided in a time domain and a frequency domain according to an embodiment of the disclosure.

FIG. 8 is a diagram illustrating an example of an uplink-downlink resource configuration of a full-duplex communication system in which uplink and downlink resources are flexibly divided in a time domain and a frequency domain according to an embodiment of the disclosure.

According to an example illustrated in FIG. 8, all or part of the downlink resource 800 and the uplink resource 801 may be configured to overlap in time and frequency domains. In the example of FIG. 8, in the time resource corresponding to the symbol or slot 802 and the frequency resource corresponding to the bandwidth 803, the entire downlink resource 800 and the uplink resource 801 may be set to overlap. Downlink transmission from the base station to the UE may be performed in the area configured as the downlink resource 800, and uplink transmission from the UE to the base station may be performed in the area configured as the uplink resource 801. At this time, because the downlink resource 800 and the uplink resource 801 overlap in time and frequency, downlink and uplink transmission and reception of the base station or the UE may occur simultaneously at the same time and frequency resource.

FIG. 9 is a diagram illustrating a transmission/reception structure for a duplex scheme according to an embodiment of the disclosure.

The transmission/reception structure illustrated in FIG. 9 may be considered in a base station apparatus or a UE apparatus.

According to the transmission/reception structure illustrated in FIG. 9, the transmitting end may be composed of blocks such as a transmit baseband block (Tx baseband) 910, a digital pre-distortion (DPD) 911, a digital-to-analog converter (DAC) 912, a pre-driver 913, a power amplifier (PA) 914, and a transmit antenna (Tx antenna) 915. In addition, the receiving end may be composed of blocks such as a receiving antenna (Rx antenna) 924, a low noise amplifier (LNA) 923, an analog-to-digital converter (ADC) 922, a successive interference canceller 921, and a reception baseband block (Rx baseband) 920. In addition, a power amplifier connector (PA coupler) 916 and a constant update block (coefficient update) 917 may exist for additional signal processing between the transmitter and the receiver.

A schematic role of each block may be as follows:

Transmit baseband block 910: A digital processing block for a transmit signal;

Digital pre-distortion block 911: Pre-distortion of digital transmission signal;

Digital-to-analog converter 912: Converts digital signals to analog signals;

Pre-driver 913: Progressive power amplification of analog transmission signals;

Power Amplifier 914: Power amplification of analog transmission signals;

Transmitting antenna 915: An antenna for transmitting a signal;

Receiving antenna 924: An antenna for receiving a signal;

Low noise amplifier 923: While amplifying the power of the analog reception signal, the amplification of noise is minimized;

Analog to Digital Converter 922: Converts analog signals to digital signals;

Continuous interference canceller 921: interference canceller for digital signals;

Receive baseband block 920: Digital processing block for the received signal;

Power amplifier connector 916: Observe the waveform of the analog transmission signal passing through the power amplifier at the receiving end; and Constant update block 917: Updates various constants necessary for digital domain signal processing of the transmitting end and the receiving end, the constants calculated here may be used to set various parameters in the DPD 911 block of the transmitting end and the SIC 921 block of the receiving end.

The transmission/reception structure illustrated in FIG. 9 may be utilized for the purpose of effectively controlling interference between a transmission signal and a reception signal when transmission and reception operations are simultaneously performed in a base station or a UE device. For example, when transmission and reception occur at the same time in an arbitrary device, the transmit signal 901 transmitted through the transmit antenna 915 of the transmitting end may be received through the receive antenna 924 of the receiving end, and in this case, the transmission signal 901 received by the receiving end may cause interference 900 to the received signal 902 originally intended to be received by the receiving end. Interference between the transmission signal 901 and the reception signal 902 received by the receiving end is called self-interference 900.

For example, specifically, if the base station apparatus performs downlink transmission and uplink reception at the same time, the downlink signal transmitted by the base station may be received by the receiving end of the base station, and as a result, interference between the downlink signal transmitted by the base station and the uplink signal originally intended to be received by the base station may occur at the receiving end of the base station. If the UE device simultaneously performs downlink reception and uplink transmission, the uplink signal transmitted by the UE may be received by the receiving end of the UE, and as a result, interference between the uplink signal transmitted by the UE and the downlink signal originally intended to be received by the UE may occur at the receiving end of the UE. As described above, interference between links in different directions in a base station and a UE device, that is, between a downlink signal and an uplink signal, is also called cross-link interference.

In an embodiment of the disclosure, self-interference between a transmission signal (or a downlink signal) and a reception signal (or an uplink signal) may occur in a system in which transmission and reception can be performed simultaneously.

An embodiment of the disclosure provides an effective transmission signal scheduling method in consideration of when signal qualities are different in parts of a time and frequency resource region in which signals are to be transmitted and received.

Hereinafter, higher layer signaling may be signaling corresponding to at least one or a combination of one or more of the following signaling:

MIB (master information block);

SIB (system information block) or SIB X (X=1, 2, . . . );

RRC (radio resource control);

MAC (medium access control) CE (control element);

UE capability reporting; and/or

UE assistance information or message (UE assistance information message).

In addition, L1 signaling may be signaling corresponding to at least one or a combination of one or more of the following physical layer channels or signaling methods:

PDCCH (physical downlink control channel);

DCI (downlink control information);

UE-specific DCI;

group common DCI;

common DCI;

Scheduling DCI (for example, DCI used for scheduling downlink or uplink data);

Non-scheduling DCI (for example, DCI not for the purpose of scheduling downlink or uplink data);

PUCCH (physical uplink control channel); and/or

UCI (uplink control information).

In the disclosure, a system (for example, a system that may be referred to as an XDD system, a Flexible TDD system, a Hybrid TDD system, a TDD-FDD system, a Hybrid TDD-FDD system, a subband full duplex, a full duplex system, etc.) capable of flexibly dividing uplink resources and downlink resources in the time domain and the frequency domain is considered. For convenience of description, the aforementioned next-generation duplex system is referred to as an XDD system, and the name referred to is not limited thereto. In a next-generation duplex system, for example, XDD, downlink transmission and uplink reception may occur simultaneously at a specific time in the base station. At a point in time when uplink and downlink transmission and reception occur simultaneously, the UE may use some antennas among all antennas for downlink transmission, and may use some remaining antennas for uplink reception.

First, the disclosure provides a transmission/reception structure of a base station to support a next-generation duplex scheme. According to an embodiment of the disclosure, the base station may operate in different duplex modes according to time, and may activate different transmit/receive antennas for each duplex mode.

Next, the disclosure provides a method for measuring and reporting a channel of a UE in consideration of partial antenna activation in a base station. As described above, the base station may activate different transmit/receive antennas in a specific situation, and accordingly, it may be difficult to ensure channel reciprocity or reciprocity between the uplink channel and the downlink channel. In order to overcome this problem, the disclosure provides a method of configuration and transmitting CSI-RS parameters of a base station and a method of measuring and reporting a channel state through CSI-RS reception of a UE. In addition, a method of configuring SRS of a base station and transmitting SRS of a UE is provided.

First Embodiment: Antenna Operating Method According to Duplex Operation

The first embodiment of the disclosure provides a method and apparatus for transmitting and receiving a base station in a next-generation duplex (hereinafter referred to as XDD) system.

Figure 10:
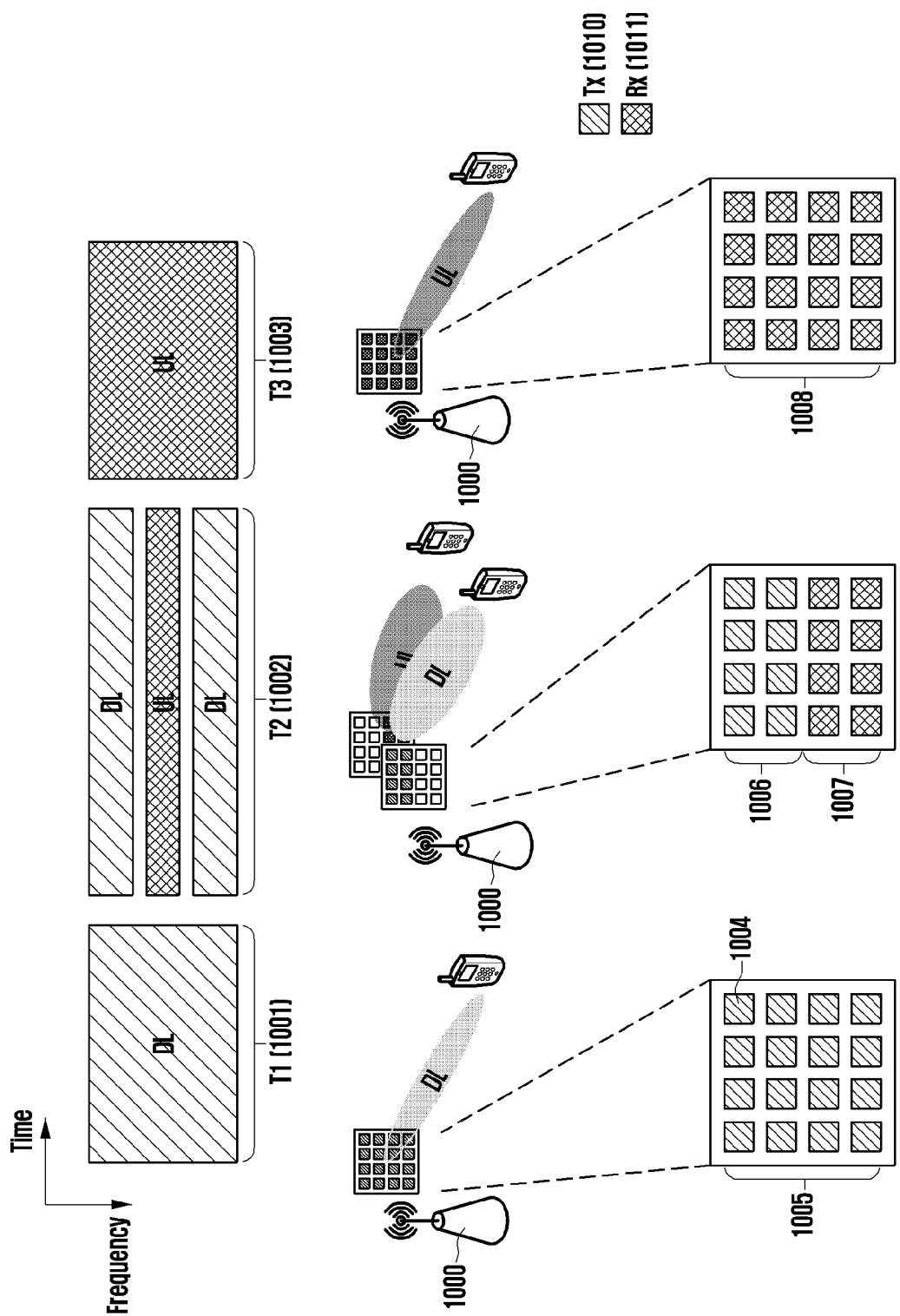
FIG. 10 is a diagram illustrating a transmission/reception operation of a base station according to an embodiment of the disclosure.

FIG. 10 is a diagram illustrating an example of uplink and downlink operation of a wireless communication system according to an embodiment of the disclosure. According to an embodiment of the disclosure, a wireless communication system may be operated with different uplink and downlink patterns according to time. For example, at a specific point in time, uplink may occur, downlink may occur, or both uplink and downlink may occur. In the example of FIG. 10, it is illustrated that downlink is allocated at time T1 1001, both uplink and downlink are allocated at time T2 1002, and only uplink is allocated at time T3 1003. In particular, at time T2 1002, uplink and downlink are allocated in different frequency bands, and transmission and reception occur simultaneously at the base station as an example.

In the disclosure, a transmission/reception mode in which either the downlink or the uplink occurs at a specific time point is called a "first duplex mode." For example, in the example of FIG. 10, it may be assumed to operate in the "first duplex mode" in a time interval corresponding to time T1 1001 in which only downlink occurs and time T3 1003 in which only uplink occurs. The "first duplex mode" may correspond to, for example, a duplex mode corresponding to the TDD scheme.

In the disclosure, a transmission/reception mode in which both downlink and uplink occur at a specific time point is called "second duplex mode." For example, in the example of FIG. 10, it may be assumed to operate in the "second duplex mode" in a time interval corresponding to a time T2 1002 in which the uplink and the downlink occur simultaneously. The "second duplex mode" may correspond to, for example, a duplex mode corresponding to the aforementioned XDD scheme.

According to an embodiment of the disclosure, the base station may differently adjust the activated antenna according to the type of the duplex mode at a specific time point. The antenna 1004 of the base station may refer to all or part of a series of components related to an antenna, such as an antenna module, an antenna element, an antenna panel, and an antenna port. The base station may adjust the active antenna according to whether uplink reception, downlink transmission, or both uplink reception and downlink transmission are performed at a specific time point.

According to an example of FIG. 10, the base station may perform transmission 1010 by activating all 1005 antennas 1004 at time T1 1001 when only downlink occurs, and may perform reception 1011 by activating all 1008 antennas 1004 at time T3 1003 when only uplink occurs. The base station may perform transmission using some 1006 antennas 1004 among all antennas at time T2 1002 when both uplink and downlink occur, and may perform reception using another 1007 antennas. Accordingly, antennas through which the base station transmits and receives may be different from each other according to the duplex mode type at each time point.

FIG. 11 is a diagram illustrating an example of a method for operating an antenna of a base station according to an embodiment of the disclosure.

Figure 11A:
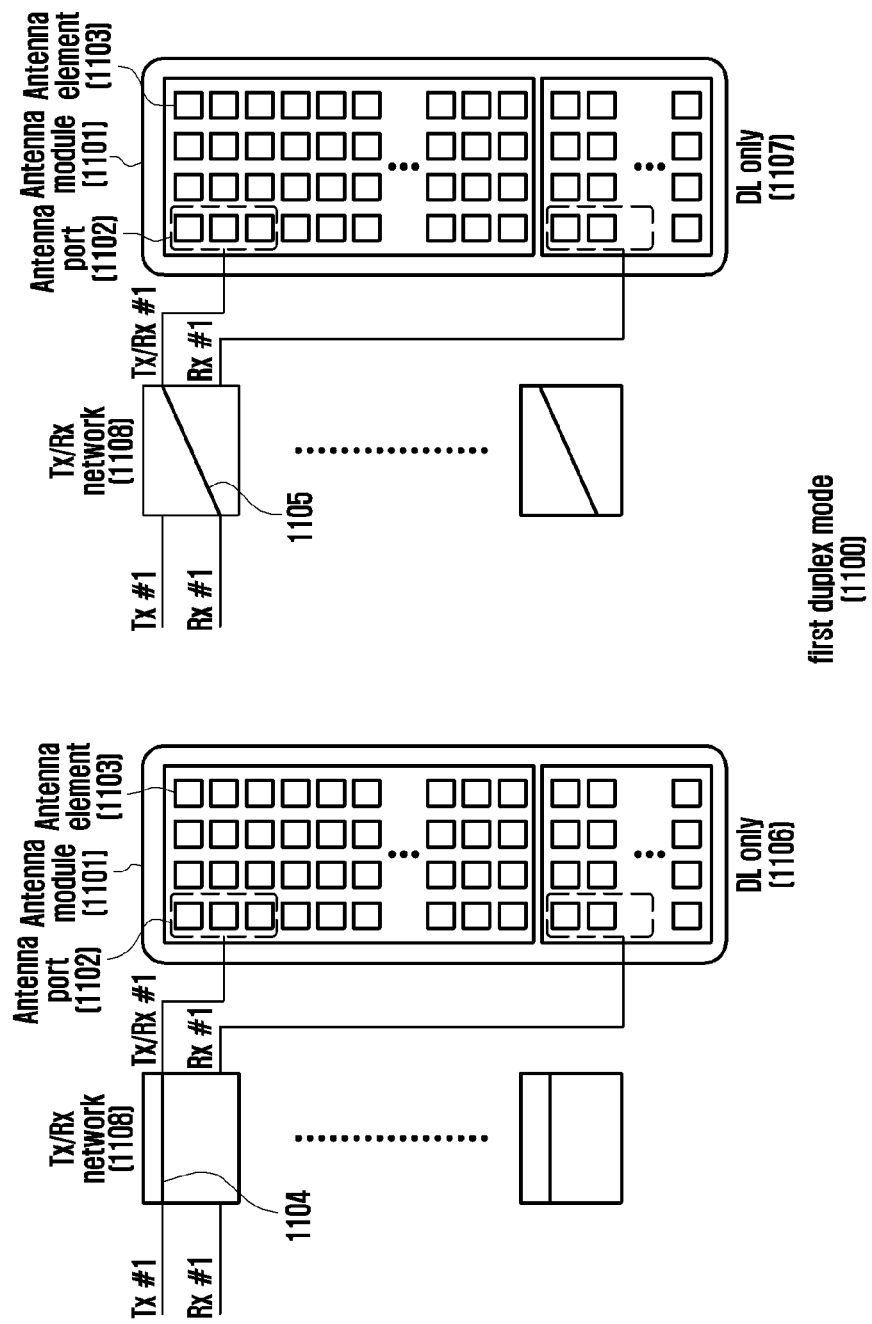
FIG. 11A is a diagram illustrating an operation of a base station according to an embodiment of the disclosure.

FIG. 11A illustrates an example of an antenna operation of a base station operating in the first duplex mode 1100. The antenna module 1101 of the base station may be configured with one or a plurality of antenna elements 1103. One or a plurality of antenna elements 1103 may constitute one antenna port 1102. In the example of FIG. 11A, whether to use for transmission or reception for each antenna port 1102 may be determined by the transmission/reception network 1108. If the base station operating in the first duplex mode 1100 generates downlink at a specific time point 1106, all antenna ports 1102 of the antenna module 1101 may be used for transmission (connected to transmit in the transmit/receive network 1108 with respect to whether all antenna ports 1102 transmit/receive, such as 1104). If the base station operating in the first duplex mode 1100 generates uplink at a specific time 1107, all antenna ports 1102 of the antenna module 1101 may be used for reception (connected to receive in the transmit/receive network 1108 with respect to whether all antenna ports 1102 transmit/receive, such as 1105).

Figure 11B:
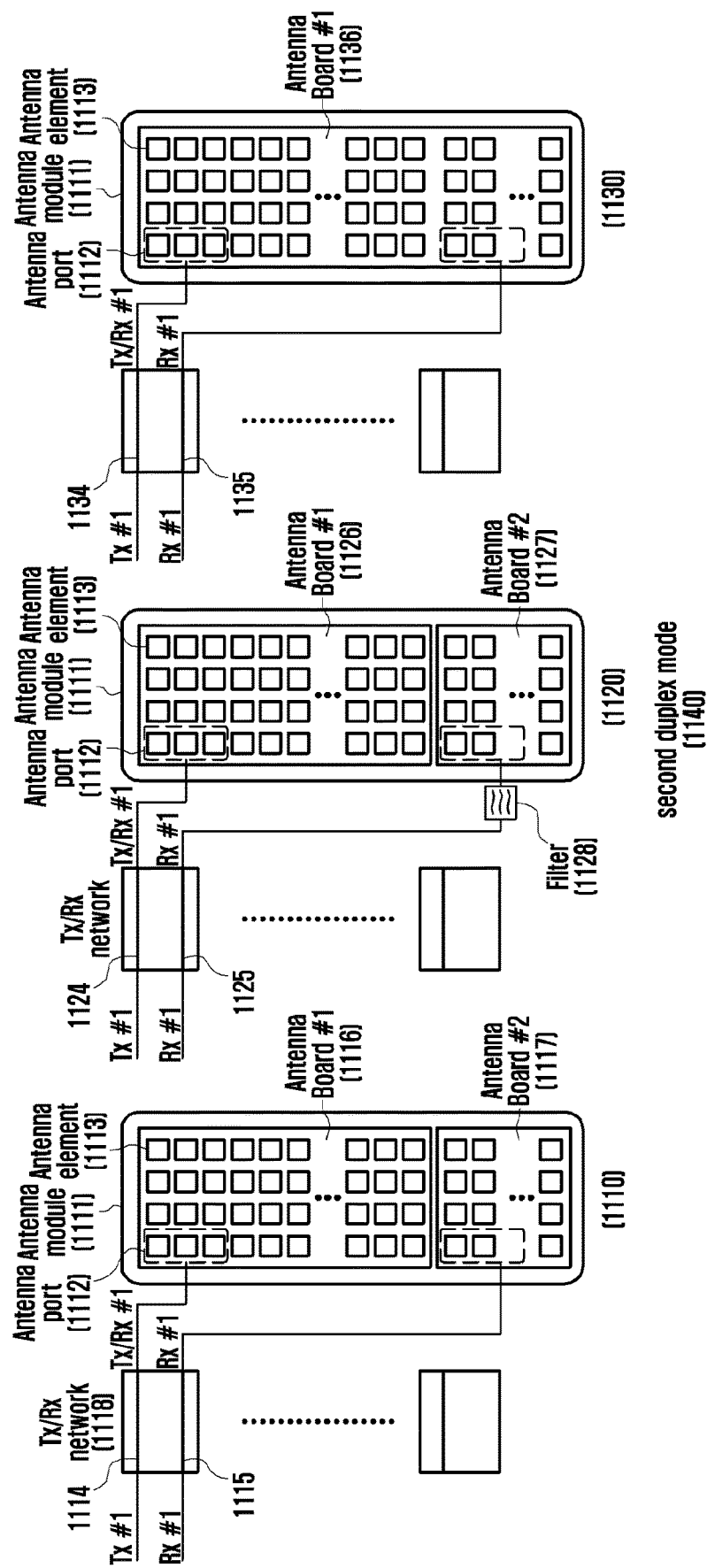
FIG. 11B is a diagram illustrating an operation of a base station according to an embodiment of the disclosure.

FIG. 11B illustrates an example of antenna operation of the base station operating in the second duplex mode 1140. The antenna module 1111 of the base station may be configured with one or a plurality of antenna elements 1113. One or a plurality of antenna elements 1113 may constitute one antenna port 1112. In the example of FIG. 11B, whether to use for transmission or reception for each antenna port 1112 may be determined by the transmission/reception network 1118. When operating in the second duplex mode 1140, both uplink and downlink may occur at a specific point in time, and accordingly, the base station may use a part of the antenna port 1112 or the antenna element 1113 for uplink reception, and may use another part for downlink transmission.

In FIG. 11B, 1110 illustrates an example of an antenna operation of a base station. The antenna module 1111 of the base station may be composed of a plurality of antenna boards 1116 and 1117. In 1110, an example composed of the antenna board #1 1116 and the antenna board #2 1117 is illustrated. Antenna ports or antenna elements of a specific antenna board may be used for uplink reception or downlink transmission purposes. By using a plurality of antenna boards, cross-link interference that may occur when uplink reception and downlink transmission are simultaneously performed may be alleviated. For example, a downlink transmission signal may be received by a reception antenna of a specific antenna board and may interfere with an uplink signal that may be originally received by the corresponding reception antenna. By separating an antenna board having an antenna for uplink reception and an antenna board having an antenna used for downlink transmission, the influence of cross-link interference may be reduced. In an example of 1110, in the base station operating in the second duplex mode, an antenna port 1112 or an antenna element 1113 in the antenna board #1 1116 may be used for downlink transmission 1114, and an antenna port 1112 or an antenna element 1113 in the antenna board #2 1117 may be used for uplink reception 1115.

In FIG. 11B, 1120 illustrates an example of an antenna operation of a base station. The antenna module 1111 of the base station may be composed of a plurality of antenna boards 1126 and 1127. In 1120, an example composed of the antenna board #1 1126 and the antenna board #2 1127 is illustrated. Antenna ports or antenna elements of a specific antenna board may be used for uplink reception or downlink transmission purposes. By using a plurality of antenna boards, cross-link interference that may occur when uplink reception and downlink transmission are simultaneously performed may be alleviated. For example, a downlink transmission signal may be received by a reception antenna of a specific antenna board and may interfere with an uplink signal that may be originally received by the corresponding reception antenna. By separating an antenna board having an antenna for uplink reception and an antenna board having an antenna used for downlink transmission, the influence of cross-link interference may be reduced. In addition, in 1120, a filter 1128 may be additionally connected to a specific antenna board. The filter 1128 may serve to filter the amount of interference that the downlink signal gives to the uplink signal to reduce the amount of interference.

In an example of 1120, in the base station operating in the second duplex mode, an antenna port 1112 or an antenna element 1113 in the antenna board #1 1126 may be used for downlink transmission 1124, and an antenna port 1112 or an antenna element 1113 in the antenna board #2 1127 may be used for uplink reception 1125. In addition, the filter 1128 is additionally connected to the antenna board #2 1127, so that the filter can serve to additionally control downlink signal interference. The filter 1128 may exist in an antenna (or antenna board) for downlink transmission, in an antenna (or antenna board) for uplink reception, or in both an antenna (or antenna board) for downlink transmission and an antenna (or antenna board) for uplink reception. In this case, the size of the bandwidth supported by the filter on the downlink transmission side and the filter on the uplink reception side may be different from each other. For example, the filter on the downlink transmission side may have a bandwidth corresponding to X1 MHz, and the filter on the uplink reception side may have a bandwidth of X2 MHz. By using filters having different sizes of filtering bandwidths for uplink and downlink, interference between downlink signals and uplink signals transmitted and received with different bandwidth sizes may be effectively controlled.

In FIG. 11B, 1130 illustrates an example of an antenna operation of a base station. The antenna module 1111 of the base station may be composed of a plurality of antenna boards 1136. In 1130, the antenna module 1111 illustrates an example in which one antenna board #1 1136 is configured. Some antenna ports or antenna elements in one antenna board 1136 may be used for uplink reception or downlink transmission. In an example of 1130, in the base station operating in the second duplex mode, a part of the antenna port 1112 or the antenna element 1113 in the antenna board #1 (1136) may be used for downlink transmission 1134, and another antenna port 1112 or part of the antenna element 1113 in the antenna board #1 (1136) may be used for uplink reception 1135.

In this case, some antenna ports or antenna elements in one antenna board may not be used for downlink transmission or uplink reception. For example, an antenna port or some of the antenna elements located at the upper part of the antenna board may be used for downlink transmission, an antenna port or some of the antenna elements located at the bottom of the antenna board may be used for uplink reception, and an antenna port or some of the antenna elements located at the middle part of the antenna board may not be used for uplink or downlink. Through this, by increasing the distance between the antenna actually used for downlink transmission and the antenna actually used for uplink reception, cross-link interference from the downlink transmission signal to the uplink reception signal may be effectively controlled.

Second Embodiment: CSI Measurement and Reporting Method Considering Duplex Mode Change A second embodiment of the disclosure provides a CSI measurement/reporting method and apparatus in consideration of duplex mode change.

Figure 12:
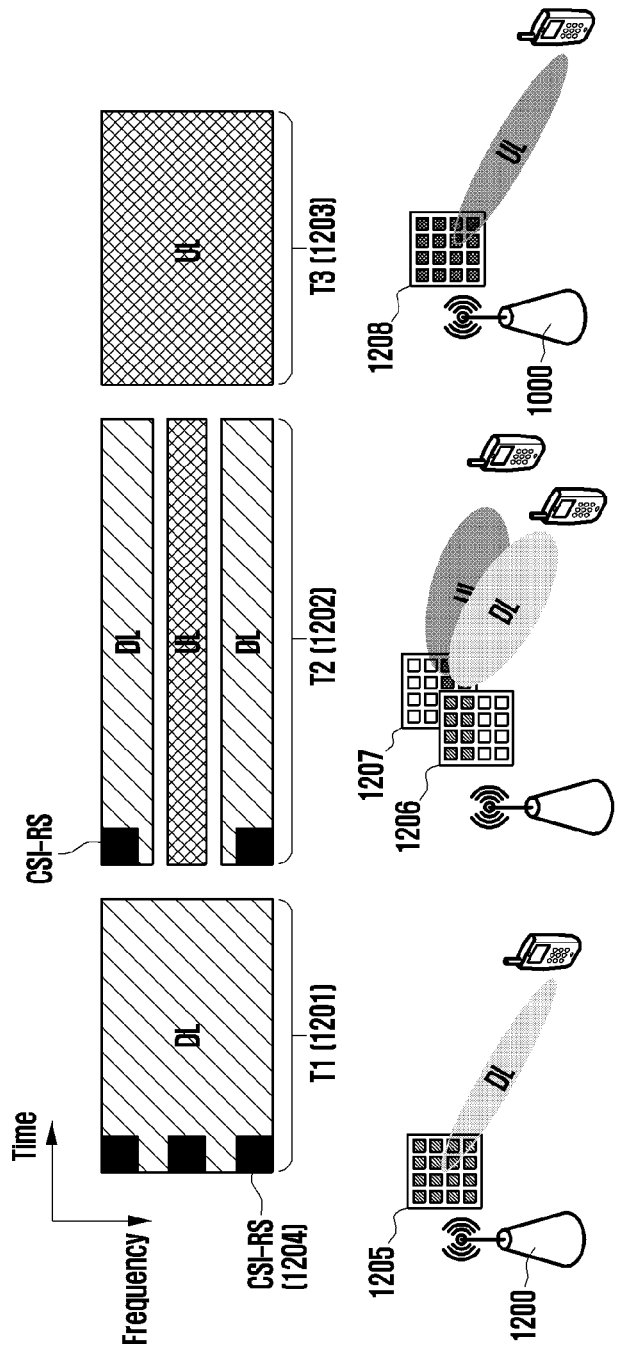
FIG. 12 is a diagram illustrating a CSI-RS transmission/reception operation according to an embodiment of the disclosure.

FIG. 12 is a diagram illustrating an example of a duplex operation method according to an embodiment of the disclosure. According to an embodiment of the disclosure, only the uplink may occur, only the downlink may occur, or both the uplink and the downlink may occur at a specific time. In the example of FIG. 12, it is illustrated that downlink is allocated at time T1 1201, both uplink and downlink are allocated at time T2 1202, and only uplink is allocated at time T3 1203. In particular, at time T2 1202, uplink and downlink are allocated in different frequency bands, and transmission and reception occur simultaneously in the base station as an example. According to the definition of the duplex mode described above, it may be considered to be operated in the first duplex mode (e.g., TDD) at times T1 1201 and T3 1203, and may be considered to be operated in the second duplex mode (e.g., XDD) at time T2 1202.

According to an embodiment of the disclosure (e.g., the first embodiment of the disclosure), the base station may differently adjust the active antenna according to the type of the duplex mode at a specific time point. Here, the antenna of the base station may refer to all or part of a series of components related to an antenna, such as an antenna module, an antenna element, an antenna panel, and an antenna port. The base station may adjust the active antenna according to whether uplink reception, downlink transmission, or both uplink reception and downlink transmission are performed at a specific time point. According to an example of FIG. 12, the base station may perform transmission by activating all antennas at time T1 1201 when only downlink occurs 1205. At time T3 1203, when only uplink occurs, reception may be performed by activating all antennas 1208. The base station may perform transmission using some antennas among all antennas at time T2 1202 when both uplink and downlink occur 1206, and may perform reception using another partial antennas 1207. Accordingly, antennas through which the base station transmits and receives may be different from each other according to the duplex mode type at each time point.

According to an embodiment of the disclosure, an antenna activated by a base station for transmission and reception may be different depending on a time point. Accordingly, the transmission beam characteristics of the base station of an arbitrary downlink signal may vary for each time point, and the UE may need to apply and receive a reception beam for receiving the corresponding downlink signal differently. Therefore, the disclosure provides a CSI-RS configuration and a CSI measurement method based on the CSI-RS for correctly performing CSI measurement of the UE when the base station differently operates an antenna activated according to a specific time point.

According to an embodiment of the disclosure, the base station may configure an uplink and a downlink pattern to the UE. For example, the base station may configure or indicate the resource region to which the uplink is allocated and the resource region to which the downlink is allocated by higher layer signaling, L1 signaling, or a combination of higher layer signaling and L1 signaling to the UE. The UE may determine a time point of operation in the first duplex mode and a time point of operation in the second duplex mode based on the uplink and downlink patterns received from the base station.

According to an embodiment of the disclosure, the base station may explicitly configure the time period operated in the first duplex mode and the time period operated in the second duplex mode to the UE. For example, the base station may configure or indicate a time interval operating in the first duplex mode and a time interval operating in the second duplex mode through higher layer signaling, L1 signaling, or a combination of higher layer signaling and L1 signaling to the UE.

In an embodiment of the disclosure, the UE may implicitly determine whether a specific time interval corresponds to the first duplex mode or the second duplex mode, or may be explicitly configured or indicated by the base station.

In some embodiments of the disclosure, the UE may differently adjust parameters for receiving the CSI-RS transmitted at a specific time, based on the duplex mode.

Embodiment 2-1

In some embodiments of the disclosure, based on the duplex mode, the UE may receive the corresponding CSI-RS by assuming different QCL information for receiving the CSI-RS transmitted at a specific time point.

More specifically, when the UE receives the CSI-RS at a specific time, it may be determined first whether the corresponding time point corresponds to a time interval operating in the first duplex mode or a time interval operating in the second duplex mode. If the corresponding time point corresponds to the first duplex mode, QCL information for the CSI-RS to be received may be considered based on the first TCI state. If the corresponding time point corresponds to the second duplex mode, QCL information for the CSI-RS to be received may be considered based on the second TCI state. To this end, the base station may configure a plurality of QCL information (qcl-info) for one CSI-RS to the UE. For example, the base station may configure two TCI states, for example, TCI #1 and TCI #2, as parameters for QCL information as configuration information for CSI-RS to the UE. The UE may assume TCI #1 or TCI #2 based on the duplex mode at the time of receiving the corresponding CSI-RS. For example, the UE may receive the corresponding CSI-RS assuming TCI #1 in the first duplex mode, and may receive the corresponding CSI-RS assuming TCI #2 in the second duplex mode.

Embodiment 2-2

In some embodiments of the disclosure, based on the duplex mode, the UE may receive the corresponding CSI-RS by assuming that the number of ports for receiving the CSI-RS transmitted at a specific time is different from each other.

More specifically, the base station may configure the number of ports for the CSI-RS as N to the UE. When the UE receives the CSI-RS at a specific time point, the UE may first determine whether the corresponding time point corresponds to a time interval operating in the first duplex mode or a time interval operating in the second duplex mode. If it corresponds to the first duplex mode, it is possible to receive the CSI-RS corresponding to the N ports configured for the CSI-RS to be received. If it corresponds to the second duplex mode, it is possible to receive the CSI-RSs corresponding to M ($\leq$N) ports for the CSI-RS to be received. The M value corresponding to the number of ports of CSI-RS received by the UE in the second duplex mode may correspond to a value explicitly configured or indicated through higher layer signaling or L1 signaling from the base station. Alternatively, the M value may correspond to a predetermined fixed value. Alternatively, the value of M may correspond to an arbitrary value expressed as a function of N, for example, M may correspond to N/K (K=1, 2, 3, 4, . . . ).

Figure 13:
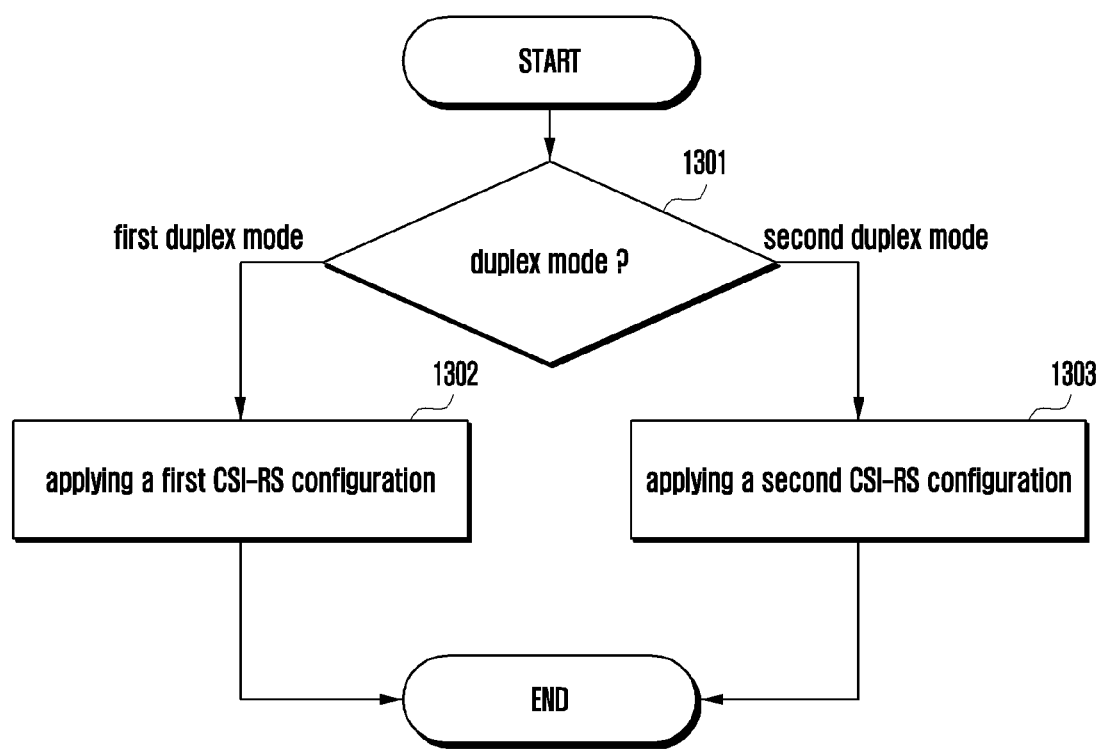
FIG. 13 is a diagram illustrating a procedure of a base station and a UE according to an embodiment of the disclosure.

FIG. 13 is a diagram illustrating operations of a base station and a UE according to a second embodiment of the disclosure.

The base station may determine the duplex mode at a specific time point at which the CSI-RS is to be transmitted in step 1301. If it corresponds to the first duplex mode, the base station may transmit by applying the first configuration to the CSI-RS to be transmitted (step 1302). If it corresponds to the second duplex mode, the base station may transmit by applying the second configuration to the CSI-RS to be transmitted (step 1303).

The UE may determine the duplex mode at a specific time point at which to transmit the CSI-RS in step 1301. If it corresponds to the first duplex mode, the UE may receive by applying the first configuration to the CSI-RS to be received (step 1302). If it corresponds to the second duplex mode, the UE may receive by applying the second configuration to the CSI-RS to be received (step 1303).

Third Embodiment: SRS Transmission Method Considering Duplex Mode Change

A third embodiment of the disclosure provides an SRS transmission method and apparatus in consideration of duplex mode change.

Figure 14:
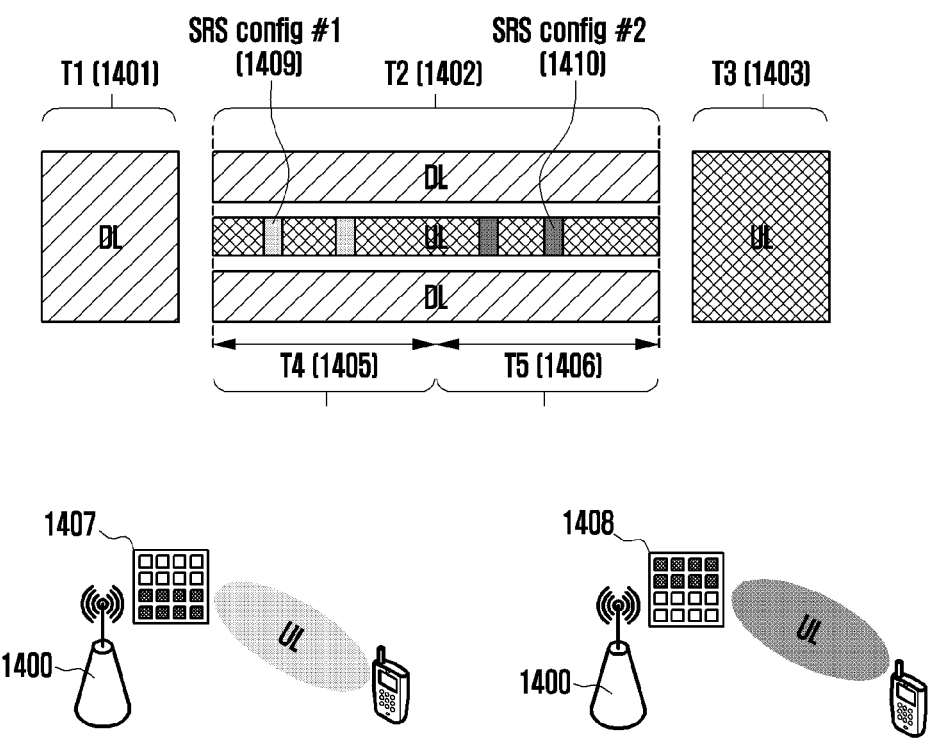
FIG. 14 is a diagram illustrating an SRS transmission/reception operation according to an embodiment of the disclosure.

FIG. 14 is a diagram illustrating an example of a duplex operation method according to an embodiment of the disclosure. According to an embodiment of the disclosure, only the uplink may occur, only the downlink may occur, or both the uplink and the downlink may occur at a specific time. In the example of FIG. 14, it is illustrated that downlink is allocated at time T1 1401, both uplink and downlink are allocated at time T2 1402, and only uplink is allocated at time T3 1403. In particular, at time T2 1402, uplink and downlink are allocated in different frequency bands, and transmission and reception occur simultaneously in the base station as an example. According to the definition of the duplex mode described above, at times T1 1401 and T3 1403, it may be considered to be operated in the first duplex mode (e.g., TDD), and at times T2 1402, it may be considered to be operated in the second duplex mode (e.g., XDD).

According to an embodiment of the disclosure (e.g., the first embodiment of the disclosure), the base station may differently adjust the active antenna according to the type of the duplex mode at a specific time point. Here, the antenna of the base station may refer to all or part of a series of components related to an antenna, such as an antenna module, an antenna element, an antenna panel, and an antenna port. The base station may adjust the active antenna according to whether uplink reception, downlink transmission, or both uplink reception and downlink transmission are performed at a specific time point. Accordingly, antennas through which the base station transmits and receives may be different from each other according to the duplex mode type at each time point.

According to an embodiment of the disclosure, an antenna activated by the base station for transmission and reception may be different depending on the viewpoint, and accordingly, reciprocity between downlink channel state information and uplink channel state information may not be guaranteed. The reciprocity between the uplink channel and the downlink channel refers to that the uplink channel and the downlink channel are similar. For example, an uplink channel and a downlink channel in a reciprocal relationship may be considered to have similar channels or have similar channel statistical characteristics (delay spread, Doppler shift, beam direction, etc.). Referring to FIG. 12, the antenna 1206 used for downlink transmission and the antenna 1207 used for uplink reception in the base station 1200 during time T2 1202 may be different from each other. In this case, the base station may receive the SRS transmitted from the UE through the 1207 antenna, and may estimate the uplink channel through the received SRS. The uplink channel estimated in this way may not have a reciprocal relationship with the downlink channel transmitted from the base station through the 1206 antenna. An embodiment of the disclosure provides a method for receiving an SRS by a base station and a method for transmitting an SRS by a UE for maintaining a reciprocity relationship between uplink and downlink channels.

According to an embodiment of the disclosure, the base station may configure an uplink and downlink pattern to the UE. For example, the base station may configure or indicate the resource region to which the uplink is allocated and the resource region to which the downlink is allocated by higher layer signaling, L1 signaling or a combination of higher layer signaling and L1 signaling to the UE. The UE may determine a time point of operation in the first duplex mode and a time point of operation in the second duplex mode based on the uplink and downlink patterns received from the base station.

According to an embodiment of the disclosure, the base station may explicitly configure the time period operated in the first duplex mode and the time period operated in the second duplex mode to the UE. For example, the base station may configure or indicate a time interval operating in the first duplex mode and a time interval operating in the second duplex mode through higher layer signaling, L1 signaling or a combination of higher layer signaling and L1 signaling to the UE.

In an embodiment of the disclosure, the UE may implicitly determine whether a specific time interval corresponds to the first duplex mode or the second duplex mode, or may be explicitly configured or indicated by the base station.

In some embodiments of the disclosure, the UE may transmit assuming different transmission parameters according to time points with respect to the SRS transmitted in the time interval operating in the second duplex mode. In order to receive the SRS transmitted from the UE in the time interval operating in the second duplex mode, the base station may activate different antennas according to time points to receive the corresponding SRS.

In some embodiments of the disclosure, with respect to the SRS transmitted in the time interval operating in the second duplex mode, the base station and the UE may perform transmission/reception based on different transmission parameters according to time points.

It will be described in detail with reference to FIG. 14 as follows.

According to an embodiment of the disclosure, in a method for the base station to receive the SRS in a time interval operating in the second duplex mode at time T2 1402, the base station may activate different antenna sets differently according to time in order to receive an uplink. For example, the base station may receive by activating 1407 some (e.g., antenna #1, #2, . . . , #N) of all M antennas for uplink reception at a specific time T4 1405, and may receive by activating 1408 some of remains (e.g., antenna #N+1, #N+2, . . . , #M) of all M antennas for uplink reception at another time T5 1406. That is, the base station may differently operate an antenna activated to receive the SRS according to a specific time point.

According to an embodiment of the disclosure, the base station may configure information (e.g., SRS-SpatialRelationInfo) related to one or a plurality of SRS transmission beams for one SRS resource to the UE through higher layer signaling. The UE may receive configured information (e.g., SRS-SpatialRelationInfo) related to a plurality of SRS transmission beams for one SRS resource from the base station. As an example, when CSI-RS is referenced as information of SRS-SpatialRelationInfo, SRS-SpatialRelationInfo of one SRS resource may be configured as {CSI-RS #1, CSI-RS #2, . . . }. When transmitting the corresponding SRS, the UE may transmit the SRS using a transmission beam having characteristics similar to the reception beam used when receiving the RS referenced by SRS-SpatialRelationInfo. The UE may assume different SRS-SpatialRelationInfo from each other and transmit according to the time point for the corresponding SRS. For example, when {CSI-RS #1, CSI-RS #2} is configured as configuration information for SRS-SpatialRelationInfo for one SRS, when transmitting the corresponding SRS, the UE may consider CSI-RS #1 as SRS-SpatialRelationInfo and transmit at a specific time point, and may consider CSI-RS #2 as SRS-SpatialRelationInfo and transmit at another time point. In the example of FIG. 14, the UE may consider the SRS configuration #1, for example, CSI-RS #1, as SRS-SpatialRelationInfo and transmit at time T4 1405, and may consider SRS configuration #2, for example, CSI-RS #2, as SRS-SpatilRelationInf and transmit at time T5 1406.

In an embodiment of the disclosure, the base station may notify the UE of configuration information for a time interval in which configuration information for SRS is to be changed through higher layer signaling. For example, in FIG. 14, information on a time interval T4 1405 (this is called the first time interval) in which SRS transmission and reception is performed based on SRS configuration #1 1409 and information on a time interval T5 1406 (this is called the second time interval) in which SRS transmission and reception is performed based on SRS configuration #2 1410 may be configured to the UE, respectively.

According to an embodiment of the disclosure, the base station may secure reciprocity with downlink channels for all antennas by receiving the SRS transmitted by the UE through different sets of receiving antennas. The UE transmits the SRS assuming different uplink transmission beams at different time points so that the base station can effectively receive the corresponding SRS through the receive beams using different antenna sets at each time point.

Figure 15:
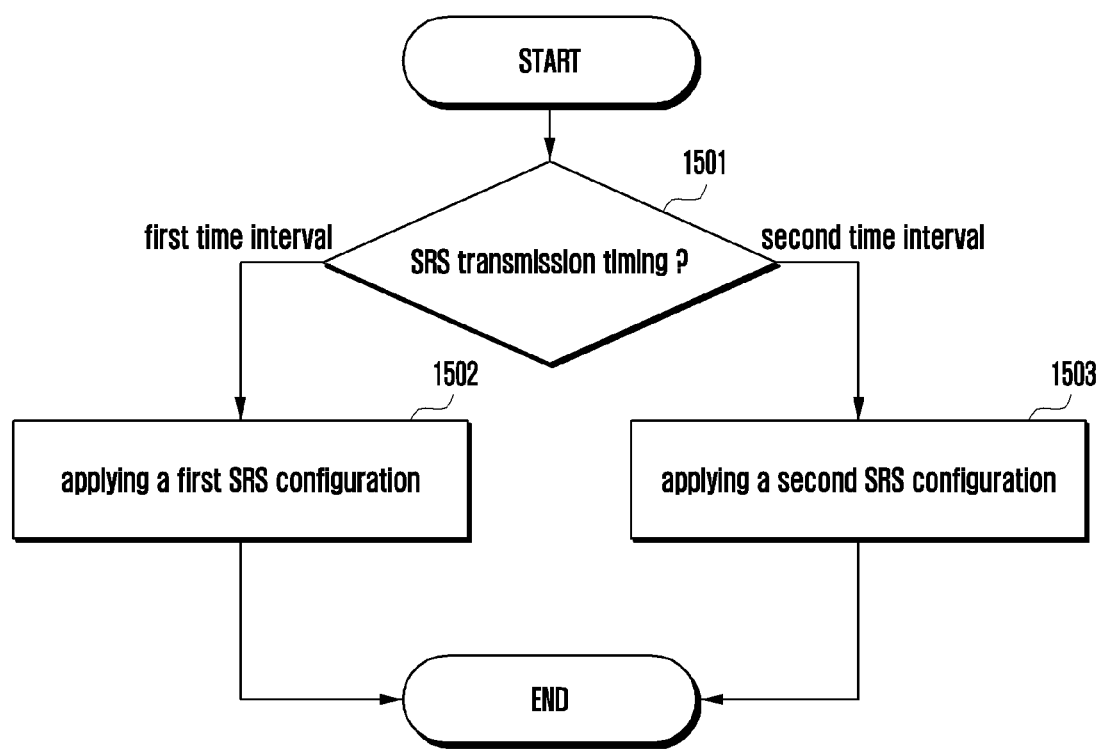
FIG. 15 is a diagram illustrating a procedure of a base station and a UE according to an embodiment of the disclosure.

FIG. 15 is a diagram illustrating operations of a base station and a UE according to a third embodiment of the disclosure.

In step 1501, the base station may determine whether the time at which the SRS is to be received corresponds to the first time period or the second time period. If it is determined that the first time period corresponds to the first time period, the base station may receive the SRS transmitted from the UE by applying the first configuration at that time (step 1502). If it is determined that the second time period corresponds to the second time period, the base station may receive the SRS transmitted from the UE by applying the second configuration at that time (step 1503).

In step 1501, the UE may determine whether the time point at which the SRS is to be transmitted corresponds to the first time period or the second time period. If it is determined that it corresponds to the first time period, the UE may transmit the corresponding SRS by applying the first configuration at the corresponding time point (step 1502). If it is determined that the second time period corresponds to the second time period, the UE may transmit the corresponding SRS by applying the second UE configuration at the corresponding time point (step 1503).

Figure 16:
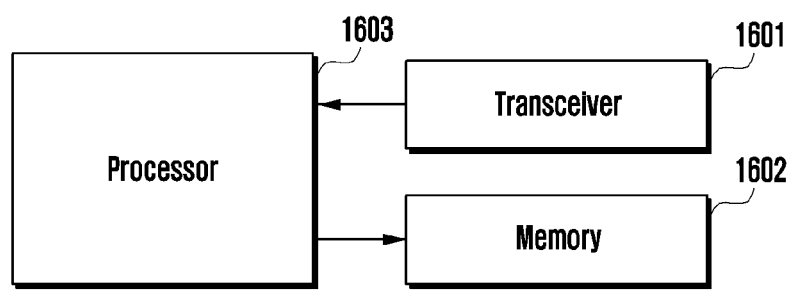
FIG. 16 is a block diagram illustrating an internal structure of a UE according to an embodiment of the disclosure.

FIG. 16 is a block diagram illustrating an internal structure of a UE according to an embodiment of the disclosure.

Referring to FIG. 16, the UE may include a transceiver 1601, a memory 1602, and a processor 1603. However, the components of the UE are not limited to the above-described examples. For example, the UE may include more or fewer components than the aforementioned components. In addition, the transceiver 1601, the memory 1602, and the processor 1603 may be implemented in the form of a single chip.

In an embodiment, the transceiver 1601 may transmit/receive a signal to/from the base station. The above-described signal may include control information and data. To this end, the transceiver 1601 may include an RF transmitter for up-converting and amplifying a frequency of a transmitted signal, and an RF receiver for low-noise amplifying and down-converting a received signal. In addition, the transceiver 1601 may receive a signal through a wireless channel and output the signal to the processor 1603, and transmit the signal output from the processor 1603 through a wireless channel.

In an embodiment, the memory 1602 may store programs and data necessary for the operation of the UE. In addition, the memory 1602 may store control information or data included in a signal transmitted and received by the UE. The memory 1602 may be configured as a storage medium or a combination of storage media, such as ROM, RAM, hard disk, CD-ROM, and DVD. In addition, the memory 1602 may be composed of a plurality of memories. According to an embodiment, the memory 1602 may store a program for executing an operation for power saving of the UE.

In an embodiment, the processor 1603 may control a series of processes in which the UE may operate according to the above-described embodiments of the disclosure. In an embodiment, the processor 1603 may receive information such as configuration for CA, bandwidth part configuration, SRS configuration, PDCCH configuration, etc. from the base station, and control the dormant cell operation based on the configuration information by executing the program stored in the memory 1602.

Figure 17:
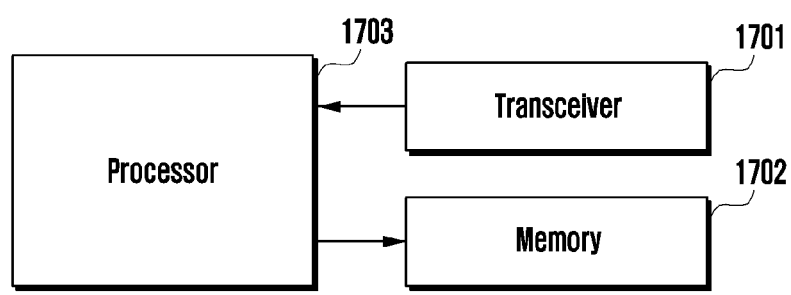
FIG. 17 is a block diagram illustrating an internal structure of a base station according to an embodiment of the disclosure.

FIG. 17 is a block diagram illustrating an internal structure of a base station according to an embodiment of the disclosure.

Referring to FIG. 17, the base station may include a transceiver 1701, a memory 1702, and a processor 1703. However, the components of the base station are not limited to the above-described examples. For example, the base station may include more or fewer components than the aforementioned components. In addition, the transceiver 1701, the memory 1702, and the processor 1703 may be implemented in the form of a single chip.

In an embodiment, the transceiver 1701 may transmit/receive a signal to/from the UE. The above-described signal may include control information and data. To this end, the transceiver 1701 may include an RF transmitter for up-converting and amplifying a frequency of a transmitted signal, and an RF receiver for low-noise amplifying and down-converting a received signal. In addition, the transceiver 1701 may receive a signal through a wireless channel and output the signal to the processor 1703, and transmit the signal output from the processor 1703 through a wireless channel.

In an embodiment, the memory 1702 may store programs and data necessary for the operation of the base station. In addition, the memory 1702 may store control information or data included in a signal transmitted and received by the base station. The memory 1702 may be configured as a storage medium or a combination of storage media, such as ROM, RAM, hard disk, CD-ROM, and DVD. In addition, the memory 1702 may be composed of a plurality of memories. According to an embodiment, the memory 1702 may store a program for executing an operation for power saving of the base station.

In an embodiment, the processor 1703 may control a series of processes so that the base station can operate according to the above-described embodiment of the disclosure. In one embodiment, the processor 1703 may transmit information such as configuration for CA, bandwidth part configuration, SRS configuration, and PDCCH configuration to the UE, and control the dormant cell operation of the UE based on the configuration information by executing the program stored in the memory 1702.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may be applied to LTE, 5G, or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) message including spatial relation information between a plurality of reference signals (RSs) and a sounding reference signal (SRS), and configuration information for the SRS, wherein at least one SRS is transmitted in a different time resource;
   based on the spatial relation information, identifying a first downlink RS for a first time resource and a second downlink RS for a second time resource;
   transmitting, to the base station, a first SRS on the first time resource based on the first downlink RS;
   transmitting, to the base station, a second SRS on the second time resource based on the second downlink RS;
   receiving, from the base station, a channel state information-reference signal (CSI-RS) on a third time resource based on a first transmission configuration indicator (TCI) state; and
   receiving, from the base station, a CSI-RS on a fourth time resource based on a second TCI state,
   wherein the third time resource includes the first time resource and the second time resource,
   wherein the third time resource is allocated for a cross division duplex (XDD),
   wherein the plurality of RSs includes the first downlink RS and the second downlink RS,
   wherein the configuration information includes information on the first time resource associated with the first downlink RS and information on the second time resource associated with the second downlink RS,
   wherein the RRC message includes quasi-co location (QCL) information between the CSI-RS and a plurality of TCI states including the first TCI state and the second TCI state, and
   wherein the fourth time resource is allocated for a downlink reception.

2. The method of claim 1, wherein the first downlink RS is associated with one or more first antenna ports of the base station, and
   wherein the second downlink RS is associated with one or more second antenna ports of the base station.

3. The method of claim 1, wherein the first TCI state is associated with one or more third antenna ports of the base station,
   wherein the second TCI state is associated with one or more fourth antenna ports of the base station, and
   wherein the one or more fourth antenna ports include the one or more third antenna ports.

4. A terminal in a wireless communication system, the terminal comprising:
   a transceiver; and
   at least one processor coupled with the transceiver and configured to:
      receive, from a base station, a radio resource control (RRC) message including spatial relation information between a plurality of reference signals (RSs) and a sounding reference signal (SRS), and configuration information for the SRS, wherein at least one SRS is transmitted in a different time resource,
      based on the spatial relation information, identify a first downlink RS for a first time resource and a second downlink RS for a second time resource,
      transmit, to the base station, a first SRS on the first time resource based on the first downlink RS,
      transmit, to the base station, a second SRS on the second time resource based on the second downlink RS,
      receive, from the base station, a channel state information-reference signal (CSI-RS) on a third time resource based on a first transmission configuration indicator (TCI) state, and
      receive, from the base station, a CSI-RS on a fourth time resource based on a second TCI state,
   wherein the third time resource includes the first time resource and the second time resource,
   wherein the third time resource is allocated for a cross division duplex (XDD),
   wherein the plurality of RSs includes the first downlink RS and the second downlink RS,
   wherein the configuration information includes information on the first time resource associated with the first downlink RS and information on the second time resource associated with the second downlink RS,
   wherein the RRC message includes quasi-co location (QCL) information between the CSI-RS and a plurality of TCI states including the first TCI state and the second TCI state, and
   wherein the fourth time resource is allocated for a downlink reception.

5. The terminal of claim 4, wherein the first downlink RS is associated with one or more first antenna ports of the base station, and
   wherein the second downlink RS is associated with one or more second antenna ports of the base station.

6. The terminal of claim 4, wherein the first TCI state is associated with one or more third antenna ports of the base station,
   wherein the second TCI state is associated with one or more fourth antenna ports of the base station, and
   wherein the one or more fourth antenna ports include the one or more third antenna ports.

7. A method performed by a base station in a wireless communication system, the method comprising:
- transmitting, to a terminal, a radio resource control (RRC) message including spatial relation information between a plurality of reference signals (RSs) and a sounding reference signal (SRS), and configuration information for the SRS, wherein at least one SRS is transmitted in a different time resource;
- receiving, from the base station, a first SRS on a first time resource based on a first downlink RS;
- receiving, from the base station, a second SRS on a second time resource based on a second downlink RS;
- transmitting, to the terminal, a channel state information-reference signal (CSI-RS) on a third time resource based on a first transmission configuration indicator (TCI) state; and
- transmitting, to the terminal, a CSI-RS on a fourth time resource based on a second TCI state,
- wherein the first downlink RS for the first time resource and the second downlink RS for the second time resource are identified based on the spatial relation information,
- wherein the third time resource includes the first time resource and the second time resource,
- wherein the third time resource is allocated for a cross division duplex (XDD),
- wherein the plurality of RSs includes the first downlink RS and the second downlink RS,
- wherein the configuration information includes information on the first time resource associated with the first downlink RS and information on the second time resource associated with the second downlink RS,
- wherein the RRC message includes quasi-co location (QCL) information between the CSI-RS and a plurality of TCI states including the first TCI state and the second TCI state, and
- wherein the fourth time resource is allocated for a downlink transmission.

8. The method of claim 7, wherein the first downlink RS is associated with one or more first antenna ports of the base station, and
- wherein the second downlink RS is associated with one or more second antenna ports of the base station.

9. The method of claim 7,
- wherein the first TCI state is associated with one or more third antenna ports of the base station,
- wherein the second TCI state is associated with one or more fourth antenna ports of the base station, and
- wherein the one or more fourth antenna ports include the one or more third antenna ports.

10. A base station in a wireless communication system, the base station comprising:
- a transceiver; and
- at least one processor coupled with the transceiver and configured to:
  - transmit, to a terminal, a radio resource control (RRC) message including spatial relation information between a plurality of reference signals (RSs) and a sounding reference signal (SRS), and configuration information for the SRS, wherein at least one SRS is transmitted in a different time resource,
  - receive, from the base station, a first SRS on a first time resource based on a first downlink RS,
  - receive, from the base station, a second SRS on a second time resource based on a second downlink RS,
  - transmit, to the terminal, a channel state information-reference signal (CSI-RS) on a third time resource based on a first transmission configuration indicator (TCI) state, and
  - transmit, to the terminal, a CSI-RS on a fourth time resource based on a second TCI state,
- wherein the first downlink RS for the first time resource and the second downlink RS for the second time resource are identified based on the spatial relation information,
- wherein the third time resource includes the first time resource and the second time resource,
- wherein the third time resource is allocated for a cross division duplex (XDD),
- wherein the plurality of RSs includes the first downlink RS and the second downlink RS,
- wherein the configuration information includes information on the first time resource associated with the first downlink RS and information on the second time resource associated with the second downlink RS,
- wherein the RRC message includes quasi-co location (QCL) information between the CSI-RS and a plurality of TCI states including the first TCI state and the second TCI state, and
- wherein the fourth time resource is allocated for a downlink transmission.

11. The base station of claim 10, wherein the first downlink RS is associated with one or more first antenna ports of the base station, and
- wherein the second downlink RS is associated with one or more second antenna ports of the base station.

12. The base station of claim 10, wherein the first TCI state is associated with one or more third antenna ports of the base station,
- wherein the second TCI state is associated with one or more fourth antenna ports of the base station, and
- wherein the one or more fourth antenna ports include the one or more third antenna ports.

* * * * *